Oct. 26, 1937.  G. F. DALY ET AL  2,097,145
RECORD CONTROLLED AND RECORD MAKING ACCOUNTING MACHINE
Filed Nov. 19, 1931  38 Sheets-Sheet 1

Oct. 26, 1937.   G. F. DALY ET AL   2,097,145
RECORD CONTROLLED AND RECORD MAKING ACCOUNTING MACHINE
Filed Nov. 19, 1931   38 Sheets-Sheet 2

Oct. 26, 1937.    G. F. DALY ET AL    2,097,145
RECORD CONTROLLED AND RECORD MAKING ACCOUNTING MACHINE
Filed Nov. 19, 1931    38 Sheets-Sheet 3

Inventors
George F. Daly
James M. Cunningham
By Cooper, Kerr & Dunham
Attorneys

Oct. 26, 1937.  G. F. DALY ET AL  2,097,145
RECORD CONTROLLED AND RECORD MAKING ACCOUNTING MACHINE
Filed Nov. 19, 1931  38 Sheets-Sheet 4
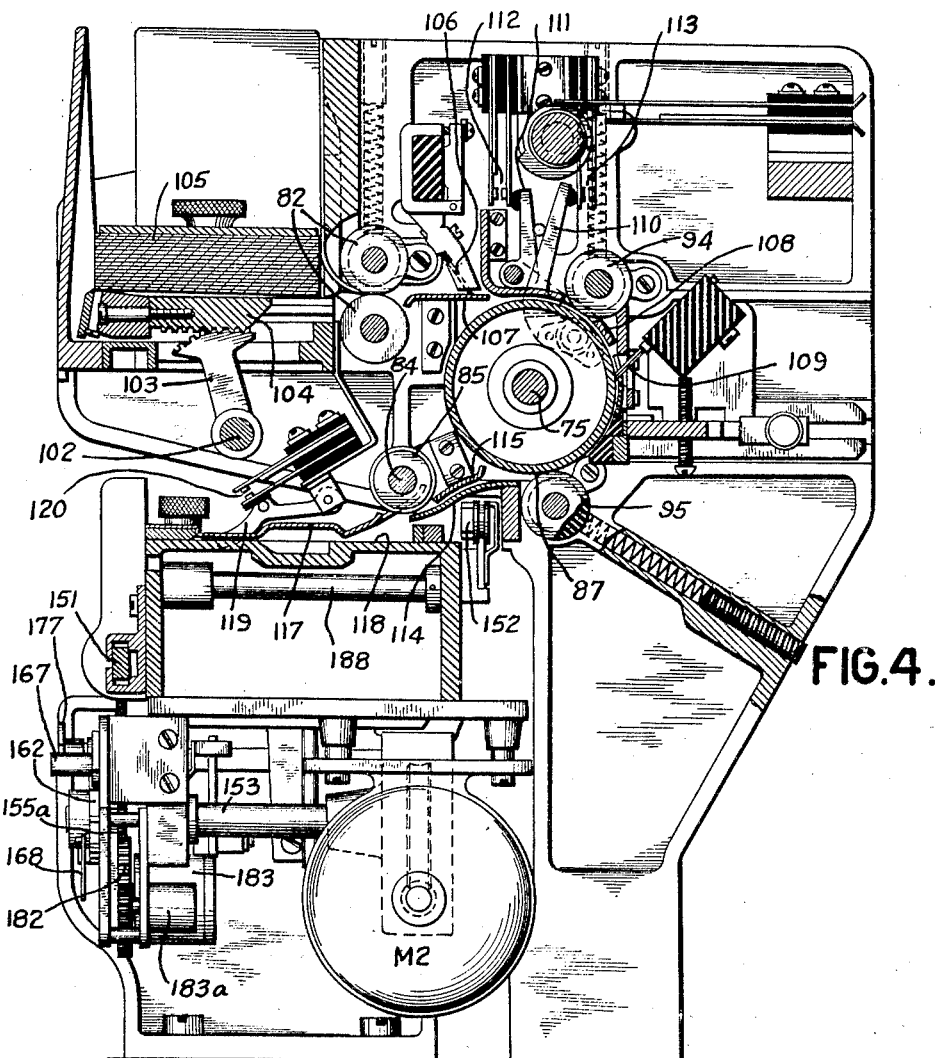

Oct. 26, 1937.　　　G. F. DALY ET AL　　　2,097,145
RECORD CONTROLLED AND RECORD MAKING ACCOUNTING MACHINE
Filed Nov. 19, 1931　　　38 Sheets-Sheet 5
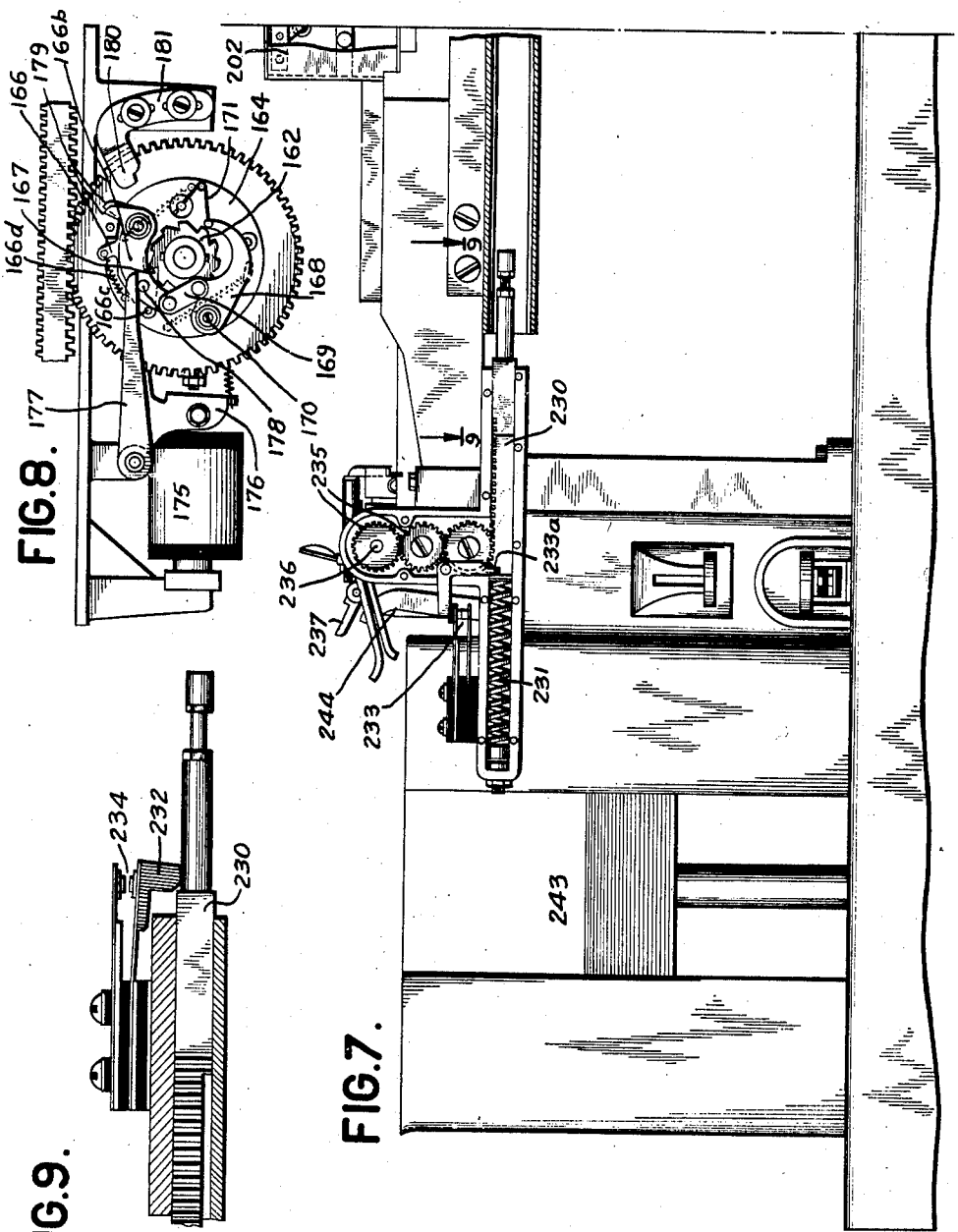

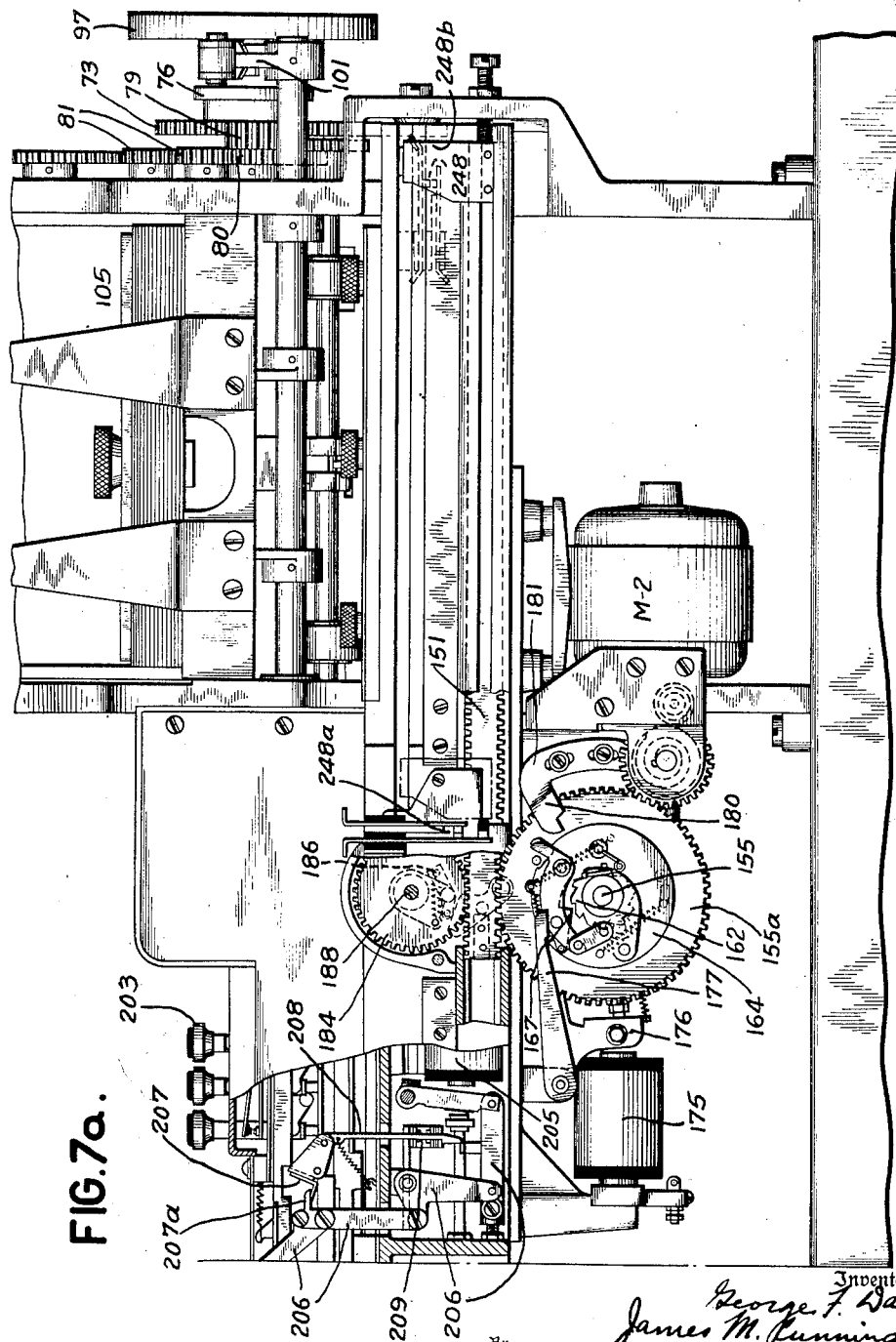

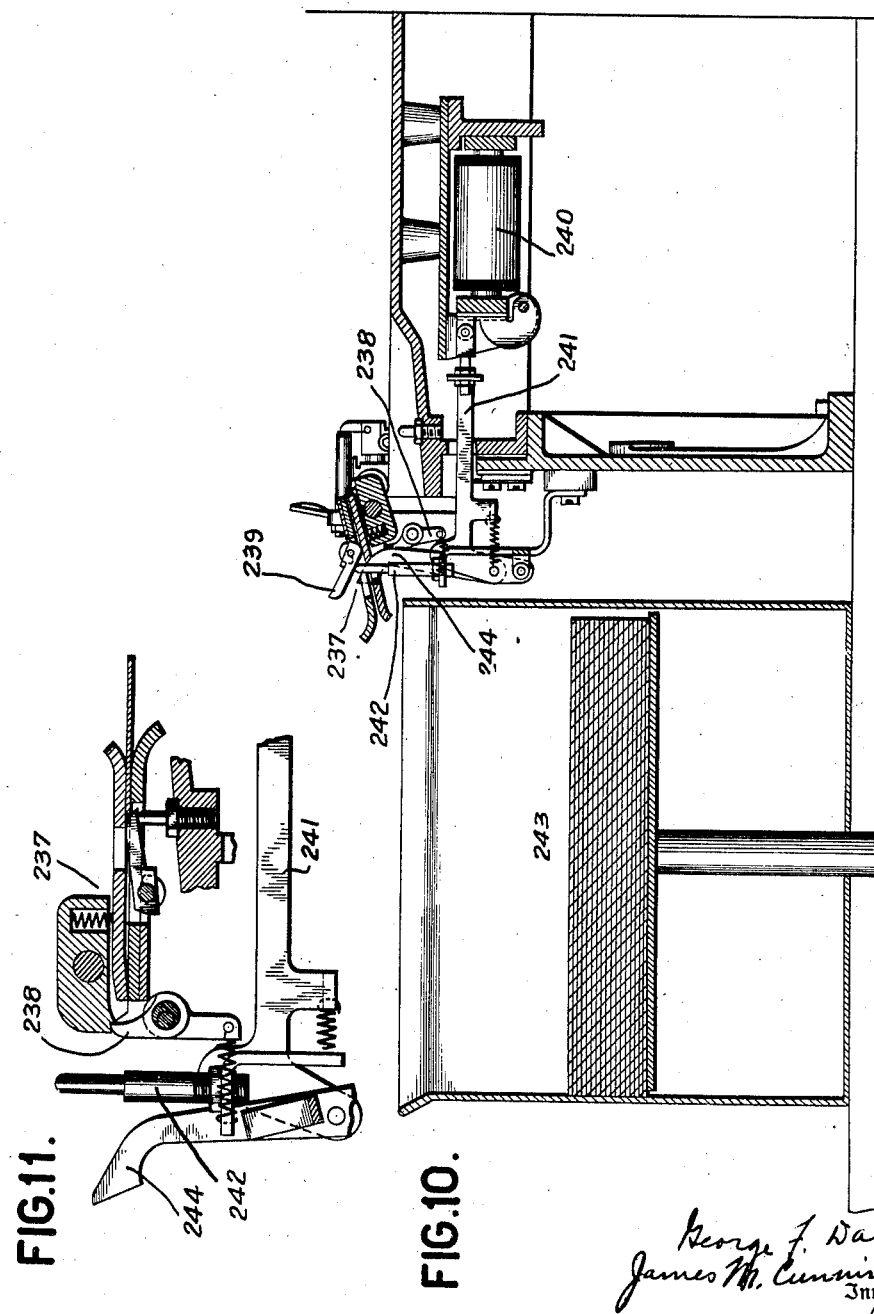

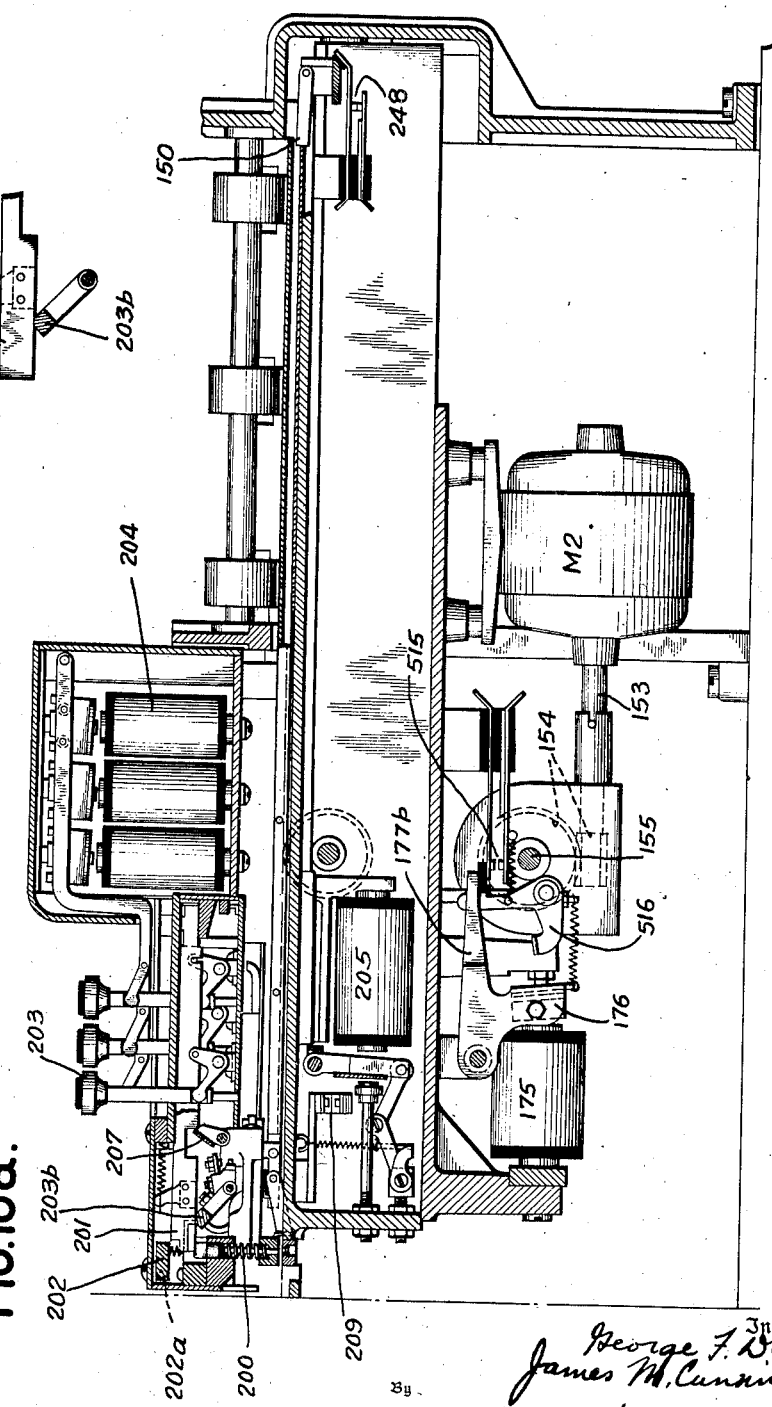

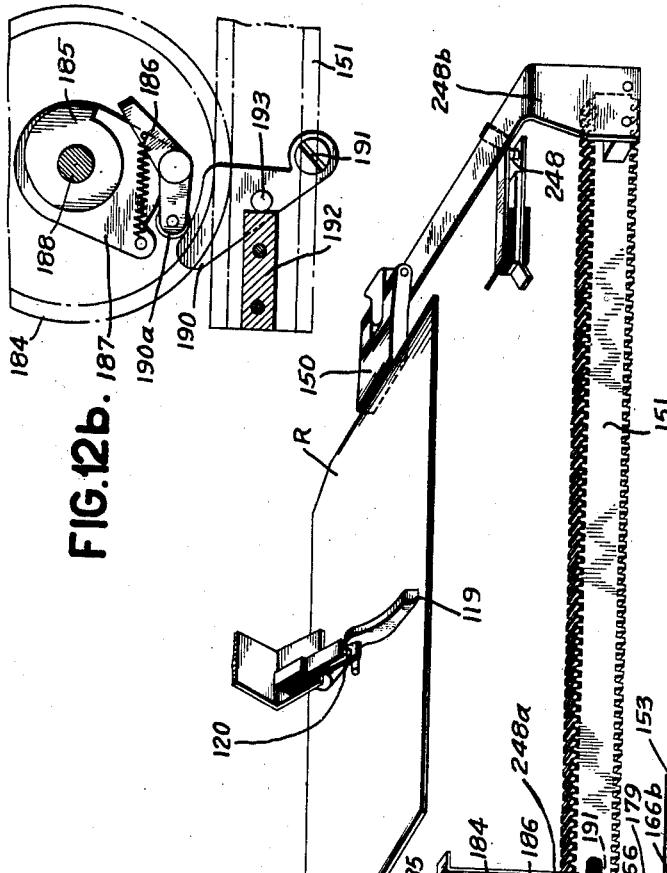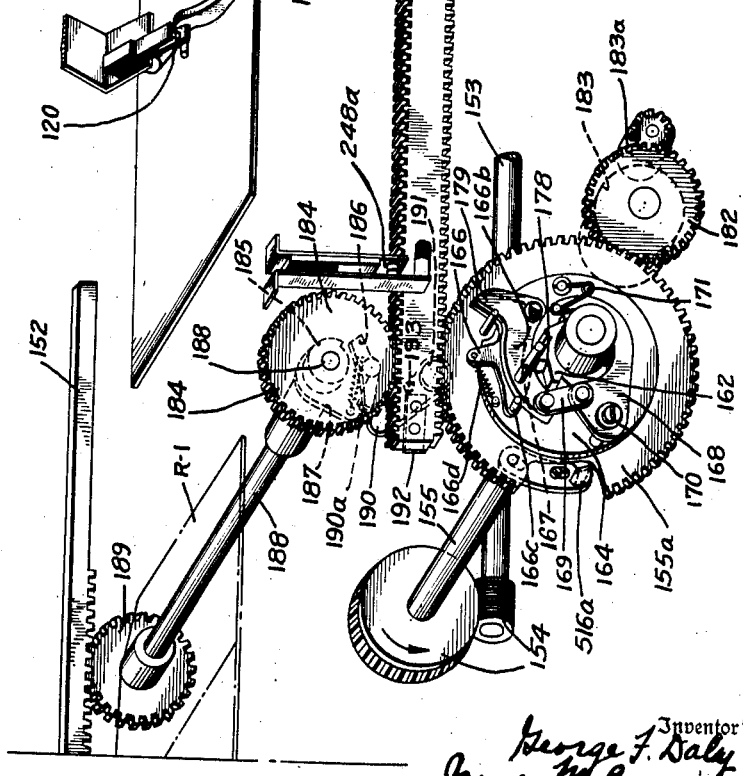

Oct. 26, 1937.  G. F. DALY ET AL  2,097,145
RECORD CONTROLLED AND RECORD MAKING ACCOUNTING MACHINE
Filed Nov. 19, 1931  38 Sheets-Sheet 11

Inventors
George F. Daly
James M. Cunningham
Cooper, Kerr & Dunham
Attorneys

Oct. 26, 1937.   G. F. DALY ET AL   2,097,145
RECORD CONTROLLED AND RECORD MAKING ACCOUNTING MACHINE
Filed Nov. 19, 1931   38 Sheets-Sheet 13

Inventors
George F. Daly
James W. Cunningham
Cooper, Kerr & Dunham
Attorneys

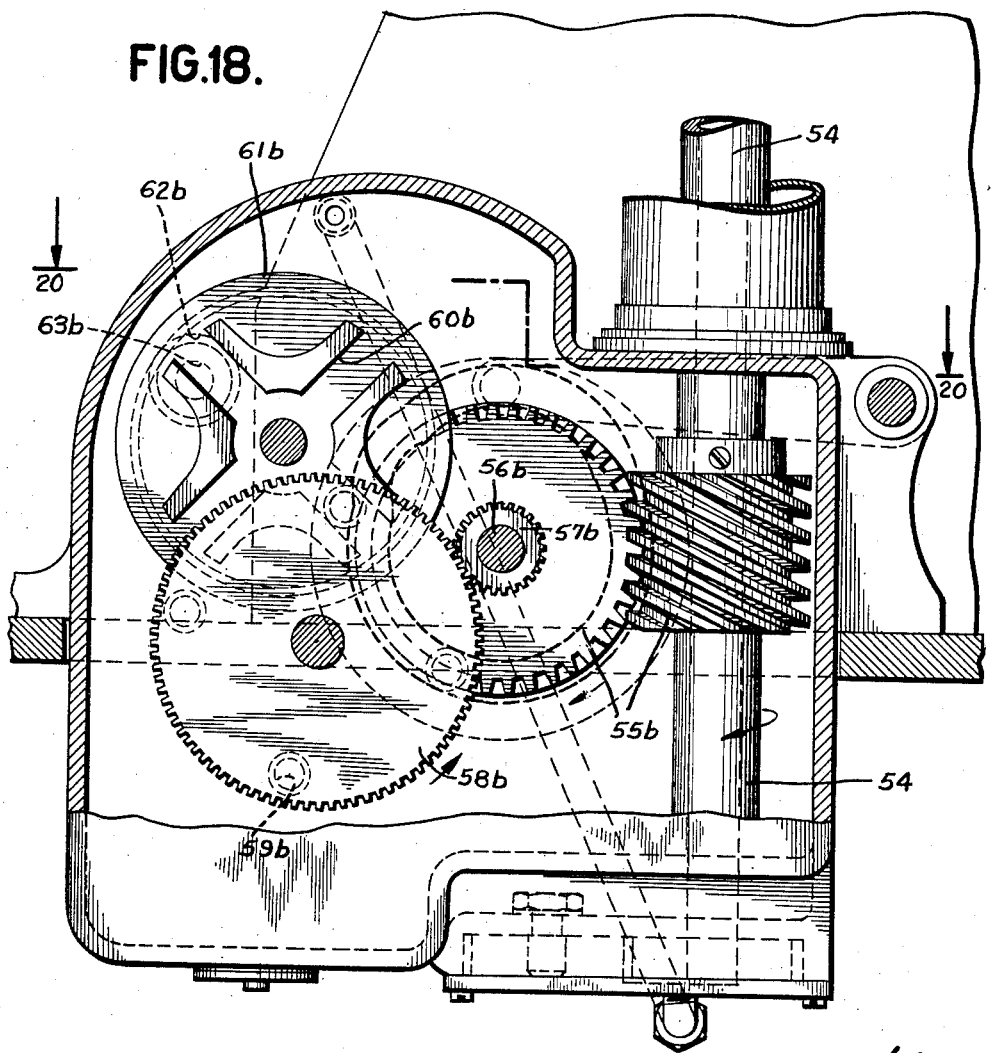

Oct. 26, 1937.  G. F. DALY ET AL  2,097,145
RECORD CONTROLLED AND RECORD MAKING ACCOUNTING MACHINE
Filed Nov. 19, 1931  38 Sheets-Sheet 15
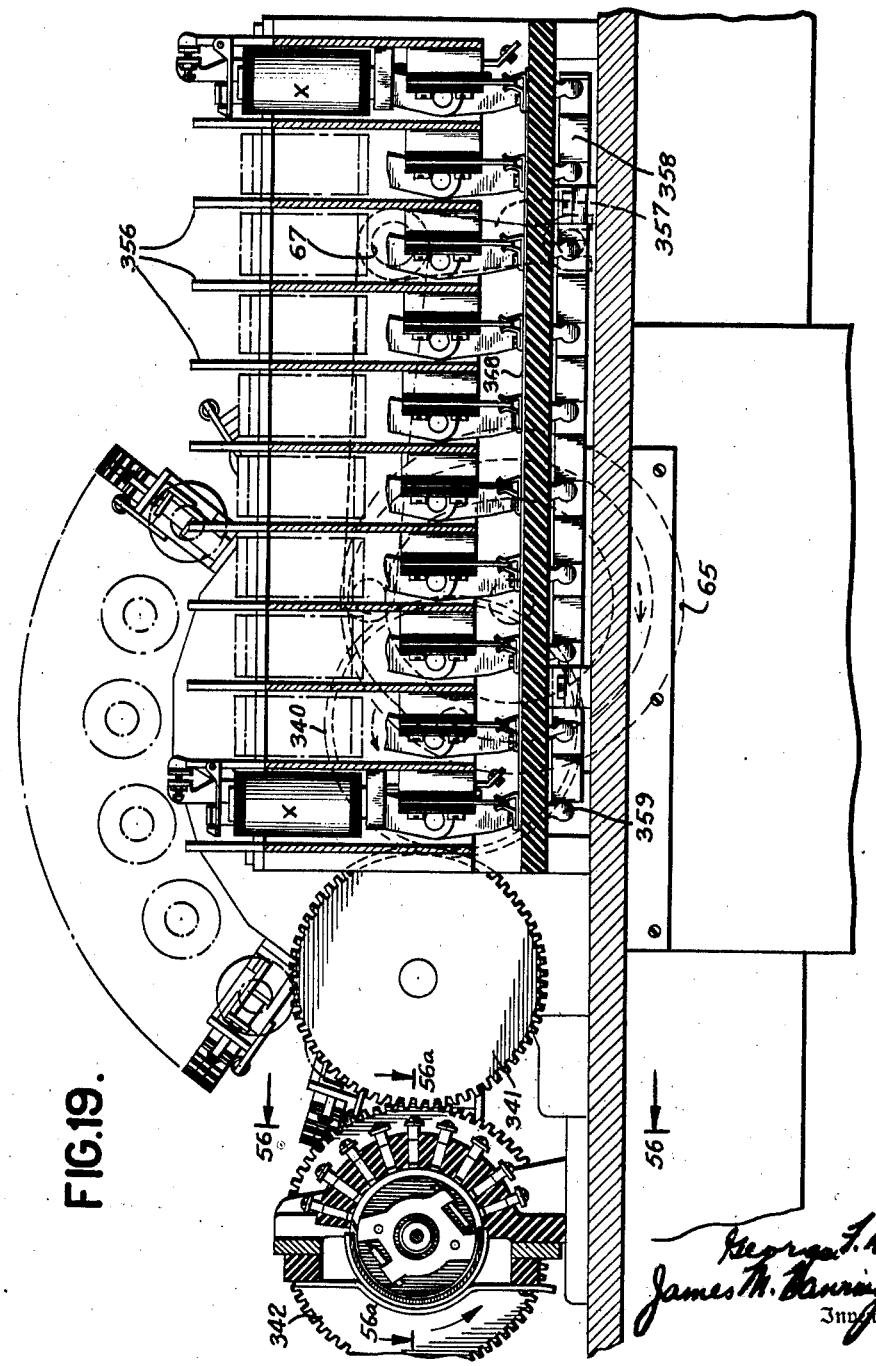

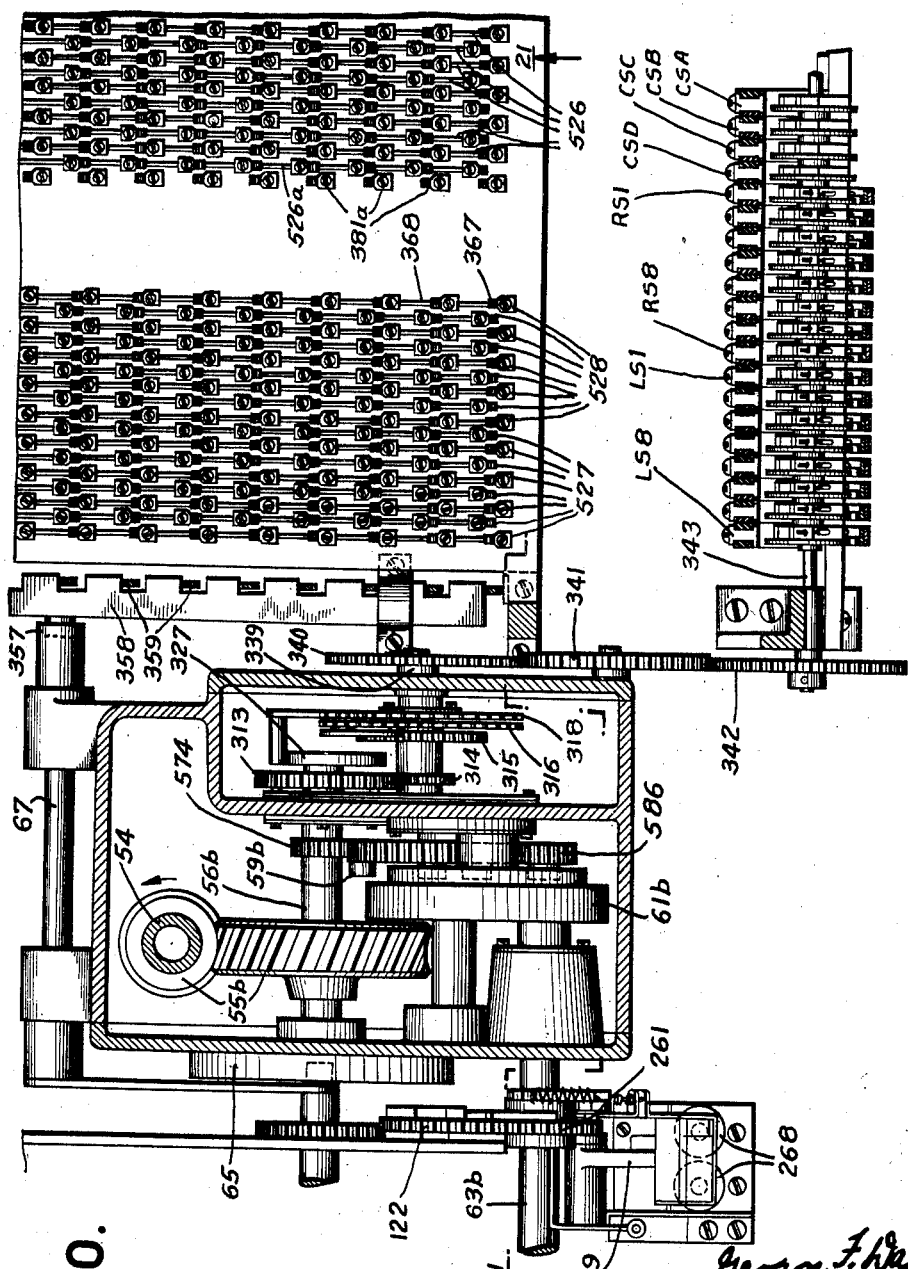

Oct. 26, 1937.    G. F. DALY ET AL    2,097,145
RECORD CONTROLLED AND RECORD MAKING ACCOUNTING MACHINE
Filed Nov. 19, 1931    38 Sheets-Sheet 17
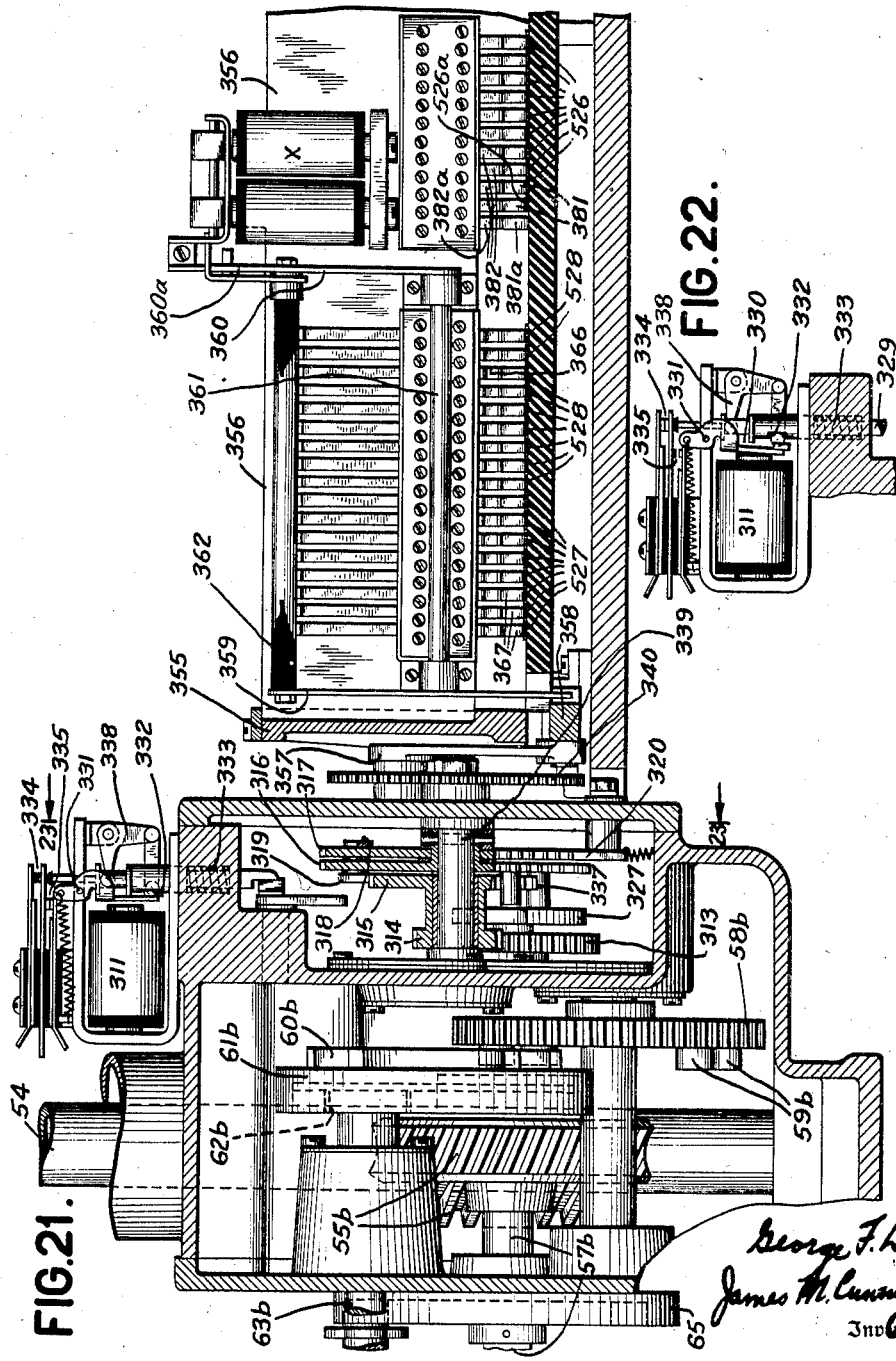

Oct. 26, 1937.   G. F. DALY ET AL   2,097,145
RECORD CONTROLLED AND RECORD MAKING ACCOUNTING MACHINE
Filed Nov. 19, 1931   38 Sheets-Sheet 18

George F. Daly
James W. Cunningham
Inventors

By Cooper, Kerr & Dunham
Attorneys

Oct. 26, 1937.　　　　　G. F. DALY ET AL　　　2,097,145
RECORD CONTROLLED AND RECORD MAKING ACCOUNTING MACHINE
Filed Nov. 19, 1931　　　38 Sheets—Sheet 19
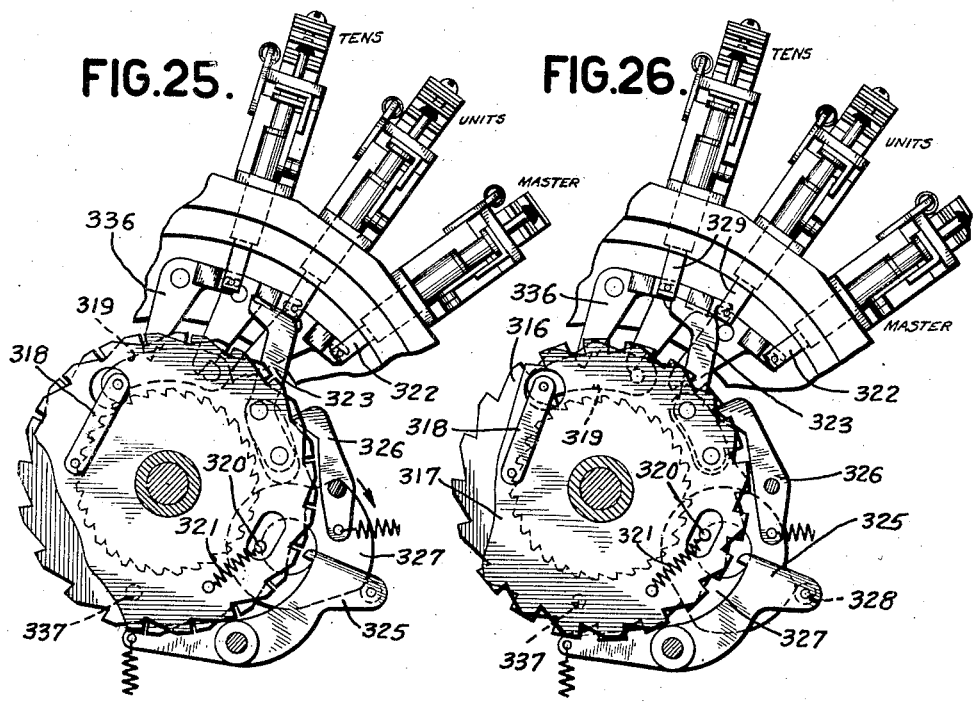

Oct. 26, 1937. G. F. DALY ET AL 2,097,145
RECORD CONTROLLED AND RECORD MAKING ACCOUNTING MACHINE
Filed Nov. 19, 1931 38 Sheets-Sheet 20
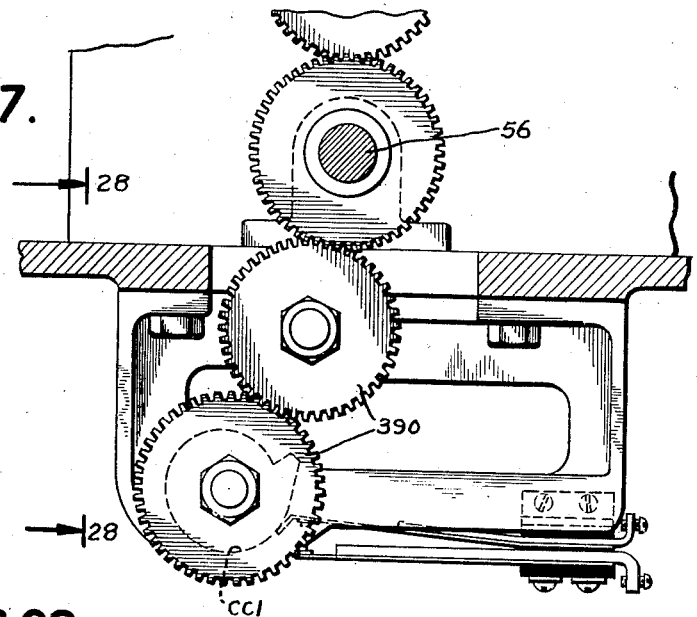
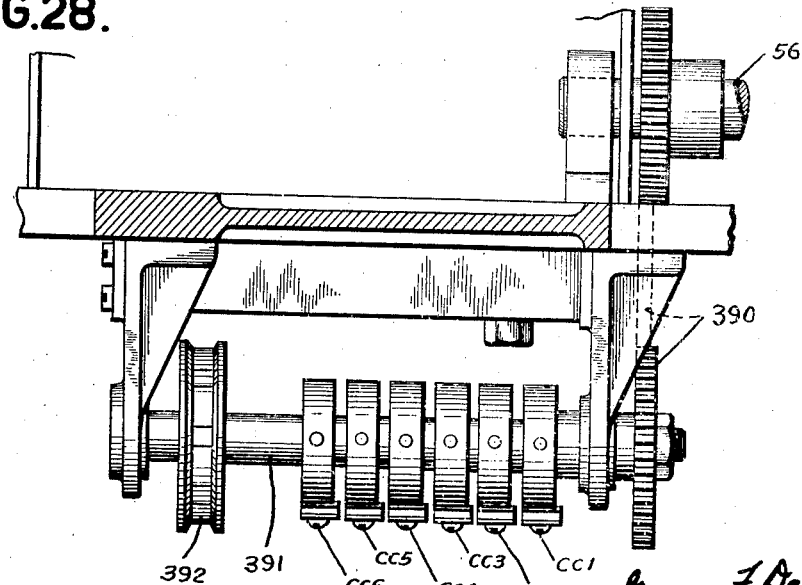

Oct. 26, 1937.    G. F. DALY ET AL    2,097,145
RECORD CONTROLLED AND RECORD MAKING ACCOUNTING MACHINE
Filed Nov. 19, 1931    38 Sheets-Sheet 21

George F. Daly
James H. Cunningham
Inventors

By Cooper, Kerr & Dunham
Attorneys

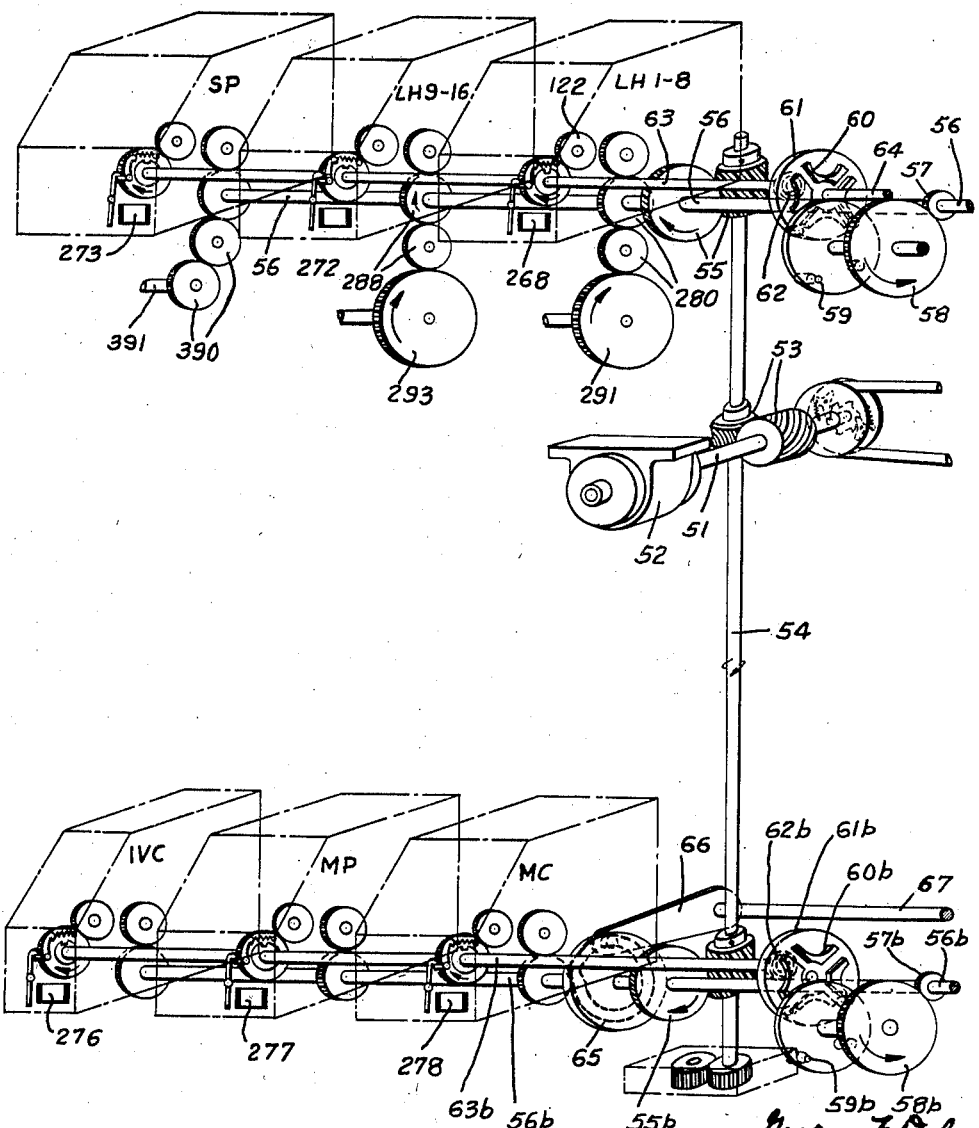

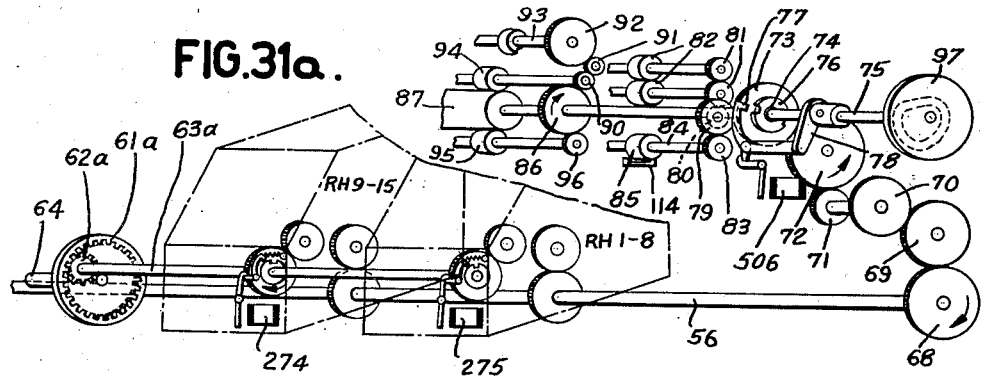
FIG.31a.
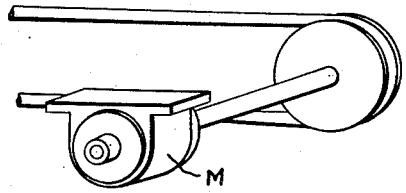
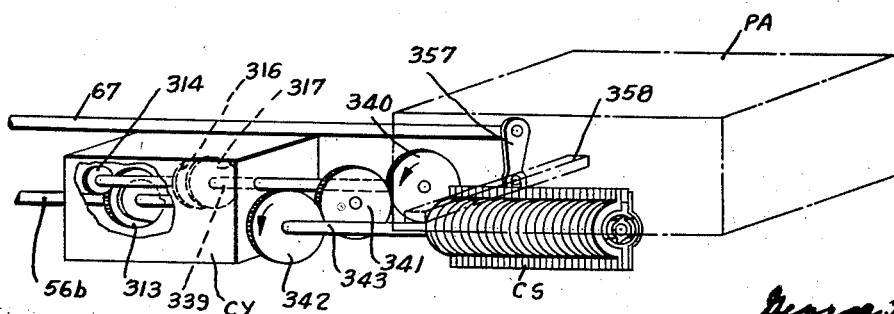

Oct. 26, 1937.  G. F. DALY ET AL  2,097,145
RECORD CONTROLLED AND RECORD MAKING ACCOUNTING MACHINE
Filed Nov. 19, 1931  38 Sheets-Sheet 24
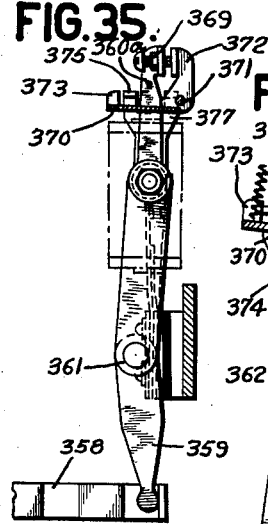
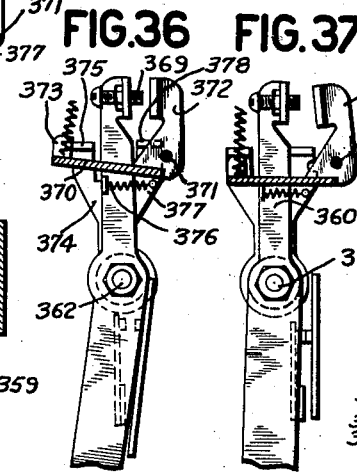
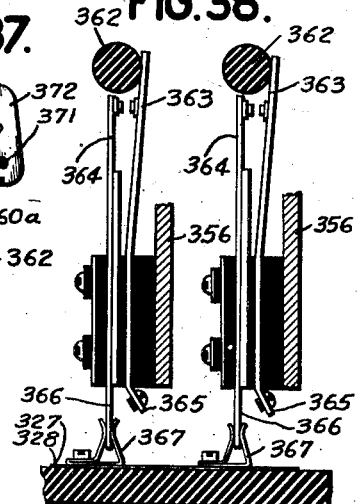
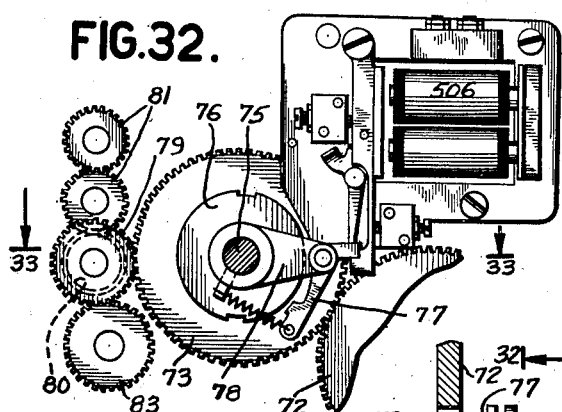
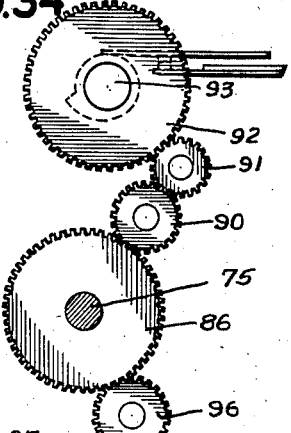
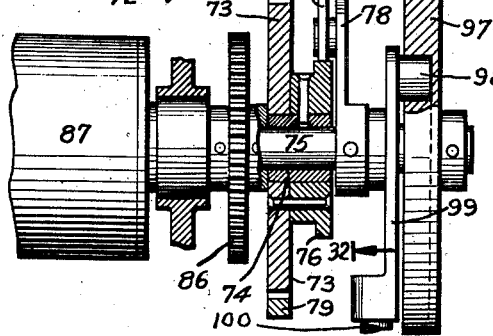

Oct. 26, 1937.  G. F. DALY ET AL  2,097,145
RECORD CONTROLLED AND RECORD MAKING ACCOUNTING MACHINE
Filed Nov. 19, 1931  38 Sheets-Sheet 25
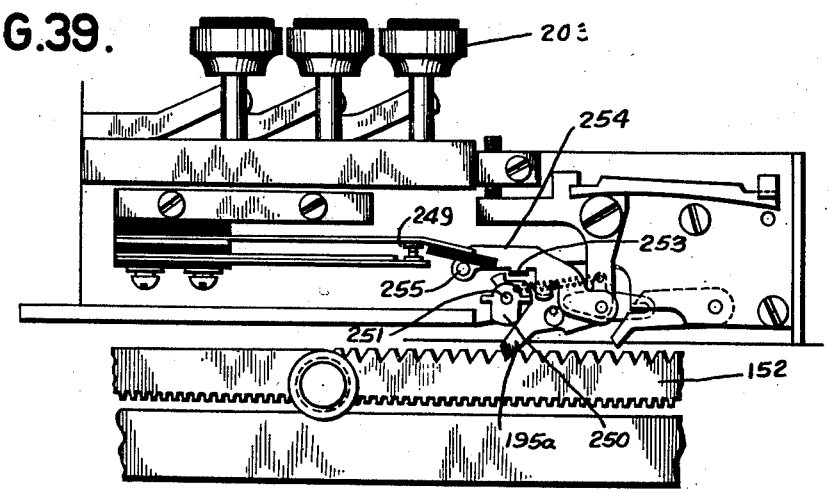
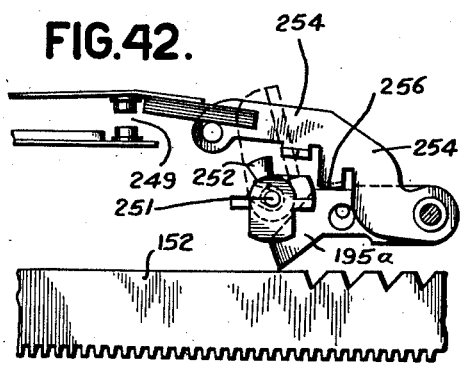
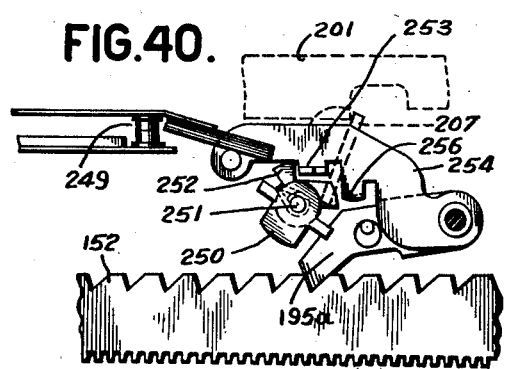
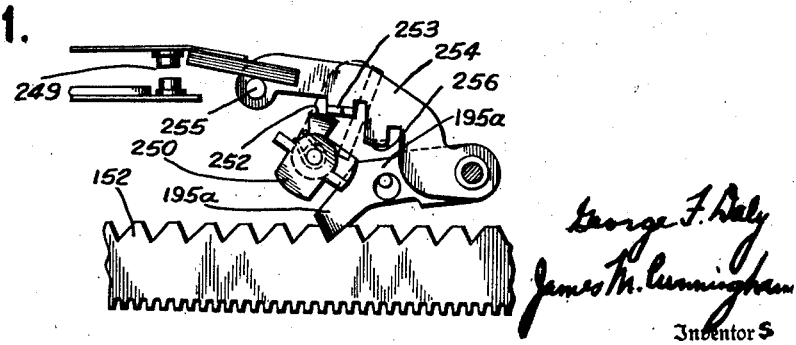

Oct. 26, 1937.  G. F. DALY ET AL  2,097,145
RECORD CONTROLLED AND RECORD MAKING ACCOUNTING MACHINE
Filed Nov. 19, 1931    38 Sheets-Sheet 26
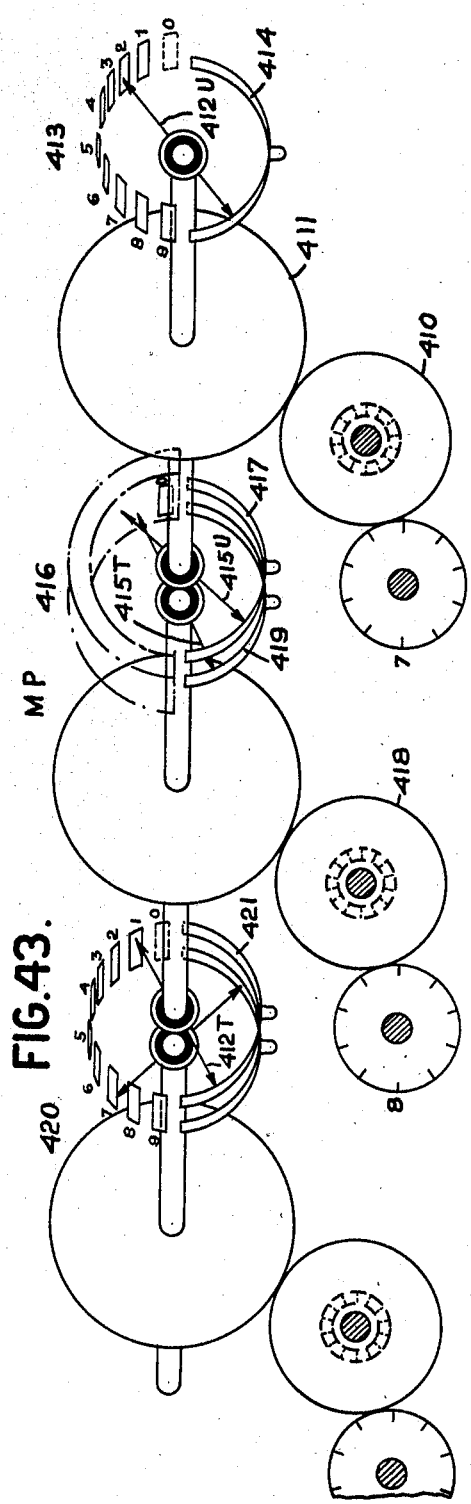
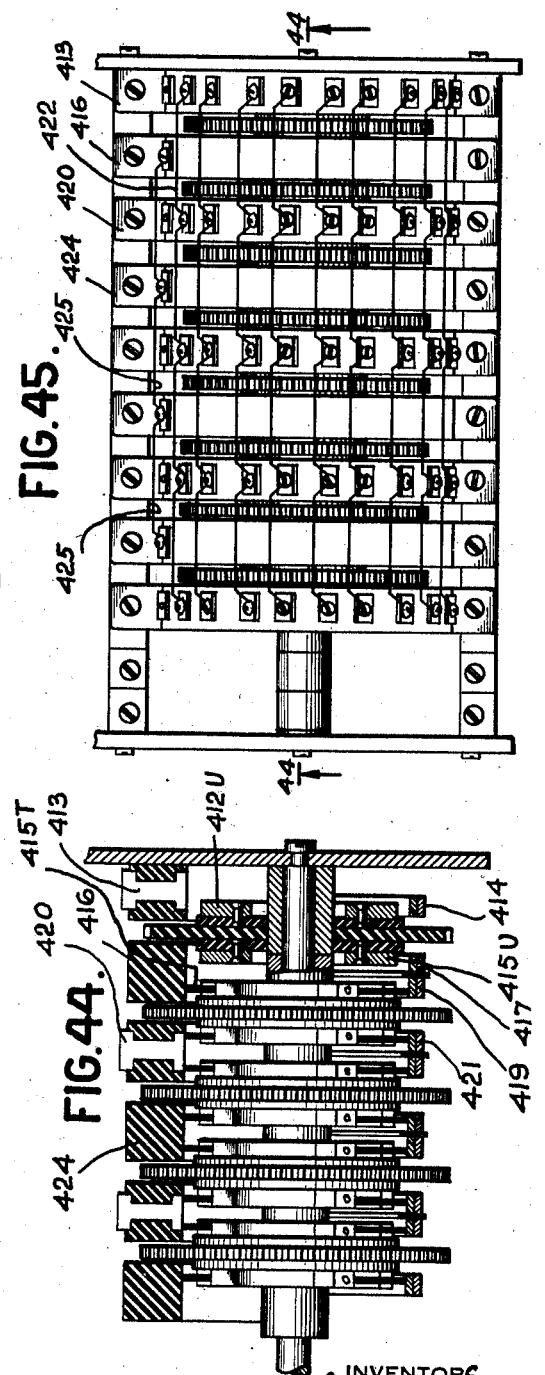

Oct. 26, 1937.  G. F. DALY ET AL  2,097,145
RECORD CONTROLLED AND RECORD MAKING ACCOUNTING MACHINE
Filed Nov. 19, 1931   38 Sheets-Sheet 27
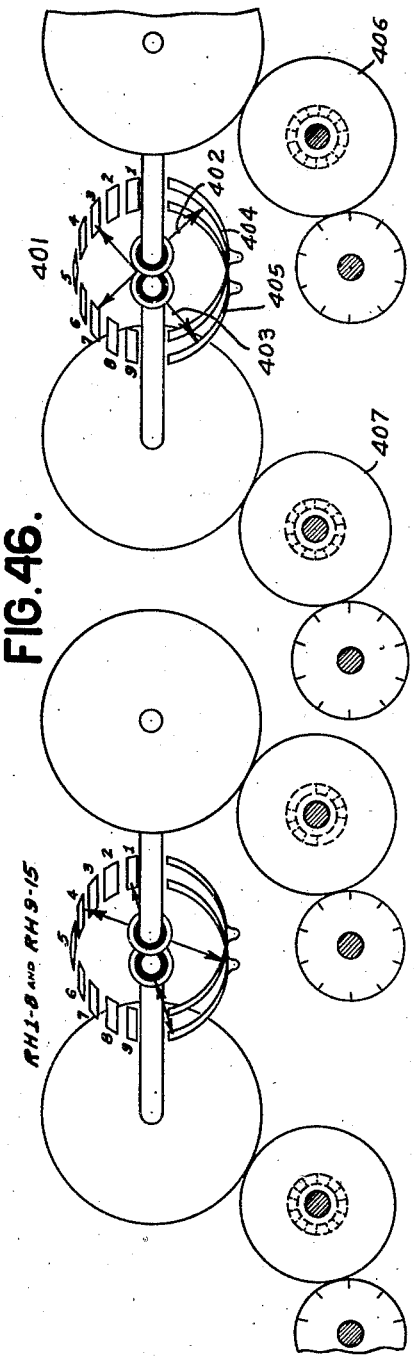
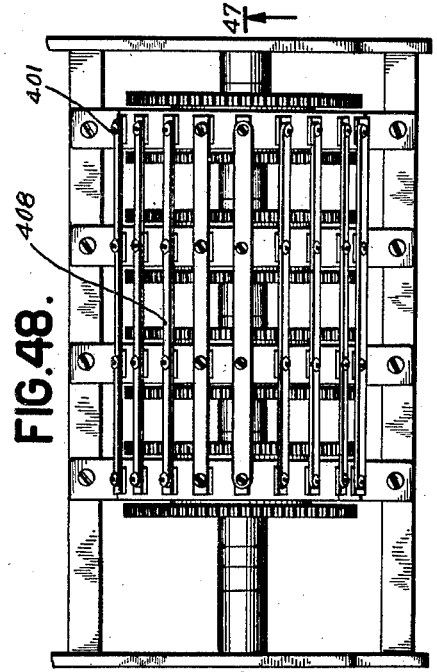
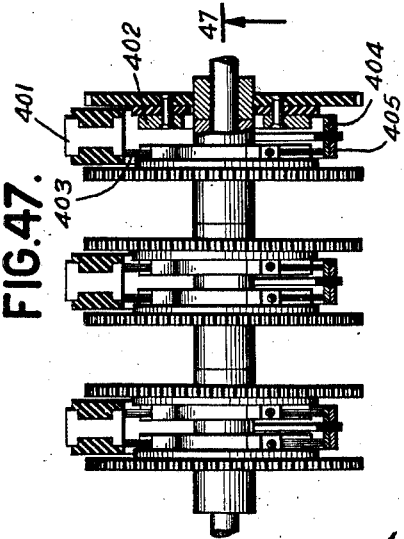

Oct. 26, 1937.   G. F. DALY ET AL   2,097,145
RECORD CONTROLLED AND RECORD MAKING ACCOUNTING MACHINE
Filed Nov. 19, 1931   38 Sheets-Sheet 28
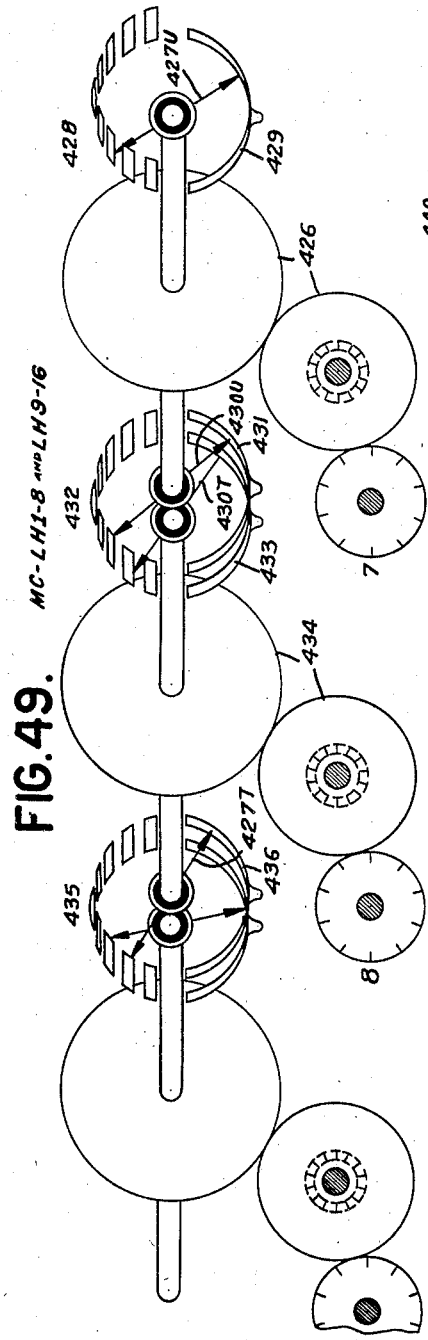
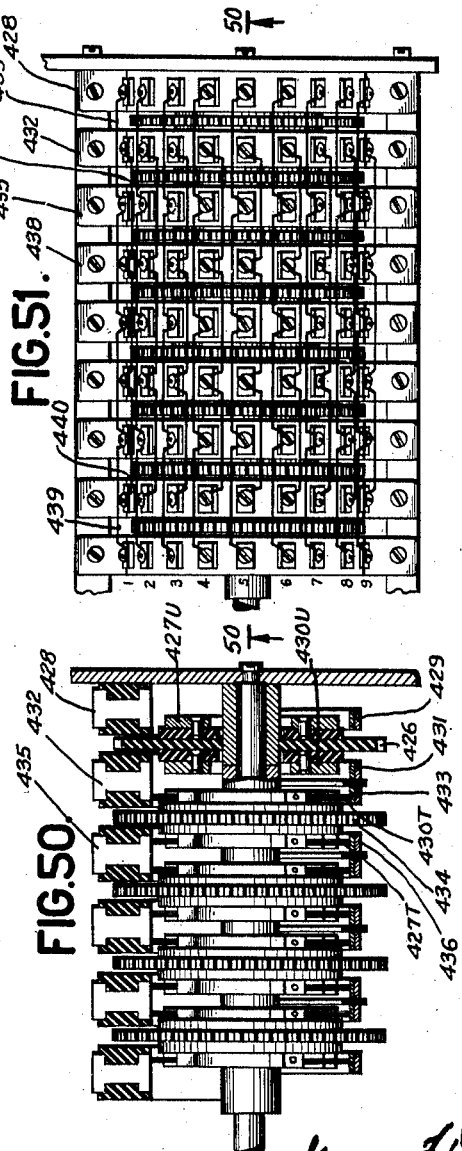

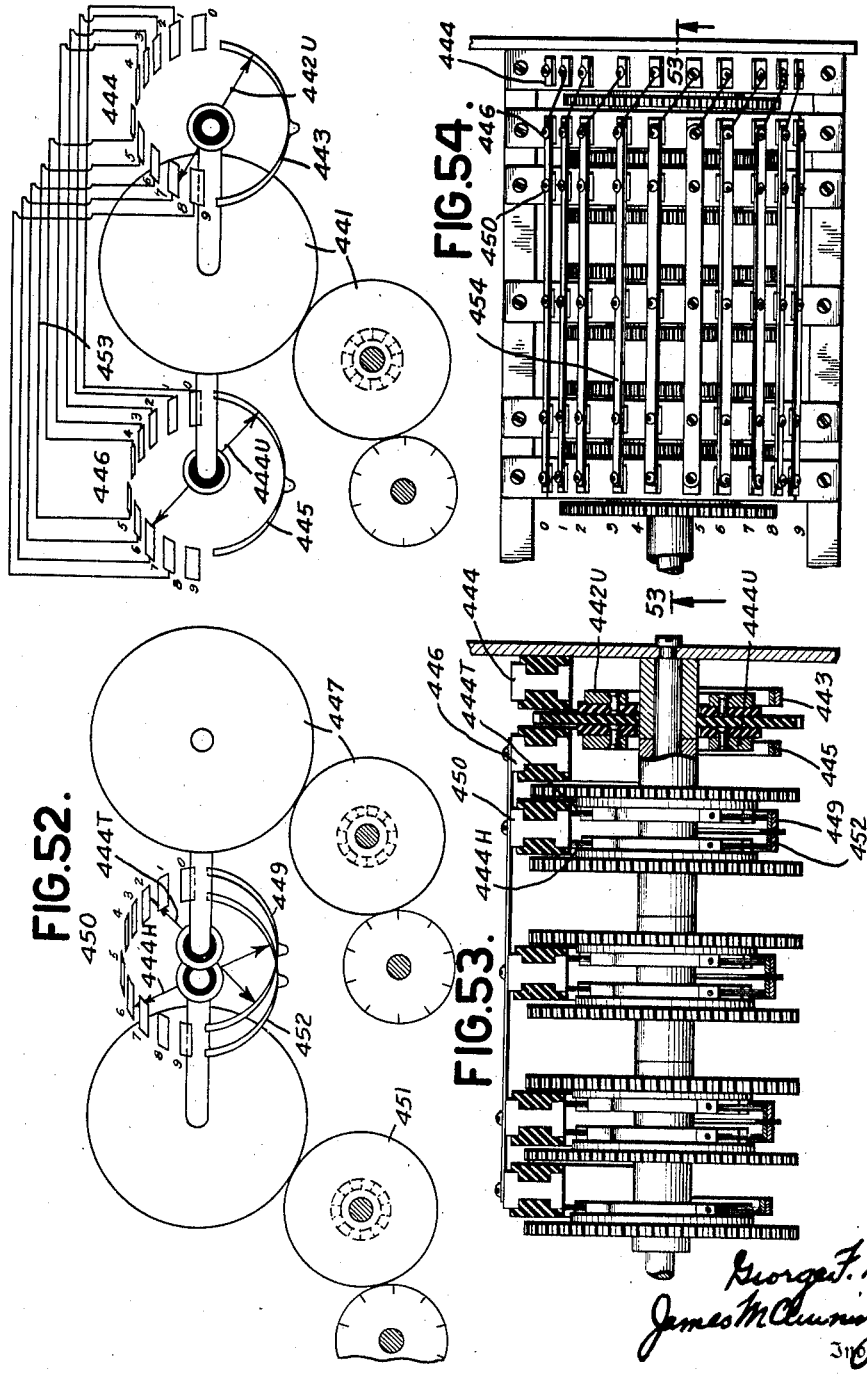

Oct. 26, 1937.　　　　G. F. DALY ET AL　　　　2,097,145
RECORD CONTROLLED AND RECORD MAKING ACCOUNTING MACHINE
Filed Nov. 19, 1931　　　38 Sheets-Sheet 30
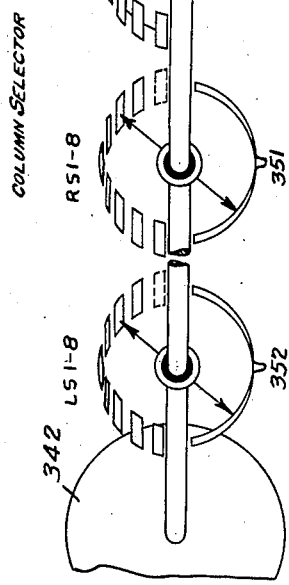
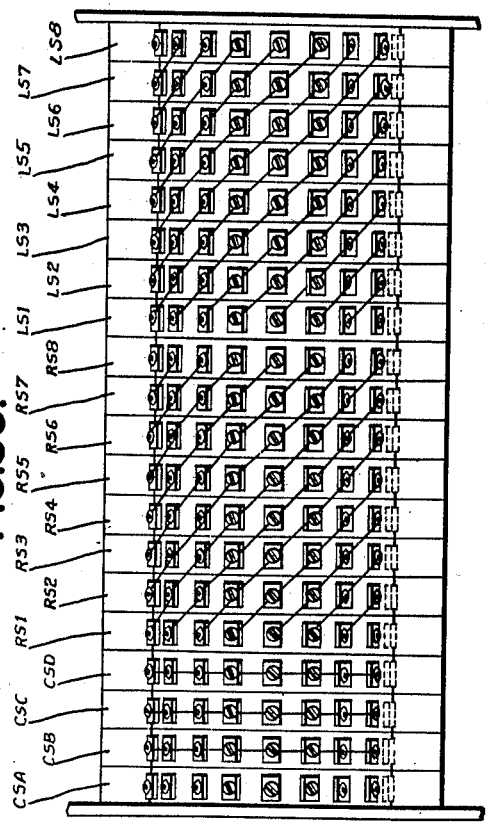
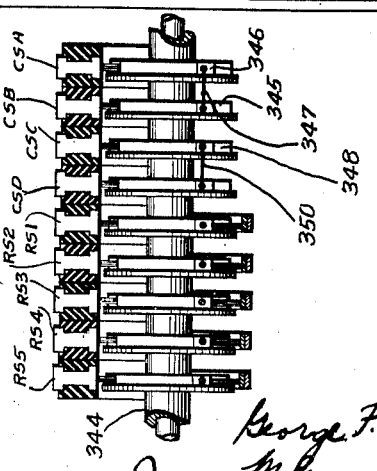
George F. Daly
James M. Cunningham
Inventors
By Cooper, Kerr & Dunham
Attorneys Oct. 26, 1937.  G. F. DALY ET AL  2,097,145
RECORD CONTROLLED AND RECORD MAKING ACCOUNTING MACHINE
Filed Nov. 19, 1931   38 Sheets-Sheet 31
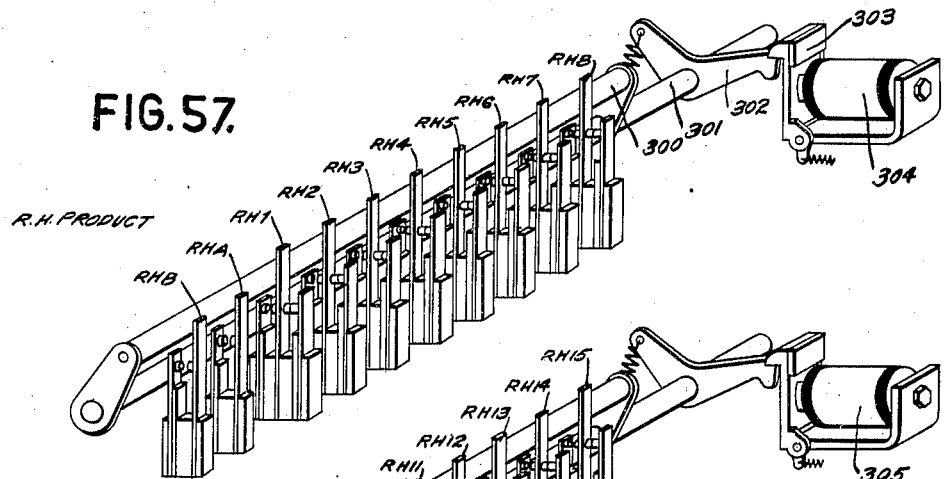
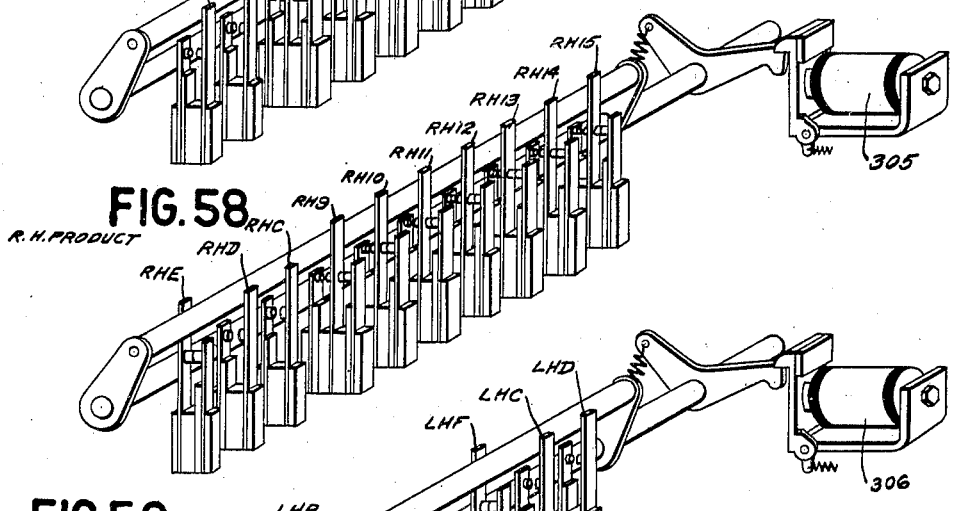
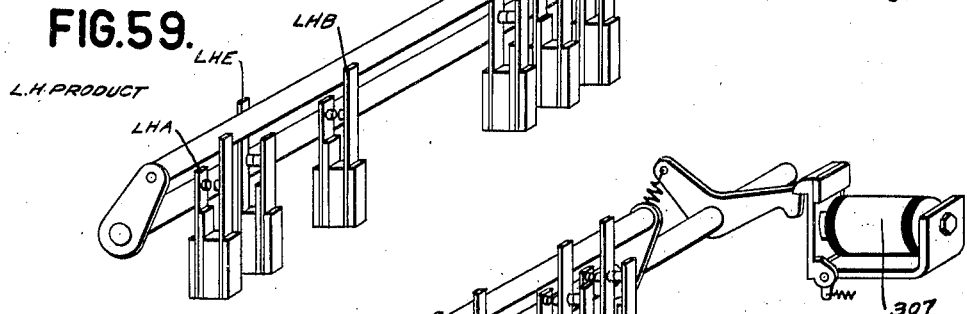
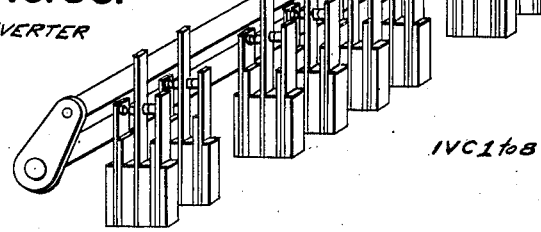

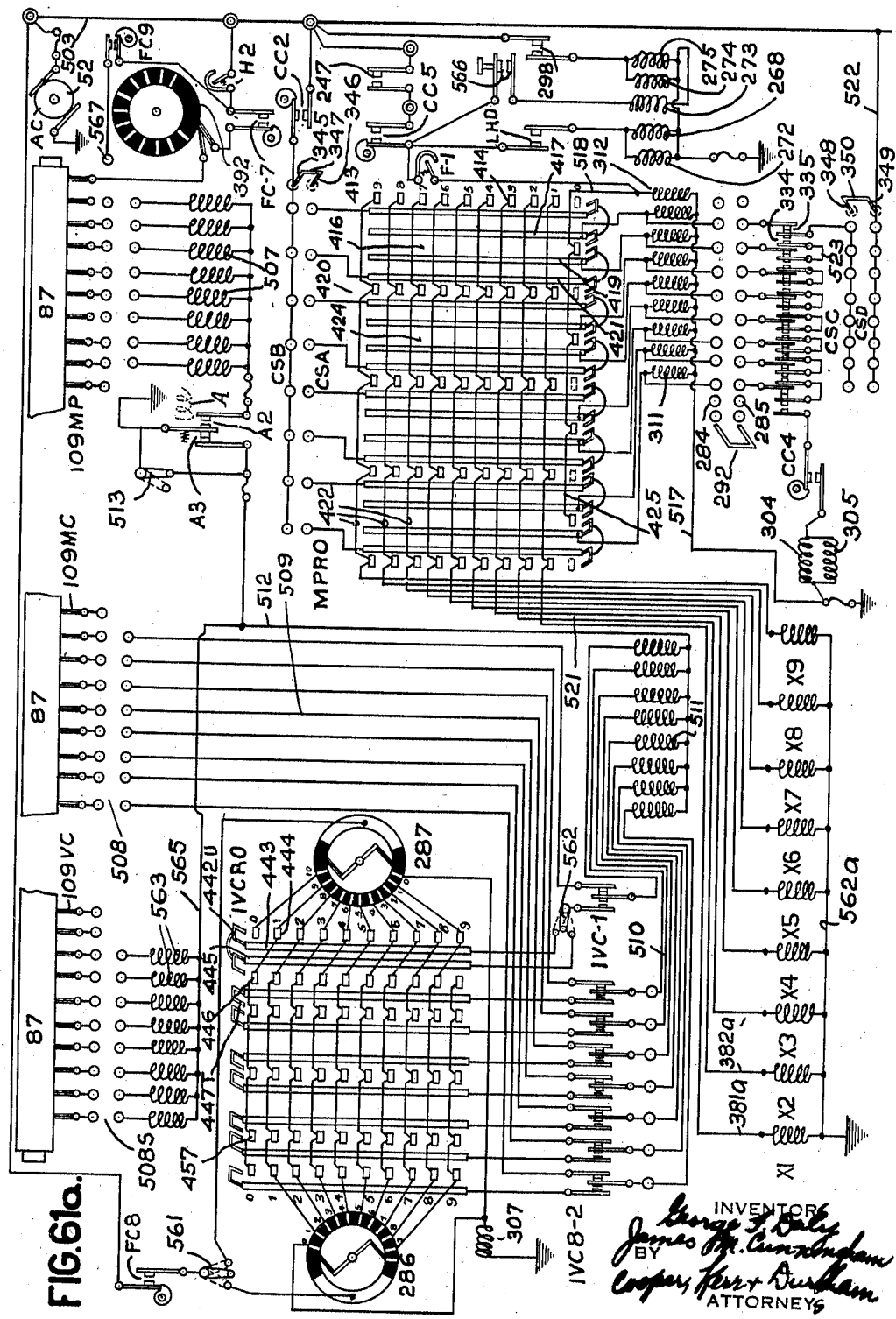

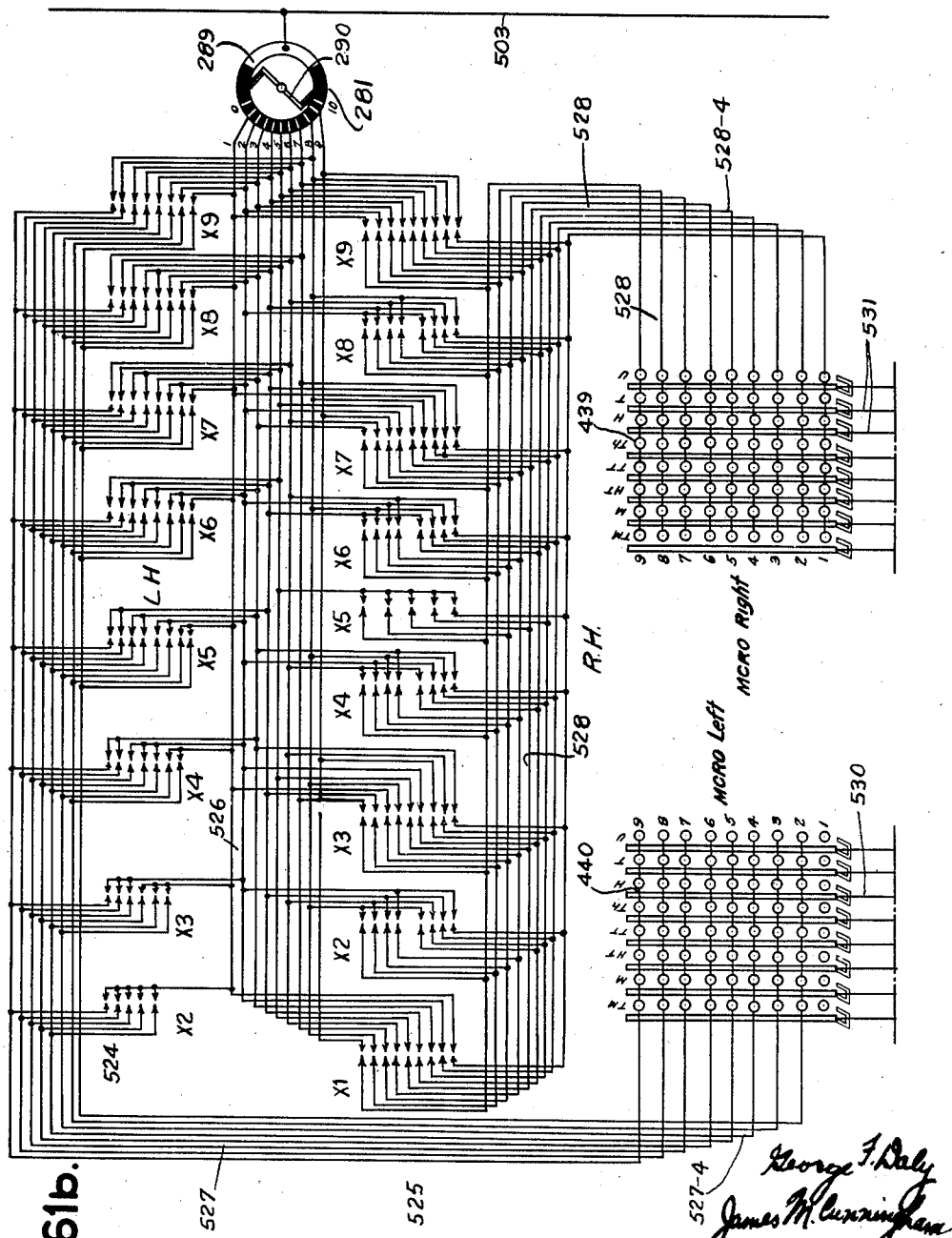

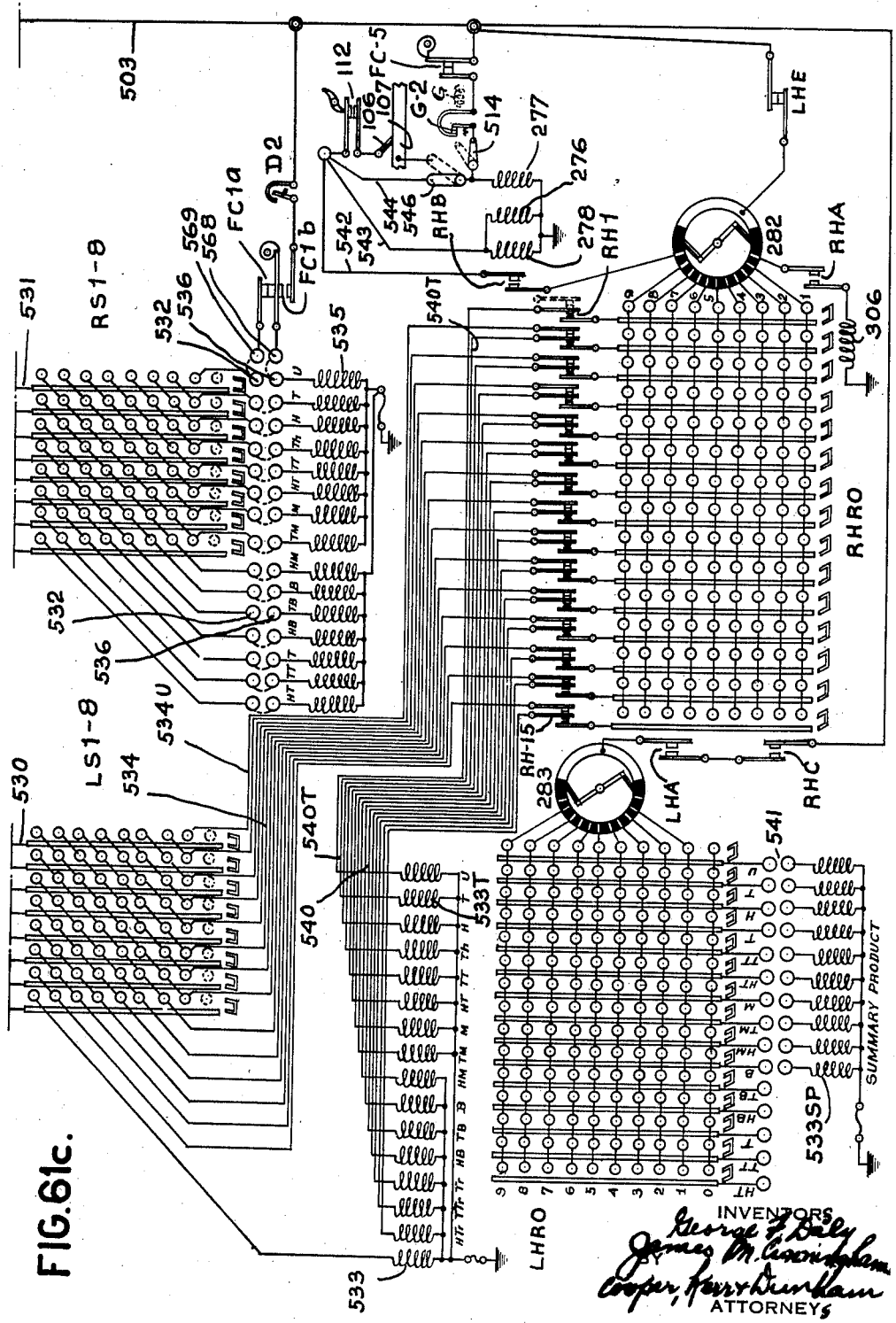

Oct. 26, 1937. G. F. DALY ET AL 2,097,145
RECORD CONTROLLED AND RECORD MAKING ACCOUNTING MACHINE
Filed Nov. 19, 1931 38 Sheets-Sheet 35

Oct. 26, 1937.　　　G. F. DALY ET AL　　　2,097,145
RECORD CONTROLLED AND RECORD MAKING ACCOUNTING MACHINE
Filed Nov. 19, 1931　　　38 Sheets-Sheet 36

Oct. 26, 1937.    G. F. DALY ET AL    2,097,145
RECORD CONTROLLED AND RECORD MAKING ACCOUNTING MACHINE
Filed Nov. 19, 1931    38 Sheets-Sheet 37

FIG.64.

Inventors
George F. Daly
James M. Cunningham
By Cooper, Kerr & Dunham
Attorneys

Oct. 26, 1937.   G. F. DALY ET AL   2,097,145
RECORD CONTROLLED AND RECORD MAKING ACCOUNTING MACHINE
Filed Nov. 19, 1931    38 Sheets-Sheet 38

George F. Daly
James M. Cunningham
Inventors

By
Cooper, Kerr & Dunham
Attorneys

Patented Oct. 26, 1937

2,097,145

UNITED STATES PATENT OFFICE 2,097,145

RECORD CONTROLLED AND RECORD MAKING ACCOUNTING MACHINE

George F. Daly, Johnson City, and James M. Cunningham, Endicott, N. Y., assignors, by mesne assignments, to International Business Machines Corporation, New York, N. Y., a corporation of New York Application November 19, 1931, Serial No. 576,184

18 Claims. (Cl. 235—61.6)

This invention relates to improvements in accounting machines and more particularly to a record controlled and record making accounting machine.

More particularly the present invention relates to machines of the type which are adapted to be controlled by perforated record cards from which the factor or factors of a to be performed computation are derived and upon which records computed product results are perforated.

More particularly the present invention relates to improvements of the machine shown and described in the copending United States application of James W. Bryce, George F. Daly and James M. Cunningham, Serial No. 554,490, filed August 1, 1931 and in the United States patent of James W. Bryce, No. 2,045,434.

One object of the present invention resides in the provision of improvements in the construction and arrangement of such machines (of the general type hereinbefore referred to) to the general end that the construction may be simplified, the operating characteristics improved and additional functions secured over those previously obtained.

Further objects of the present invention reside in the provision of an improved construction of machine which will provide for the improved concurrent reading in of multiplier and multiplicand factors from a card and also provide for the multiplication of such factors and for improvements in the subsequent punching of such product results by a successive column repetition type of the punching mechanism.

Another object of the present invention resides in the provision of a construction which will optionally provide improved and/or simplified means for the multiplying of a multiplier factor either by a single number or by a number which is the sum or difference of two other numbers which are entered into the machine.

A further object of the present invention resides in the provision of a construction which will provide for the use of detail cards containing multiplicand amounts with intervening rate cards, each containing a multiplier amount and to provide for the multiplication of the rate amounts from the multiplier or rate cards by the multiplicand amounts obtained from the detail or multiplicand cards of a group of cards. The multiplicand amounts from the detail cards may be either single amounts or amounts obtained as the sum or difference of two multiplicand components upon each detail card.

A further object of the present invention resides in the provision of a machine adapted for rate card operation (multiplication in conjunction with following groups of detail or multiplicand cards) in which provision is made for eliminating the punching of undesired zeros in the rate cards and in which provision is also made for affording regular zero punching in a detail card or cards which may succeed or follow a rate card in passage through the machine.

A further object of the present invention resides in the provision of an improved construction in which summation of products may be secured, all automatically by the operation of the machine.

Other incidental objects reside in the provision of an improvement in the construction of the machine to the general end that the summation products accumulator may be used for checking purposes for checking a number of multiplying computations and that more rapid machine operations may be provided during such checking.

A further object of the present invention resides in the provision of an improved cycle controller for controlling the column shifting devices and/or for eliminating unnecessary computing cycles by the machine.

A further object of the present invention resides in the provision of a cycle controller unit which is generally similar in its principle of operation to the cycle controller shown and described in the application of Messrs. Bryce, Daly and Cunningham, above referred to, and which incorporates improved features of construction that include roller clutch devices which generally improve the operation, durability and quietness of operation of the cycle controller section of the machine.

A further object of the present invention resides in the provision of an improved arrangement of drive for the card reading and card feeding section of the machine wherein constant drive for certain card feed rolls is provided operating the same in unison with the counter drive, and wherein an intermittent cam actuated picker drive and contact roll drive is provided.

A further object of the present invention resides in the provision of an improved driving mechanism for counters and/or entry receiving devices, an improved reset drive and controls therefor, an improved cycle controller drive and an improved card handling and reading section drive.

A further object of the present invention resides in an improved construction for the various commutator readout sections of the machine, including improved and simplified MP readout devices, MC readout devices, LH product readout devices, improved RH readout devices, improved inverting and/or adding accumulator readout devices and improved product-to-be-punched readout devices. In the foregoing readout devices, improved and simplified arrangements of commutator sections and brushes are provided which will permit interchangeable parts to be used with variable manners of assembly to suit the various units of the machine.

A further object of the present invention resides in the provision of a construction in which the sum or difference derived from a card may be perforated upon the record from which the two amounts which are added together or subtracted from each other by the operation of the machine are derived.

A further object of the present invention resides in the provision of improved means for overlapping various cycles of operation of the machine to the general end that operating time may be saved.

A further object of the present invention resides in the provision of improved controlling arrangements for various sections of the machine to the general end that erroneous or undesirable operations may be prevented.

A further and more detailed object of the present invention resides in improved controls whereby punching may be prevented from occurring at a premature or late time and in which card feeding of a following card into the punching section of the machine from the card reading section of the machine is controlled to prevent a new card being fed into the punching section of the machine before the punching apparatus parts are in position and in condition to receive such new card.

A further object of the present invention resides in the provision of improved control for correlating the action of a step-by-step successive column type of punching mechanism with a card feeding and reading section which delivers the cards into the punching section of the machine.

A further object of the present invention resides in the provision of an improved machine, particularly adapted for A. C. operation in most of the magnets of the machine with alternating current impulses supplied from an A. C. generator, which generator in addition is adapted to provide D. C. for such circuits of the machine which preferably require direct current.

A further object of the present invention resides in the provision of an improved arrangement of impulse emitters and controls and driving devices therefor.

Further and other objects of the present invention will be hereinafter set forth in the accompanying specification and claims and shown in the drawings, which by way of illustration show what we now consider to be a preferred embodiment of the invention.

In the drawings:

Fig. 4 is a sectional view taken through the card handling and card sensing section of the machine, the section being taken substantially on line 4—4 of Fig. 2 looking in the direction of the arrows;

Figs. 5 and 6 are detail views of the card feed roll which feeds the cards into the tray of the punching machine; Fig. 5 is an enlarged view of certain of the parts shown in Fig. 4 and Fig. 6 is a sectional view taken on line 6—6 of Fig. 5;

Figure 1:
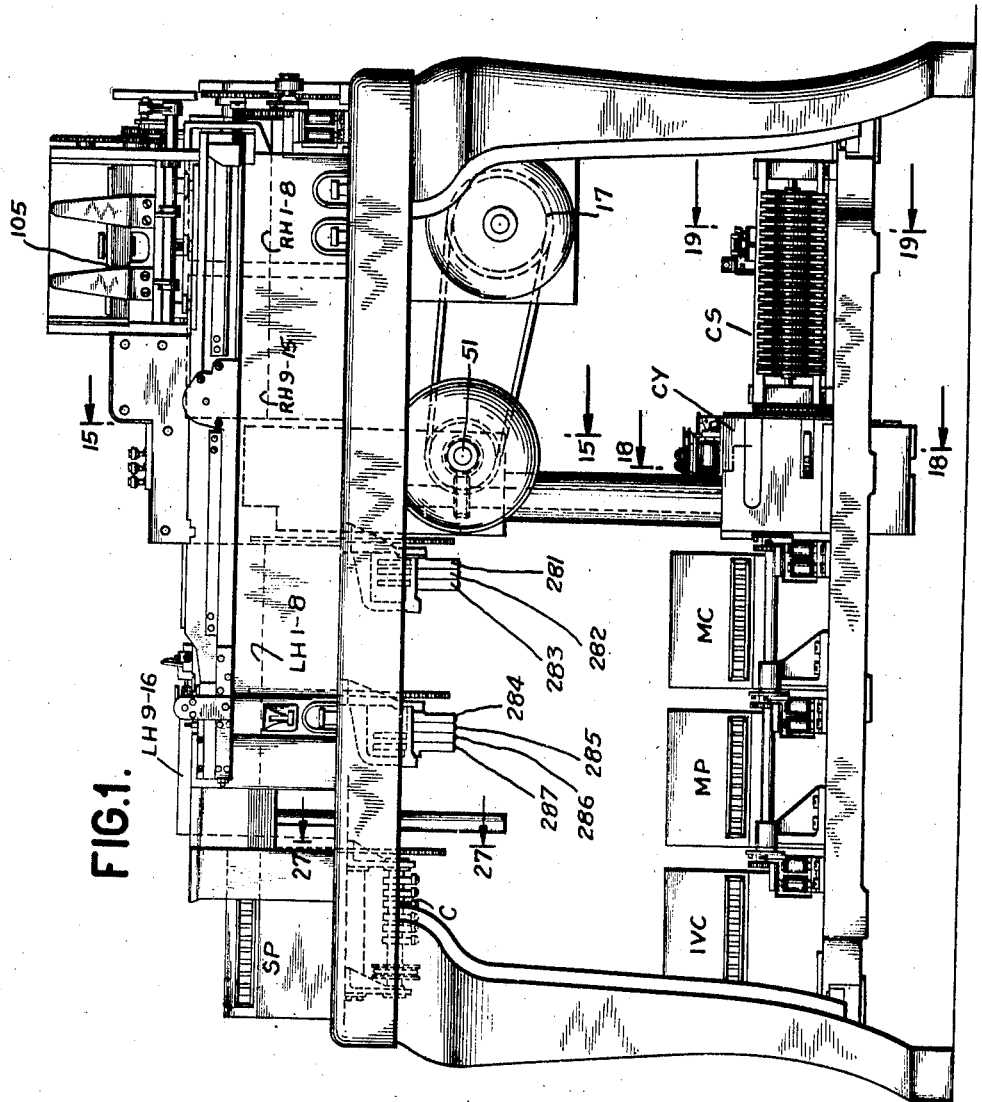
Figure 1 is a front elevational view of the complete machine.
Figure 2:
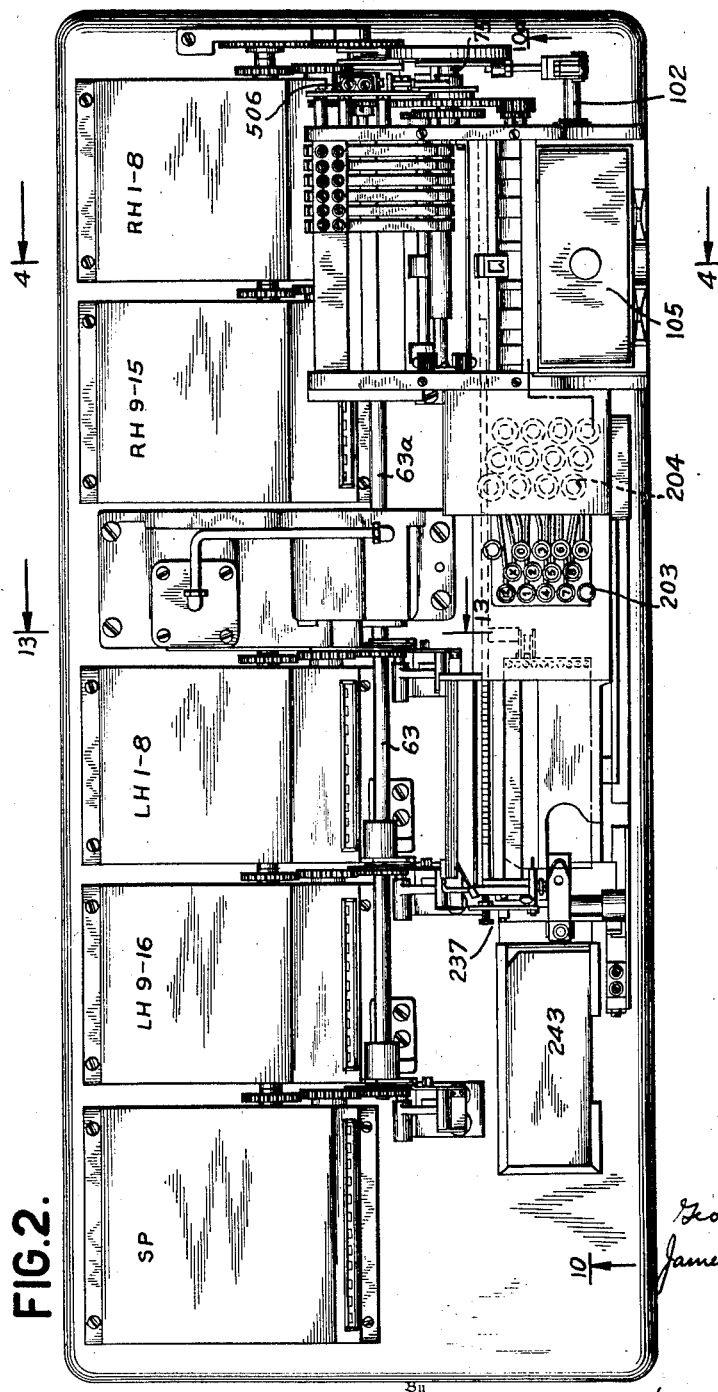
Fig. 2 is a top plan view of the machine.
Figure 12:
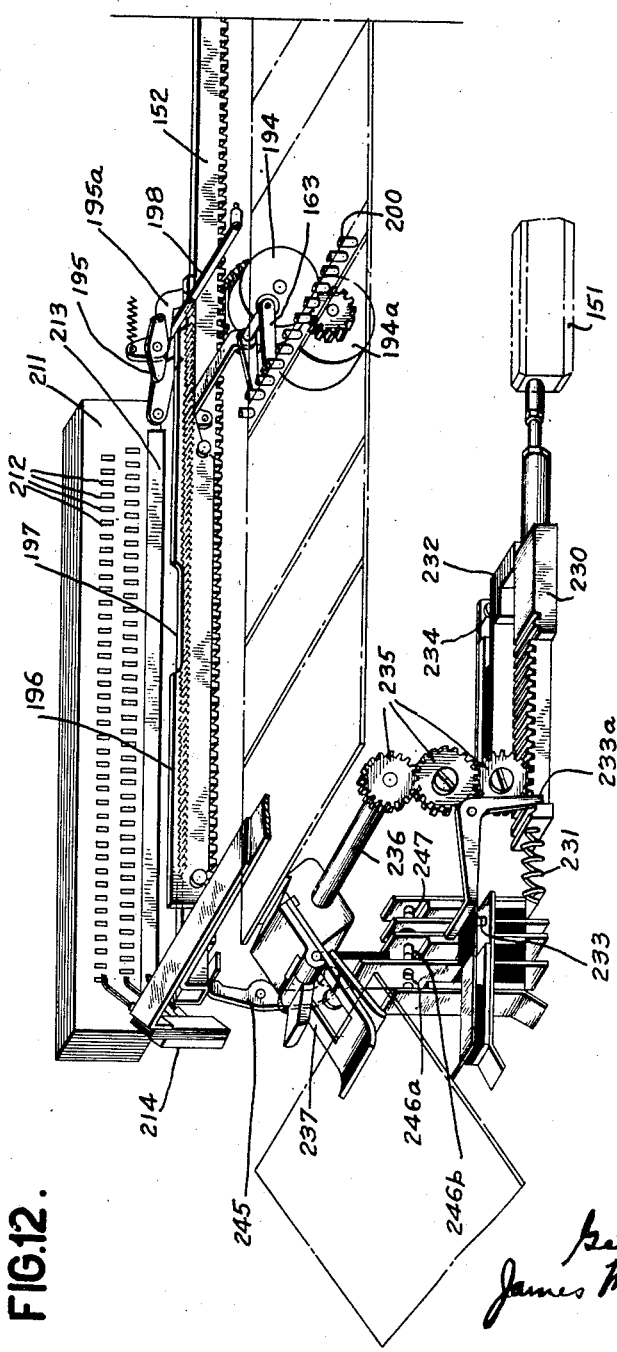
Figure 13:
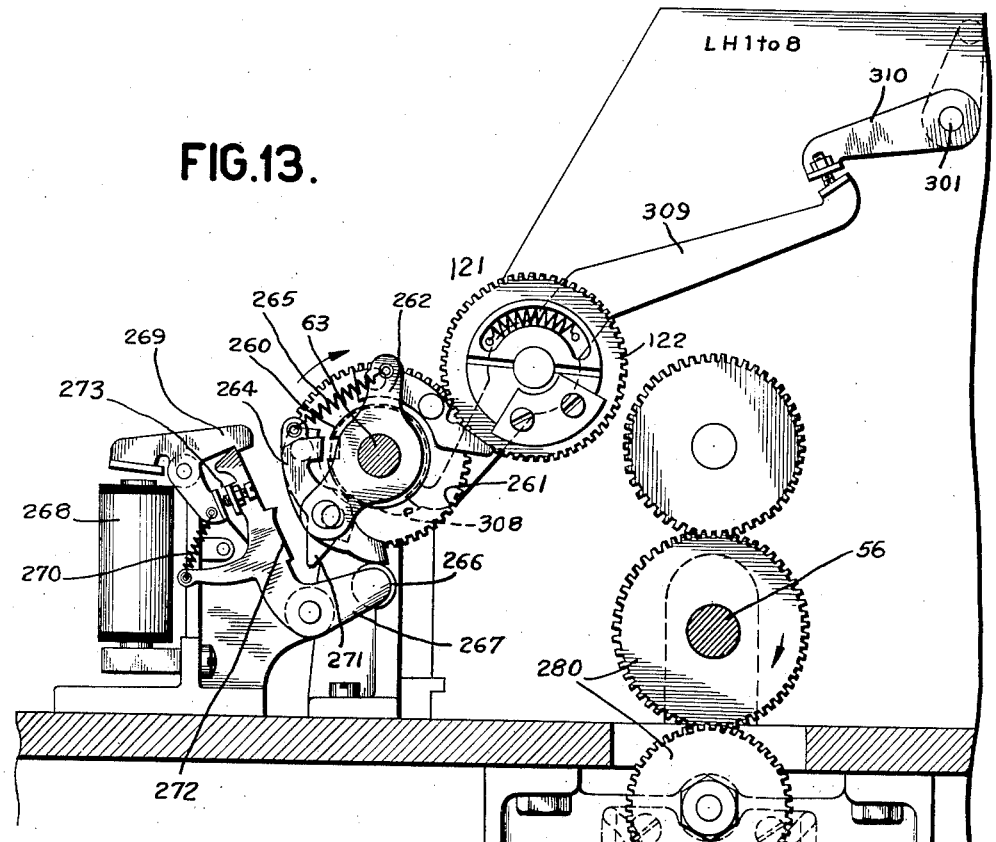
Figure 14:
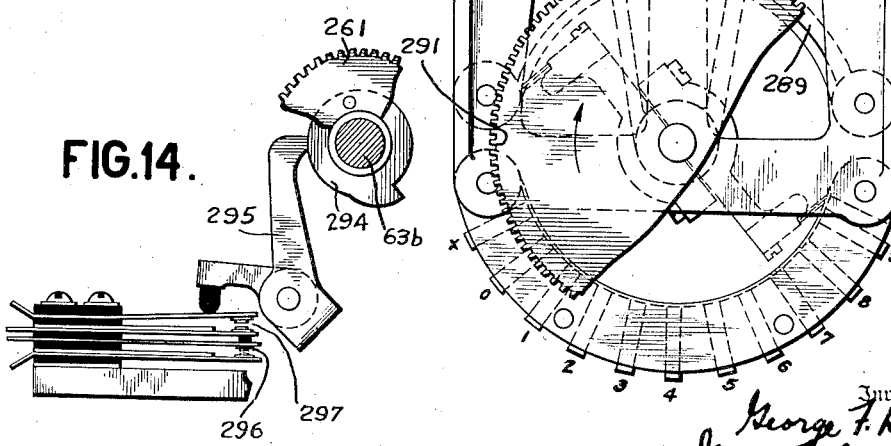
Figure 15:
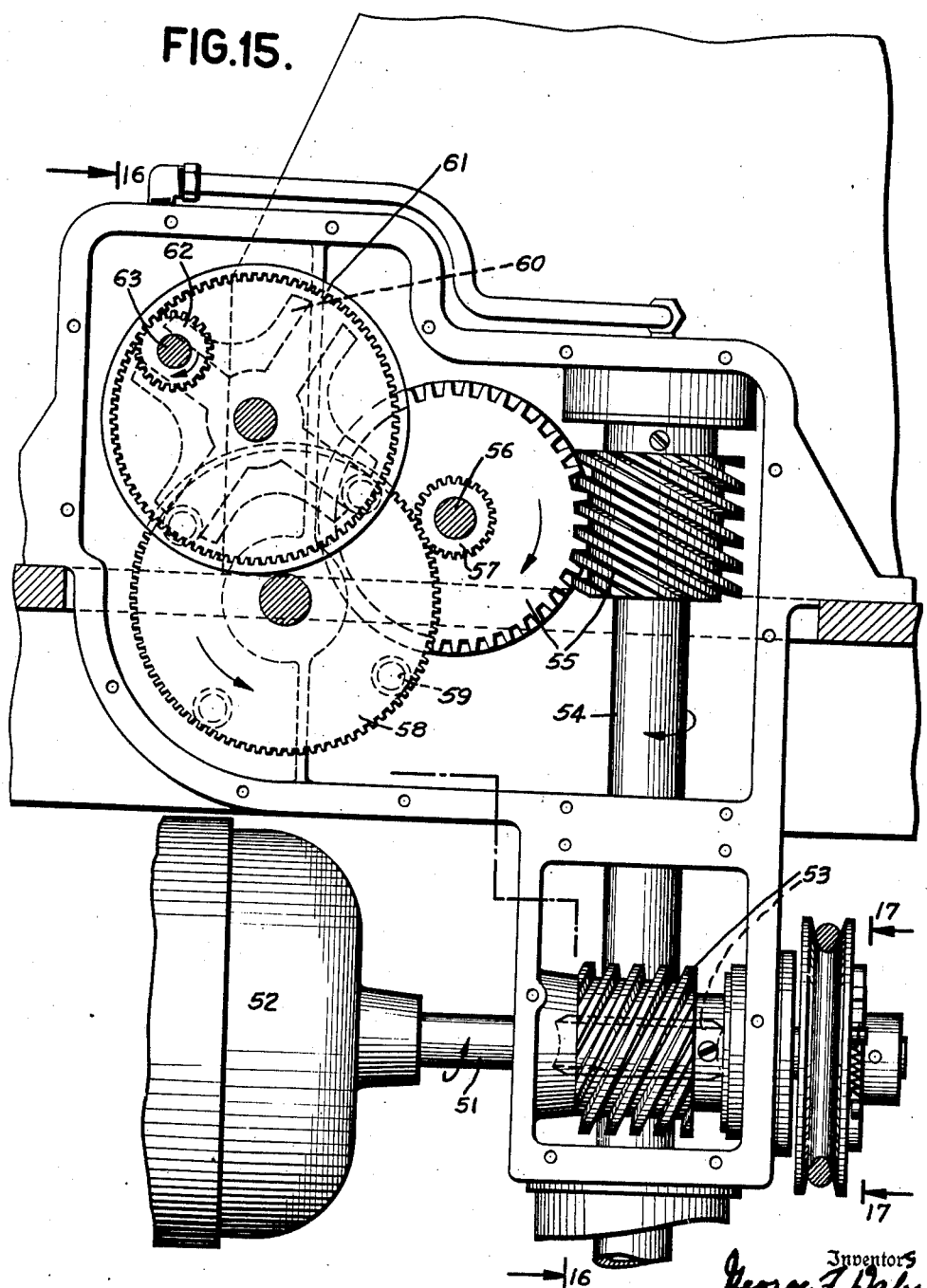
Figure 16:
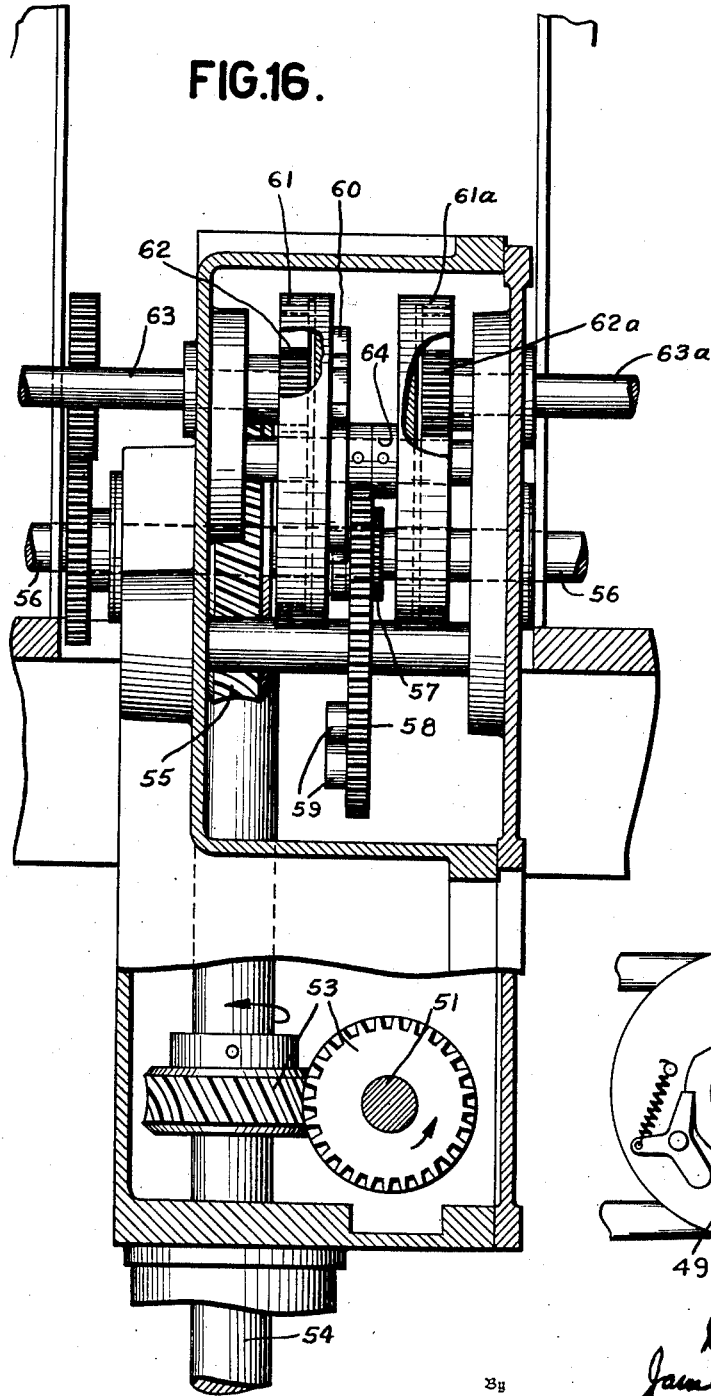
Figure 17:
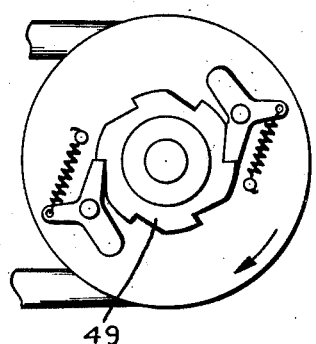
Figure 23:
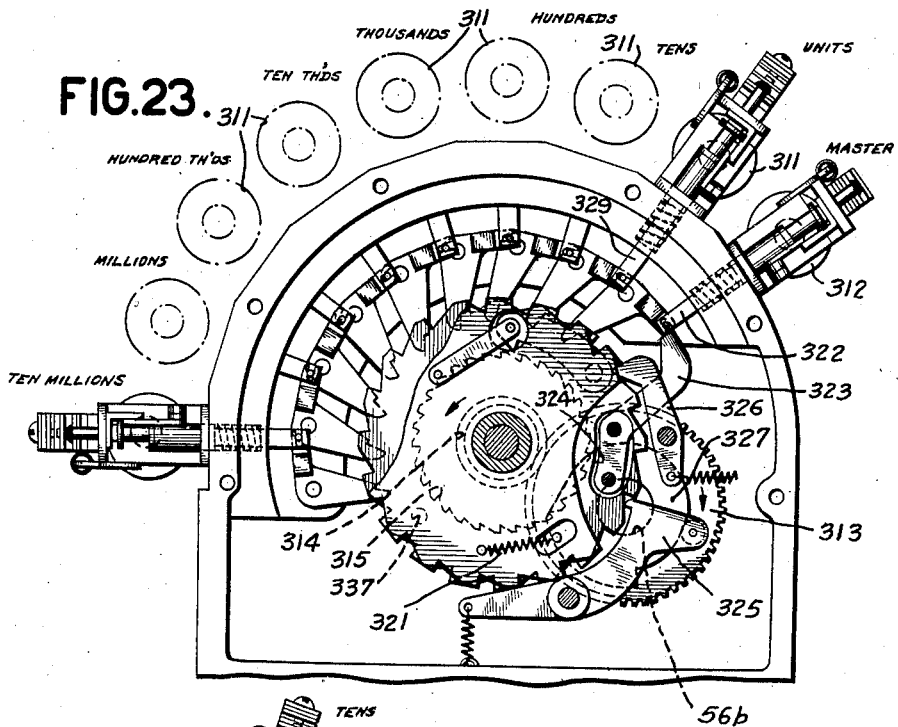
Figure 24:
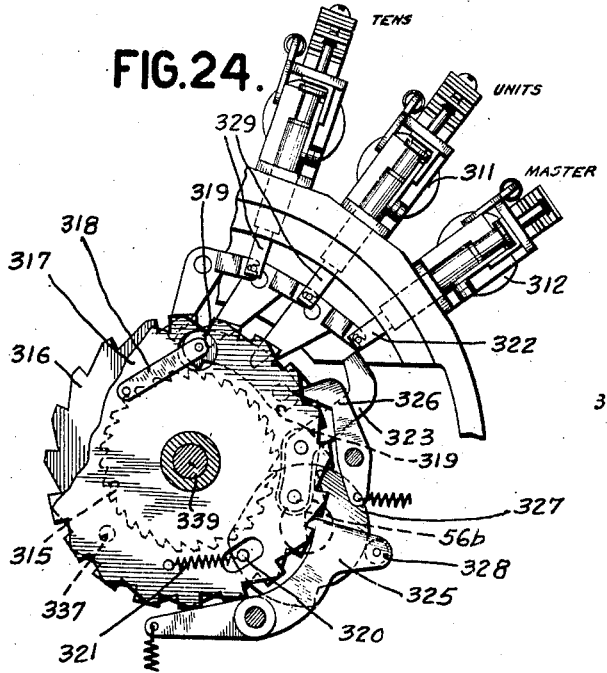
Figure 26C:
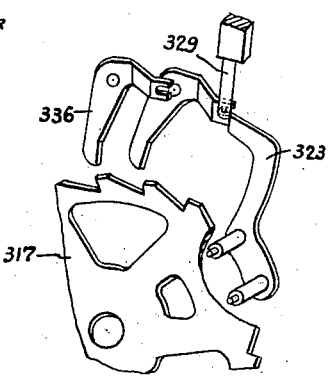

Figs. 7 and 7a taken together show an enlarged front elevational view of the punching section of the machine and a portion of the card handling mechanism. Certain parts of the housing are broken away to show the interior construction;

Fig. 8 is a positional view of the clutch parts shown in Fig. 7a;

Fig. 9 is a detail view of one of the controlling contacts used in the punching section of the machine, the view being taken substantially on line 9—9 of Fig. 7 and looking in the direction of the arrows. This contact is also shown on Fig. 12;

Figs. 10 and 10a taken together show a sectional view of the punching section of the machine, the section being taken substantially on line 10a—10a of Fig. 2;

Fig. 10b is a detail of a special interposer in the punching section of the machine and shows its cooperation with the associated parts;

Fig. 11 is an enlarged detail positional view of the card ejector mechanism of the machine. These parts are shown in a different position in Fig. 10;

Figs. 12 and 12a taken together show a diagrammatic view of the punching section of the machine with the cards in different positions therein and with the card feed racks and associated parts;

Fig. 12b is a detail of certain parts shown in Fig. 12a;

Fig. 13 is a sectional view showing the drive for one of the accumulators or receiving devices of the machine and showing certain of the reset drive parts and controls associated therewith and also showing the drive for one of the emitters of the machine;

Fig. 14 is a detail view showing certain of the controlling contacts associated with certain of the reset devices of the machine;

Fig. 15 is a sectional view showing the drive to the upper set of accumulators and receiving devices of the machine and also shows the reset drive. The section is taken substantially on line 15—15 of Fig. 1 and looking in the direction of the arrows;

Fig. 16 is a detail sectional view taken substantially on line 16—16 of Fig. 15 and looking in the direction of the arrows;

Fig. 17 is a detail view of the ratchet drive to prevent backing up of the drive of the machine. The view is taken substantially on line 17—17 of Fig. 15 and looking in the direction of the arrows;

Fig. 18 is a sectional view showing the lower drive mechanism of the machine, the section being taken substantially on line 18—18 of Fig. 1;

Fig. 19 is a sectional view showing the column shift mechanism of the machine and portions of the multiplier panel construction. The section is taken substantially on line 19—19 of Fig. 1 and looking in the direction of the arrows;

Fig. 20 is a detail sectional view taken substantially on line 20—20 of Fig. 18 and showing also a portion of the contacts with the multiplier panels removed and showing also the cycle controller switching mechanism and the drive therefor;

Fig. 21 is a sectional view of the lower drive, the section being taken substantially on line 21—21 of Fig. 20 but with multiplier panels in position over the contacts shown to the right in Fig. 20;

Fig. 22 is a positional view of the contacts on the cycle controller section of the machine and shown in Fig. 21 in a different position;

Fig. 23 is a detail sectional view of one embodiment of the cycle controller mechanism of the machine, the section being taken substantially on line 23—23 of Fig. 21;

Figs. 24, 25, 26 and 26c show the cycle controller parts in various displaced positions; Fig. 24 showing the cycle controller in the initial unlatching position; Fig. 25 showing the cycle controller with the parts in motion from one position to the next and Fig. 26 showing the cycle controller with the parts in de-clutching position when arrested; Fig. 26c is a perspective view showing the intercepting relation of certain parts when in the position of Fig. 26.

Figure 3:
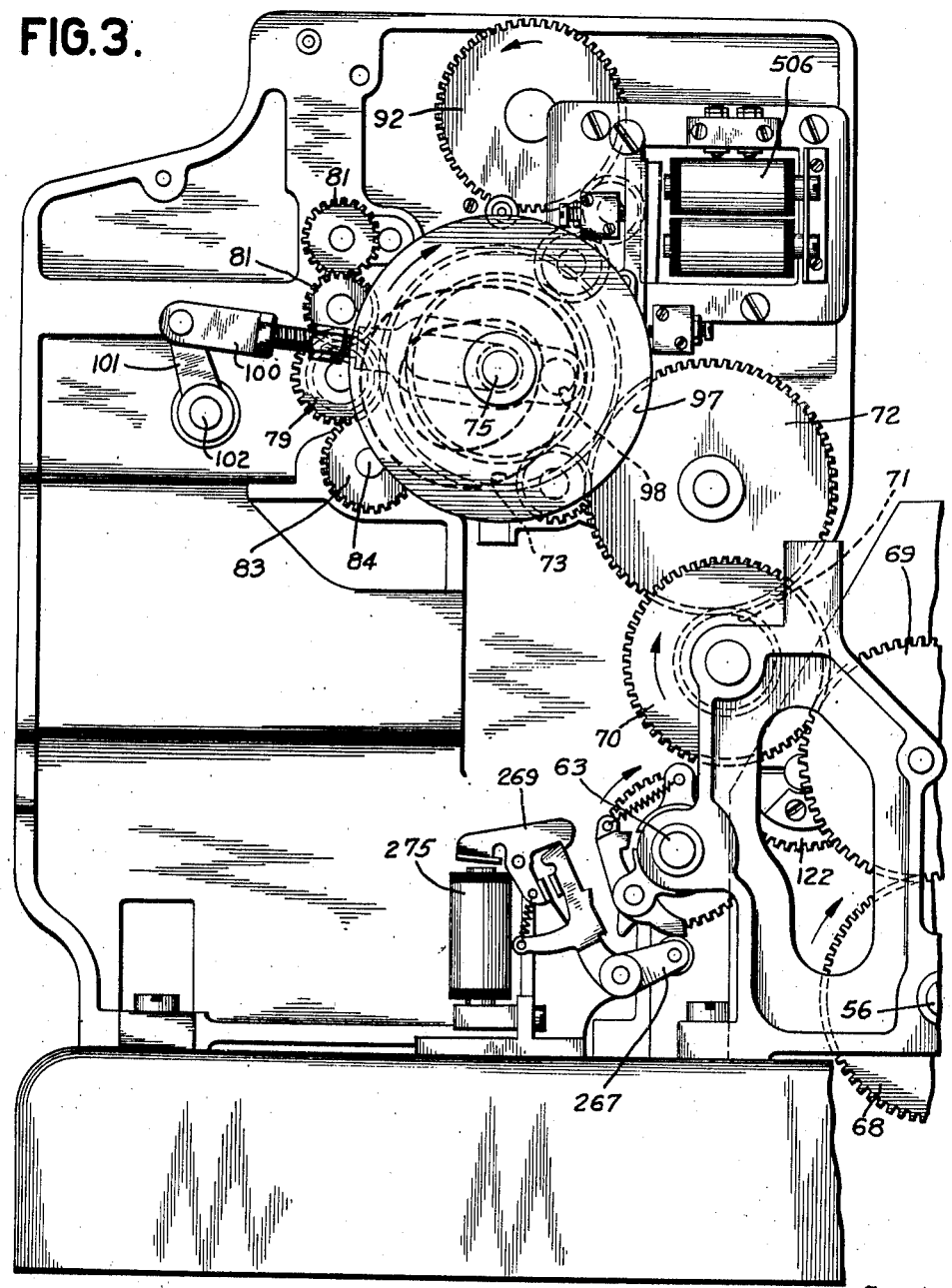
Fig. 3 is an end view of the machine taken from the right in Fig. 1 and looking towards the left.
Figure 29:
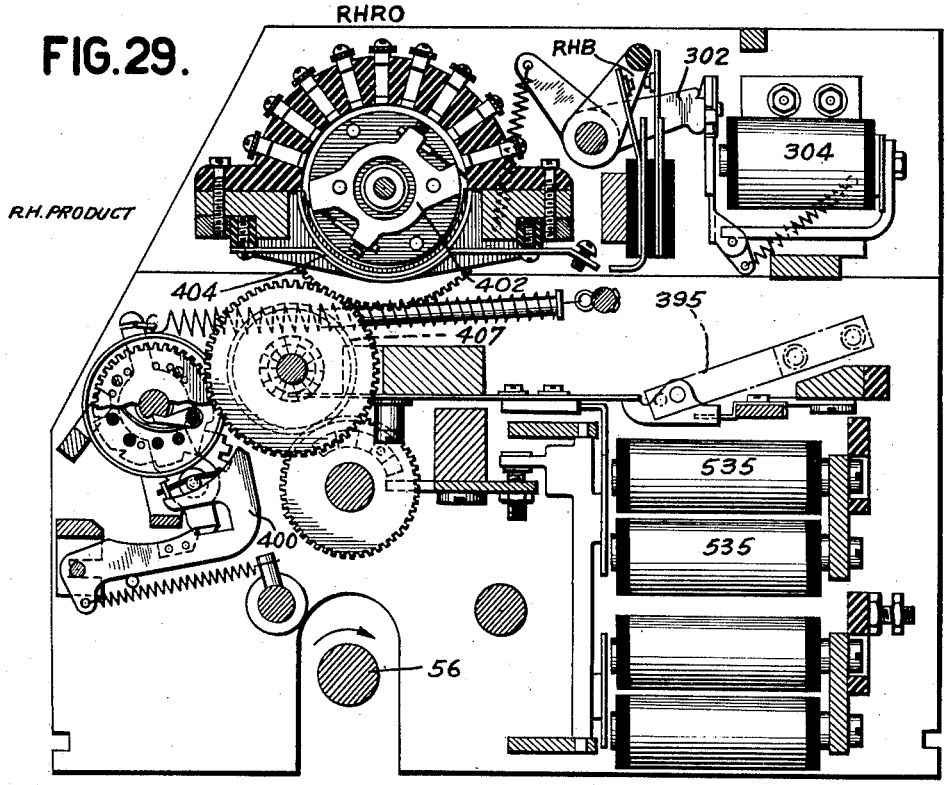
Figure 30:
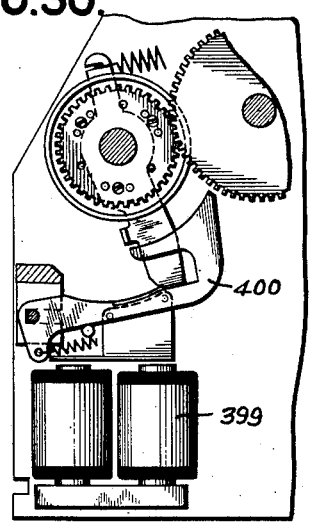
Figure 30A:
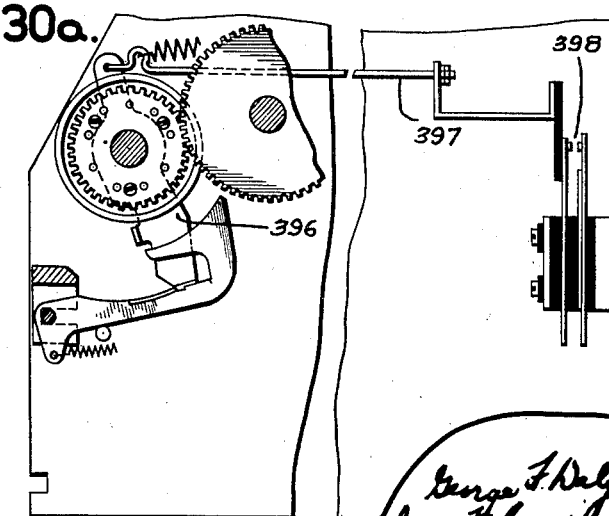
Figure 62:
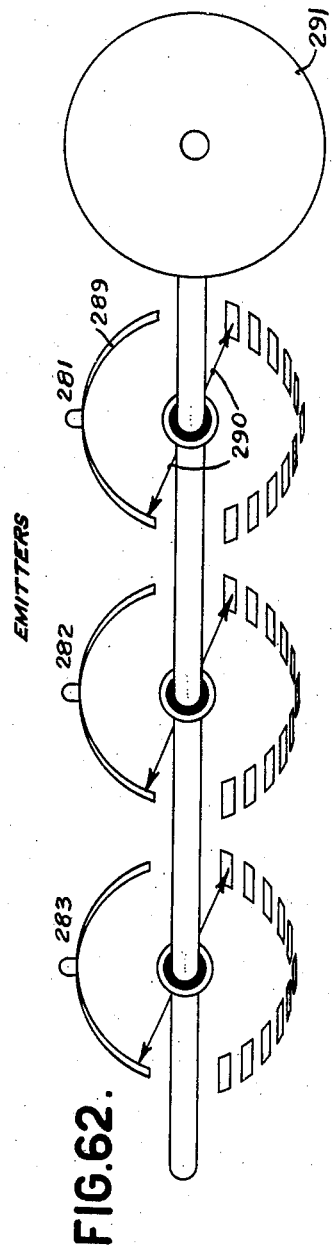
Figure 63:
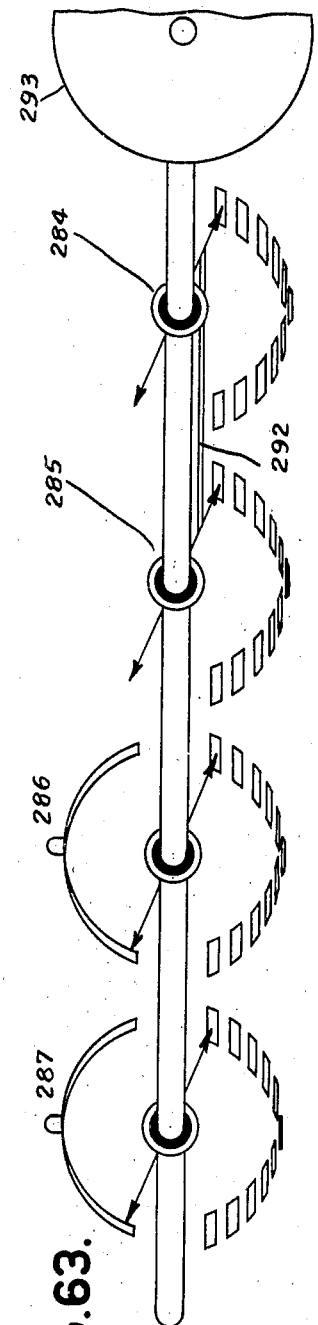
Figure 64D:
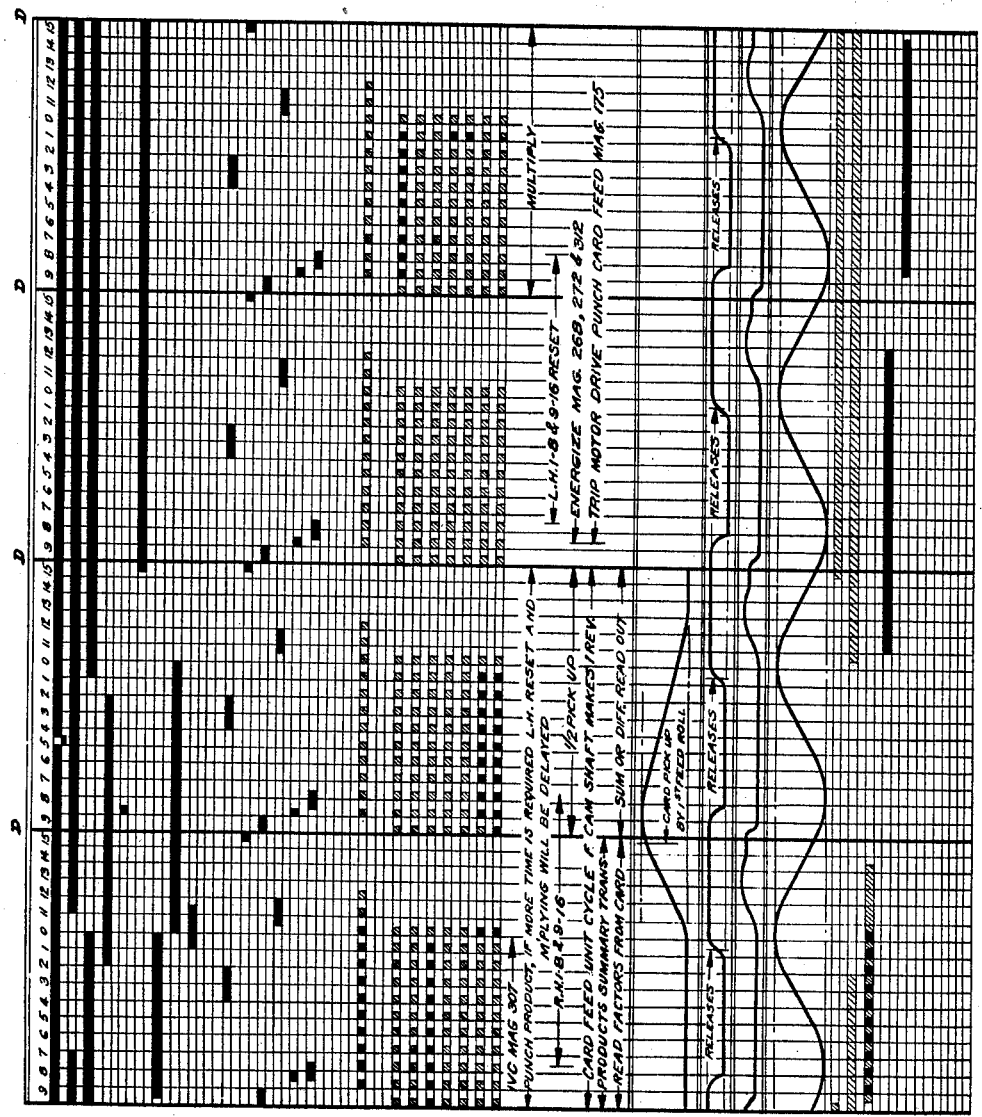

Figs. 26a and 26b are detail views showing another embodiment of cycle controller which is adaptable for use in lieu of the cycle controller shown in Figs. 23 to 26 inclusive. Fig. 26b is a sectional view taken on line 26b—26b of Fig. 26a;

Fig. 27 is a detail showing the drive for the cam contact devices of the machine, the view being taken substantially on line 27—27 of Fig. 1;

Fig. 28 is a front elevational view of this cam contact mechanism assembly, the view being taken substantially on line 28—28 of Fig. 27;

Fig. 29 is a typical sectional view showing one of the counters or the receiving devices of the machine;

Figs. 30 and 30a show the transfer mechanism for transferring from one accumulator to another to provide one large accumulator from two smaller accumulators or accumulating units;

Figs. 31 and 31a taken together show a somewhat diagrammatic view of various units of the machine and also show the train of the driving mechanism of the machine;

Fig. 32 is a view showing the card picker and contact roll clutch. This view is taken substantially on line 32—32 of Fig. 33;

Fig. 33 is a part sectional view of the card picker and contact roll clutch and associated parts. The section is taken substantially on line 33—33 of Fig. 32;

Fig. 34 is an elevational view of the driving gear train for certain cam contact devices of the machine. The location of this train is also indicated by dotted lines in Fig. 3;

Figs. 35 to 37 inclusive show the actuating devices for the multi-contact multiplier panel contact devices;

Fig. 38 shows an enlarged and elevational view of two of the multiplier panel contact units showing the bail operating mechanism for the contacts;

Fig. 39 is an enlarged detail view of certain anti-stutter contact controlling arrangements in the punch section of the machine;

Figs. 40, 41 and 42 show these contacts in various operative positions;

Fig. 43 is a diagrammatic view of the readout mechanism for the MP accumulator or receiving device of the machine. This view shows the commutator segments, the brush arrangements and the drive for the brushes from the clutch gears of the receiving device;

Fig. 44 is a sectional view of the commutator and brush construction of the MP readout device. This view is substantially a vertical section taken on line 44—44 of Fig. 45;

Fig. 45 is a top view of the MP readout device showing the wiring of the segments of this particular readout device;

Fig. 46 is a diagrammatic view similar to Fig. 43 but showing the readout devices for the RH accumulator units of the machine;

Fig. 47 is a sectional view of the commutator section and brush assemblies of this readout mechanism. The section being taken substantially on line 47—47 of Fig. 48;

Fig. 48 is a top plan view of this readout mechanism showing the transverse bus wiring therefor;

Fig. 49 is a diagrammatic view of the readout mechanism and the drive therefor which is employed for the MC accumulator or receiving device. A similar form of drive and readout mechanism is employed for the LH accumulator except that ten segment spots are provided in lieu of nine as shown in Fig. 49;

Fig. 50 is a sectional view of the MC receiving device, the section being taken substantially on line 50—50 of Fig. 51;

Fig. 51 is a top plan view of the MC readout devices showing the wiring. The LH readout device is of similar construction except that in lieu of nine segment spots, ten are provided;

Fig. 52 is a diagrammatic view of the inverter readout mechanism, the drive therefor and this figure also shows the wiring intermediate the two units order segments;

Fig. 53 is a sectional view of this readout mechanism taken substantially on line 53—53 of Fig. 54;

Fig. 54 is a top plan view of this inverter accumulator readout mechanism showing the bus bar connections intermediate the segments and the wiring of the different orders;

Fig. 55 is a diagrammatic view of the column selector switching mechanism of the machine;

Fig. 56 is an elevational view taken from the rear and showing the wiring for the column selector switching mechanism of the machine. This view is taken on line 56—56 of Fig. 19 looking in the direction of the arrows;

Fig. 56a is a sectional view of the column selector switching mechanism shown in Figs. 55 and 56, the section being taken on line 56a—56a of Fig. 19;

Fig. 57 is a perspective view showing the contact mechanism in the rear of the RH accumulator for orders 1 to 8 inclusive;

Fig. 58 is a view of similar contact mechanism in the RH accumulator for orders 9 to 15 inclusive;

Fig. 59 is a similar view of the contact mechanism in the LH accumulator of the machine;

Fig. 60 is a view showing the contact mechanism in the inverter accumulator of the machine;

Figs. 61a, 61b, 61c and 61d taken together show the circuit diagram of the machine. These views in being arranged together should be arranged in the order named, i. e. 61a at the top, 61b below followed by 61c and completed by 61d at the bottom;

Fig. 62 is a diagrammatic view showing one of the groups of emitters used in the machine;

Fig. 63 is a diagrammatic view showing another group of emitters used in the machine; and Figs. 64, and 64a taken together show a timing diagram of the machine.

Before describing the detailed arrangement of the machine a general description will be given of the various units and their location in the machine. The machine embodies a card feed and card handling and card analyzing section which is shown in the upper right hand corner of Fig. 1 and which is arranged to feed cards and derive readings therefrom and afterwards pass the cards into a punching section of duplicating punch type. Such duplicating punch is shown in the lower part of Fig. 2.

The accumulators and receiving devices of the machine are eight in number. Certain of these receiving devices are placed on a lower shelf of the machine as shown in Fig. 1. These receiving devices or accumulators include the MC receiving devices which are shown to the extreme right in Fig. 1, the MP receiving devices in a lower middle position and the IVC accumulator or receiving devices at the extreme left below. On the upper bed plate of the machine the other receiving device and accumulators are placed. In Fig. 2 these are shown as comprising the summary product accumulator SP to the extreme left and having adjacent to it the LH 9 to 16 accumulator and the LH 1 to 8 accumulator. In effect these two accumulators constitute one large accumulator being sub-divided in two units for simplicity of construction. To the extreme right upon the upper bed plate are placed the RH 9 to 15 accumulator and RH 1 to 8 accumulator which also together constitutes one large accumulator. Suitable driving mechanism is provided intermediate the parts of the upper part of the machine and the lower part of the machine and an independent motor drive is provided for the punching unit.

In the lower part of the machine is a unit designated generally CY which constitutes the cycle controller of the machine. To the right of the CY or cycle controller unit is a column shift unit of the machine which is generally designated CS. The machine also includes a number of emitter mechanisms and cam contact assemblages. Several sets of these emitters are disposed below the upper base of the machine as shown in Fig. 1 and also in this general position there is placed a cam contact assemblage, these being the C cams of the machine. The machine also includes a multiplier panel unit comprising a number of multiplier panels, which panel unit is disposed to the rear of the CS unit (see Figs. 1 and 31a). This unit will be generally designated PA in Fig. 31a.

*Machine drive*

The machine is adapted to be driven by a constantly running motor M (Figs. 31a and 1). This motor through a belt and pulley drive through a ratchet drive 49 (Figs. 17 and 31) drives a shaft 51 which shaft also drives an A. C. generator 52. This A. C. generator is adapted to produce the impulses for actuating the various accumulator and relay magnets of the machine and in addition is provided with a D. C. (direct current) take-off section. In other words, the A. C. generator is provided with both slip rings for taking off the A. C. impulses and commutators and brushes for taking off direct current.

Shaft 51 (see Fig. 31) also through a worm gear drive 53 drives a vertical drive shaft 54 which shaft drives the units in the upper section of the machine and the units in the lower section of the machine. The drive to the units at the upper section will be first described.

Referring to Fig. 31, shaft 54 through worm gearing 55 is adapted to drive the drive shaft 56 of the machine. The various receiving devices and accumulators are driven by gearing from this accumulator drive shaft in the customary manner (see United States patent to C. D. Lake, No. 1,822,594, dated September 8, 1931, Fig. 20, 260 in that figure being the accumulator drive). The drive for reset of the various receiving devices and accumulator units is effected in the following manner. Shaft 56 is provided with a spur gear 57 driving a gear 58 with a four to one drive ratio. Gear 58 has secured to it a Geneva disk 59 which is provided with four Geneva pins cooperating with the other or cross element of the Geneva designated 60. Secured to element 60 is an internal gear 61 which gear has cooperating with it a spur gear 62 mounted on the end of the reset shaft 63.

In the diagrammatic illustration on Fig. 31, Geneva pin carrying element 59 is shown as spaced from the gear 58. This is for simplicity and clarity of illustration. In actual construction (see Fig. 16) the Geneva pin elements 59 are directly carried by gear 58 and project laterally therefrom as shown in Fig. 16. The Geneva cross element 60 also has a shaft 64 which extends to another internal gear 61a similar to gear 61 and having cooperating with it an internal gear 62a similar to gear 62 which gear drives a reset shaft 63a for the units to the upper right part of the machine (see Fig. 31a).

The drive for the lower units of the machine is substantially the same as previously described, that is the shaft 54 through worm gearing 55b drives the lower accumulator drive shaft 56b. A similar Geneva drive 57b, 58b, 59b and 60b is adapted to drive an internal gear 61b, which in turn drives a pinion 62b mounted on the end of the lower reset shaft 63b. The lower accumulator drive shaft 56b also extends into and drives the CY cycle controller unit and from the cycle controller unit a train of drive extends over to the CS unit which will be hereinafter described in detail. Also disposed on the lower accumulator drive shaft 56b is a cam 65 which cam is adapted through a follower to actuate a cross shaft 67 and operate certain of the shifting mechanism for the multiplier panel unit contact assemblages as will be hereinafter described.

*Card feed and card handling unit drive*

Referring to Figs. 31a, 3 and 32 to 34 inclusive, shaft 56 at its extreme right hand end (see Fig. 31a) is provided with a gear 68 which through an idler gear 69 drives a gear 70 which through its shaft drives gear 71, which gear in turn drives a gear 72. Gear 72 in turn drives a gear 73 which is revolvably mounted on a bushing 74 (Fig. 33) surrounding a shaft 75. Gear 73 has also fixed to it one element 76 of a one revolution clutch, the complemental part of which comprises a pawl 77 carried by an arm 78 fixed to shaft 75. With the one revolution clutch engaged (brought about by energization of clutch magnet 506, Fig. 32) it will be understood that shaft 75 will rotate in unison with gear 73 and with the one revolution clutch disengaged 73 will continue its rotation and shaft 75 will remain stationary. Gear 73 also drives an intermediate gear 79 (Fig. 32) which in turn is fixed to a gear 80, which gear 80 drives a train of gears 81 fixed to the card feed rolls 82 of the machine (see Figs. 3 and 4). Also in train with gear 79 (see Figs. 3 and 32) is a gear 83, which gear constantly drives a drag roll shaft 84 having affixed thereto a pair of drag rolls 85 (see Figs. 4, 5, and 6).

It will be understood from the foregoing that the card feed rolls 82 and the drag rolls 85 constantly rotate at all times during the operation of the machine when the driving motor is in operation.

The drive of the parts from the intermittent element of the one revolution clutch will now be described.

Referring again to Fig. 33, shaft 75 has secured to it a gear 86 and also secured to shaft 75 is a card transfer and contact cylinder 87 (see also Figs. 4 and 31a). As shown in Fig. 32 the one revolution clutch element 76 is provided with two notches and the arrangement of this clutch is such that whenever the pawl 75 is engaged the element 76 of the one revolution clutch will make one complete rotation. Accordingly, whenever the one revolution clutch is engaged the card transfer cylinder 87 will make one complete revolution. The one revolution clutch pawl 77, however, can be engaged in either of the two notches of the clutch element 76. This relation of one revolution clutch parts is provided because one machine cycle is required to traverse the cards past the sensing brushes cooperating with the transfer and contact cylinder 87 and another machine cycle is required to deliver the card to the punching station of the machine.

*Drive to intermittently actuated contacts*

Gear 86 previously mentioned as being fixed to shaft 75 drives a gear 90 (Figs. 34 and 31a), which gear in turn drives an idler gear 91, in turn driving a gear 92 fixed to a shaft 93. Shaft 93 has secured upon it a number of cam contact devices which are generally known as the FC group of cams of the machine. The arrangement of these cam contacts is such that they make one revolution per card feed cycle in contradistinction to a machine cycle. Fixed to the shaft of gear 90 is a card feed roll 94 (Fig. 4) which is spring pressed into contact with the card transfer and contact cylinder 87. A similar card feed roll 95 is also spring pressed into contact with the transfer and contact cylinder 87 and this roll 95 is driven by a gear 96 in train with gear 86 (see Figs. 34 and 31a).

It may be here mentioned that feed rolls 94 and 95 are preferably made of insulating material inasmuch as they at times contact with the transfer and contact cylinder 87 which receives current.

*Card picker drive*

Referring again to Figs. 33 and 31a, shaft 75 at its extreme end has secured to it a box cam 97, which box cam has a cam follower 98 cooperating therewith. The cam follower is mounted on an arm 99 which is bifurcated to straddle shaft 75 (see Fig. 3) and 99 in turn connects to a link member 100 which extends to an arm 101 fixed to a rock shaft 102 and which rock shaft carries gear sectors 103 (Fig. 4) in geared engagement with the picker blocks 104. By engagement of the one revolution clutch, the picker is called into action and advance of the picker withdraws a single card from the card magazine 105 and advances this card into the bite of the rolls 82. Intermediate rolls 82 and the transfer and contact cylinder 87 there is provided an advance card or X sensing station which comprises a brush 106 cooperating with a combined contact and card guide plate 107 (see Fig. 4). After traversing the advance sensing brush 106, the advancing card passes between a curved card guide 108 and transfer cylinder 87 and is carried around by the forward rotation of the transfer cylinder and by the rotation of roll 84 so as to be traversed under the main card sensing brushes generally designated 109 in Fig. 4. Also in cooperation with the card are pivoted card levers 110 and 111. 111 has a tail portion arranged to bear on the upper surface of the card and 110 is disposed at the end of the card transfer cylinder and presses outwardly from below the card. With a card in position under the tails of these card levers, card lever contacts 112 and 113 will be closed. These card lever contacts 112 and 113 are arranged to close at different times in the cycle as will hereinafter be described and as will be apparent from Fig. 4.

After the card has been sensed by main sensing brushes 109 it is advanced by the cooperation of feed rolls 95 with the transfer cylinder 87 between two card guiding members 114 and 115 (Fig. 4) (see also Figs. 5 and 6) and while between these guiding members the card is advanced in cooperation with the drag rolls 85, the drag rolls 85 extending downwardly into recesses in the lower guide member 114. Such recesses are shown at 116 in Fig. 6. This arrangement of drag rolls and recesses provides for a gripping of the card and an advance of the card after it has been released by roll 95 so that the card may be delivered into the tray of the punching section of the machine. The drag rolls 85 deliver the card under a guide member 117 (Fig. 4) and after the card has been freed from the drag rolls the card is flipped down into the tray of the punching section of the machine. In Fig. 4 the tray is generally indicated at 118. A card lever 119 is also provided adjacent the tray portion 118, this card lever is arranged to close card lever contacts 120 when a card is lodged in the tray of the punching section of the machine (see also Fig. 12a).

The foregoing description has described the manner in which a card is withdrawn from the supply magazine 105 and the manner in which the card is carried past the advance sensing brush or "X" 106, the main sensing brushes 109 and the manner in which the card is delivered into the punching section of the machine. With the traverse of the card past the sensing brushes the amount of the multiplier and multiplicand will have been read from the card and entered into the MP receiving device and into the MC receiving device and into the inverter accumulator if such inverter accumulator is used.

The multiplier receiving device MP, the MC receiving device and the inverter accumulator so far as accumulator parts are concerned, are of the usual type customarily used in tabulating machines and are provided with electromagnetically actuated clutches. The readout mechanisms of these devices are, however, of special construction and will be subsequently described.

The carrying out of computations by the machine will be subsequently described in connection with the description of the circuit diagram, but before such operation is described, a description will be given of the punching section of the machine. It may be explained, however, that the machine is adapted to carry out a computation from factors derived from a card and deliver the card into the punching section of the machine, and after the card is in such punching section, the punching mechanism of the machine punches back on the card certain data obtained as a result of the computation.

Punching mechanism

In general the punching mechanism is of the successive column acting repetition punching type.

In general this punching mechanism is of the form shown in Lee and Phillips United States Patent No. 1,772,186 and also of the form shown in copending application of Lee and Daly, Serial No. 391,874, filed September 11, 1929. Certain features of the punch are also shown and more fully described in the patent to George F. Daly, No. 1,950,485, dated March 13, 1934. Other features of the punch are shown in patents to Schaaff No. 1,803,979, dated May 5, 1931, and No. 1,821,078, dated September 1, 1931. In general it may be stated that the punching mechanism is adapted to receive a record card in the receiving tray 118 as shown in the isometrical view (Fig. 12a), R designating the card in the receiving tray in this position. In such position the record card is in the proper position to be engaged by a pusher 150 mounted on a bracket 248b which is carried by card feed rack 151. On the movement of the card feed rack 151 to the left from the position shown in Fig. 12a the card is transferred by the pusher and card feed rack to an intermediate dotted line position R—1 (Fig. 12a). After the card reaches the R—1 position its further movement through the punching mechanism of the machine is effected by a card carriage rack 152 which has a suitable pusher finger 163 (see also Fig. 12) attached to an arm carried by rack 152. The punching unit of the machine is provided with a separate driving motor M—2 (Figs. 7a and 10a). This motor M—2 through a shaft 153 drives a worm drive 154 which is adapted to drive a shaft 155 (see also Fig. 12a), one end of which has secured thereto a ratchet shaped clutch element 162. Loosely mounted on shaft 155 is a gear 155a meshing with teeth on the underside of rack 151 and to which gear 155a is secured a disk 164. Pivoted on disk 164 (see Fig. 12a) is a member 166 provided with a clutch tooth 167. Alongside of member 166 is another member 166b lacking the clutch tooth. On 166 is a pin 166c overlying an arcuate surface of 166b. The free end of member 166b is connected to a toggle member 168 by a link 169, member 168 being pivoted upon disk 164 at 170. The opposite end of 168 remote from its pivot 170 is connected to a spring element 171. The action of spring 171 is such that it tends to hold clutch tooth 167 out of engagement with the clutch teeth of clutch ratchet 162 or allow it to engage when 168 is shifted.

For the purpose of effecting the clutching action a magnet 175 (Figs. 7a and 8) is provided and this magnet when energized attracts an armature 176 so that an arm 177 will engage a pin 178 upon part 166b depressing it, allowing 166 to descend so that the tooth 167 engages with the ratchet wheel 162. This action shifts the parts from the position shown in Fig. 7a to the position shown in Fig. 8. The spring 166d connected to part 166, acts to hold the clutch tooth in engagement with the ratchet teeth. Gear 155a will thereupon be driven in a counterclockwise direction substantially a single revolution, thereby shifting rack 151 to the left. It may be also mentioned that when magnet 175 is energized, an arm 177b (Fig. 10a) will close contacts 515, such contacts being latched closed by a latch 516. Latch 516 is tripped to allow the contacts to reopen by a knock-off 516a carried upon the back of gear 155a (see Fig. 12a).

At the termination of the counterclockwise movement of gear 155a tails 179 of parts 166 and 166b (Fig. 8) will strike a projection 180 of a fixed plate 181 to effect the disengagement of the tooth 167 from ratchet wheel 162 by a reversed action. This action will also restore toggle member 168 to its normal position as shown in Figs. 7a and 12a. The mechanism just described is fully described in the copending application of George F. Daly, Serial No. 461,993, filed June 18, 1930.

Gear 155a has inter-meshed with it a gear 182, which gear is driven by the usual coil spring in spring barrel 183. Such coil spring is the type customarily used in machines of this class and comprises a suitable spring barrel with the coil spring inter-connected to one end and also inter-connected to gear hub 182. Gear 182 also inter-meshes with the gear of the conventional governor device generally designated 183a.

Upon disengagement of the one revolution clutch 167, previously referred to, the rack 151 will return to the right under the influence of the coil spring 183. Gear 155a and disc 164 which carries clutch parts as 166, are also rotated counterclockwise as the rack is returned to the right. The previous movement of the rack 151 to the left has carried a record card from the R position to the R—1 position.

The driving train to the card carriage rack 152 will now be described. Rack 151 has its upper teeth inter-meshed with a gear 184 and the gear 184 is suitably supported for rotation and is fixed to a member 185 having a single tooth in the plane of a pawl 186 pivoted to a plate 187 fixed to shaft 188. The opposite end of shaft 188 has a gear 189 meshing with the card carriage rack 152.

To control the clutching of the clutch device (i. e. the action of pawl 186 with member 185, see Fig. 12b) a camming element 190 is provided pivoted at 191 to the frame of the machine. This camming element 190 cooperates with the pin or roller 190a on the tail of the pawl 186. Rack 151 near its left hand end has fixed to it a block 192, which block is adapted to cooperate with another pin 193 carried by the pivoted camming element 190. With the rack 151 in extreme right hand position (see Figs. 7a, 12a and 12b) pawl 186 will be disengaged from the clutch element 185. Such disengagement being effected by the rocking of 190 in clockwise direction, its camming surface cooperating with the pin or roller 190a on pawl 186. 185 is fixed to gear 184 and accordingly, during the initial movement of 151 to the left the block 192 will clear the pivoted camming element 190 allowing a slight counterclockwise motion of it so that 186 under spring action may rock counterclockwise about its pivot so as to engage in the notch of 185. Thereafter drive will come from 151 through gear 184, through member 185 to pawl 186 fixed to part 187, which in turn is fixed to shaft 188 so that a clockwise rotational movement will be imparted to 188. This action through gear 189 will traverse the card carriage rack 152 to the right. The card carriage rack 152 will thus be shifted to extreme right position permitting the card pushers 163 to ride the surface of the card disposed under it and ultimately engage back of the trailing edge of the card at the R—1 position. Rack 152 has associated with it a spring driving device comprising a spring barrel with associated governors, the spring drive being generally designated 194 and the governor 194a. These parts are similar to those conventionally used in machines of this class. The rack 152 has also associated with it an escapement mechanism 195 having a dog 195a. This escapement is of the general type shown in Schaaff United States Patent No. 1,426,223 dated August 15, 1922 and such escapement mechanism is also described in the Lee and Phillips patent above referred to. Removably secured to the card carriage rack 152 is a skip bar 196. This skip bar is of the general construction of the skip bar shown in the Lee and Phillips patent (see Fig. 28) and fully described therein, but differs in that the skip bar is provided with a notched portion 197 according to the location and length of this notch a skip lifter lever 198 is allowed to descend or remain in elevated position. According to certain embodiments of the present invention, a multiplicity of notches 197 may be provided in the skip bars for certain special operations. When the skip lifter lever drops in the notch 197 it allows dog 195a of the escapement mechanism to cooperate with the mechanism of the rack 152. It will be understood that with the skip lifter lever 198 riding on the top of the skip bar 196 that the escapement will be disabled so that the card carriage rack can traverse without stopping at each card column until the notch 197 (or until a second notch) is encountered. Thereafter an intermittent motion of the card carriage follows under spring action and this intermittent action is controlled column by column and under the control of the escapement mechanism until the skip lifter bar is again elevated by riding out at the end of the notch in the skip lifter bar 196.

It will be understood that skip bars of different configuration with notches 197 of different lengths and in different locations can be placed on the card carriage rack and in this way the intermittent motion and punching action can be brought about at a selected point or points on the card according to the conformation of the skip bar.

It will be understood that with the above described skip bar construction that after the card is in the R—1 position (Fig. 12a) and engaged by the pushers 163 of the card carriage rack 152 that immediately thereafter, the card will be traversed with a continuous motion to the left until the skip bar notch 197 comes into action to stop the card carriage. The card carriage will then be in the position for the beginning of punching.

The punching mechanism need not be fully described as it is set forth fully in the Lee and Phillips patent above referred to.

Certain differences of construction are herein shown which will be fully described subsequently.

In brief the punching mechanism comprises a set of punches 200 (Fig. 10a) which punches are adapted to be depressed to perforate the card by the action of interposers 201 and by an operating bail 202 pivoted at 202a (Fig. 10a). The interposers 201 are selectively thrust forward to bring about punching action either by means of the keys 203 or by the energization of punch selector magnets 204. Bail 202 is magnetically operated by means of a punching magnet 205. The connections to bail 202 from the armature of the punching magnet 205 are shown in Fig. 7a and are generally designated 206. Energization of magnet 205 is effected alternatively either by interposer action or by a relay action. Under interposer action a bail 207 is adapted to be rocked upon the thrusting forward of any of the interposers. Rocking of the bail 207 through a link 208 is adapted to close contacts 209 (Fig. 10a) and bring about an energization of magnet 205. As is customary in machines of this class the contacts 209 immediately open after the magnet 205 has attracted its armature and brought about a punching operation. The alternate manner of control of the operation of bail 207 is as follows: through a suitable circuit, to be hereinafter described in connection with the circuit diagram, magnet 205 is energized. This magnet through the linkage generally designated 206 (Fig. 7a) through an arm 207a places a downward pressure upon 207 elevating link 208, closing contacts 209. This takes the control of the punch magnet 205 over to the contacts 209 which then function in the normal way to immediately open up. The relay circuit to the magnet 205 is then rendered ineffective. The reason for the supplementary control in the punching device is to provide for escapement action when no punch selector magnets have been energized. It may be explained that in punching devices of this character there is an extra interposer 201a (Fig. 10b) which is the interposer associated with the space key of the machine. This interposer it will be noted lacks the notch at its forward end which notch is present with the other interposer 201 shown in Fig. 10a. Accordingly, such space key interposer 201a will cause operation of the escapement mechanism by means of part 203b (see part 132 of Lee and Phillips Patent No. 1,772,186, Fig. 6).

The foregoing supplementary interposer construction is provided to provide for escapement action in the machine even when no punching is to be effected, that is, when the card is to be traversed over a multiplicity of columns without punching in intermediate columns.

Referring to Fig. 12, disposed alongside the card carriage rack 152 and fixed to the frame of the machine is a member of insulating material designated 211. Disposed in this block of insulating material are a number of spots 212 of conducting material and alongside these spots is a common strip of conducting material 213. A suitable bridging piece or multiple brush assembly 214 is carried by the card carriage rack 152 and as the card carriage rack moves the bridging piece and brush assemblage 214 is displaced and establishes circuit connections from the common bar 213 to one of the spots 212 depending upon the columnar position of the card carriage rack 152. For accuracy of spacing of the conducting spots 212 these are placed in two rows, those spots of the lower row being inter-staggered with the spots of the upper row as clearly shown in Fig. 12.

Card ejector mechanism

Referring to Figs. 12 and 12a after the card has reached the R—1 position and been traversed past the punches 200 and has been punched, it ultimately reaches a position at the extreme left hand end of the punching section of the machine from which point it must be ejected into a discharge hopper. The card eject mechanism will now be described. The card eject mechanism is shown in Fig. 12 in its normal position which the parts assume before the machine has started to operate. Upon the first card feeding operation through the punching section of the machine, rack 151 (Fig. 12a) will have moved towards its extreme left hand position. After reaching the dotted line position shown in Fig. 12, 151 moves further to the left and thrusts a rack 230 to the left compressing a spring 231. Bearing against a shoulder on rack 230 is a contact operating part 232. When 230 is thrust to the left, contacts 234 which are normally closed, will open (see Fig. 9). The displacement of 230 to the extreme left position will, through intermediate gears 235, rock a shaft 236 in a clockwise direction to bring in ejector clip assemblage 237 away from the position shown in Figs. 12 and 7 and into the position shown in Fig. 11. With the ejector clip assemblage 237 disposed in position to receive a card from the punching section of the machine this assemblage will be latched in such position by means of a latching pawl 238. With the ejector clip assemblage 237 thus latched up energy will be stored in spring 231 and thereafter the card feed rack 151 can move back to the right position shown in Fig. 12a. After the card has been punched and has entered the jaws of the ejector assemblage (see Fig. 11) ejector control magnet 240 is energized drawing link 241 (Fig. 10) to the right from the position shown, causing latching pawl 238 to rock counterclockwise, whereupon the ejector clip assemblage 237 is released so that it can swing anti-clockwise under the influence of spring 231. The ejector assemblage swings to the position shown in Figs. 12 and 10 and just as it reaches its extreme position a stop member 242 cooperates with a camming member 239 on the ejector clip assemblage and opens up the jaws of the assemblage so that the card can be discharged into the discharge hopper 243. Discharge of the card from the ejector assemblage is also aided by the fingers 244 (Figs. 10 and 11) which fingers are rocked in an anticlockwise direction following the de-energization of the ejector control magnet 240 upon the moving of the link 241 to the left. The ejector is then ready to be restored to receive a new card.

*Contact devices of punching section of the machine*

The contact devices 234 controlled by 230 have been briefly described. Also associated with the ejector end of the punching section of the machine are a pair of contacts 233 (Fig. 12) which contacts are normally closed, but which open up when their operating bell crank 233a is permitted to rock clockwise upon movement of 230 to the left. Opening of contacts 233 is brought about by the spring action of the upper contact. Co-operating with an extension adjacent the left hand end of rack 152 is a pivoted contact operating member 245, which with the rack 152 in the position shown in Fig. 12 is adapted to hold contacts 246a open and contacts 246b closed. Contacts 247 are supplementary contacts being inter-linked with the right hand blade member of contacts 246b. Such contacts 247 are also kept closed with the rack 152 in the position shown. Upon the movement of the rack 152 to the right from the position shown in Fig. 12 the relations of these contacts 246a, 246b and 247 will be changed, that is 246a will be closed, 246b and 247 will be opened.

Referring to Fig. 12a, contacts 120 are card lever contacts previously described and controlled by card lever 119. These contacts are closed when a card is present in the R position. Also at the right hand end of the punching section of the machine are contacts 248. These contacts are normally closed with the rack 151 in the position shown and such contacts automatically open up upon the movement of 151 to the left from the position shown. Furthermore, such contacts 248 remain in open position during the complete traverse of 151 to the left and back to its starting position.

Also on the punching section of the machine there are provided controlling contacts 248a (see Figs. 12a and 7a). These contacts are normally closed contacts and are arranged to be open upon the complete traverse of the rack 151 to the left. Opening of the contacts is effected by means of the bracket 248b which bracket carries the pusher 150.

On the punching section of the machine there are also certain other controlling contacts which are commonly used in machines of this class and commonly known as anti-stutter contacts. The purpose of the contacts is to insure the completion of a punching action once it has been started and to prevent premature operation of the interposer for a subsequent punch set up. These contacts are shown in Figs. 39 to 42 inclusive and will now be described.

Referring to Fig. 39, this shows the normal position of the parts with the anti-stutter or safety contacts 249 closed. Referring now to Fig. 40, 201 shows a fragment of one of the interposers in displaced position (to the right in this figure, this being a rear view of the machine). In such displaced position, interposer 201 will rock bail member 207 in a clockwise direction and will rock a member 250 in a clockwise direction. Member 250 is fixed to shaft 251 and bail 207 is likewise fixed to 251. Loosely mounted on shaft 251, but spring inter-connected with member 250 is a member 252 which when 250 is rocked in a clockwise direction also tends to be rocked in clockwise direction against a shoulder 253 on member 254. Subsequent operation of the escapement parts of the machine causes an elevation of member 254 substantially to the position shown in Fig. 41, which is brought about by contact of dog 195a with a turned over shoulder 256. When in this position, a pin 255 on member 254 will open up contacts 249. Member 254 will be retained in elevated position by the member 252 which will swing under the shoulder 253 when member 254 is in such elevated position. Thereupon contacts 249 will remain in open position both until the interposer 201 has been moved back to the left rocking 252 clockwise and until dog 195a has dropped into the next notch of bar 152. It will be understood that if the interposer 201 is not returned that 252 will remain in the position shown in Fig. 41 and prevent reclosure of contacts 249. It will also be understood that in the event that dog 195a is in elevated position so as to contact with shoulder 256 that this action will also keep contacts 249 open. The same safety contacts also serve another function and that is, provide a construction which will maintain these contacts 249 open after the last column of the cards has been punched. This condition of parts is shown in Fig. 42. Here dog 195a is in elevated position riding on the top of 152 beyond the last notch of the bar. In such position 195a is in contact with shoulder 256 thus holding member 254 in elevated position and maintaining contacts 249 open.

*Reset drive and contact controls associated with reset*

Explanation has been previously given how reset drive shafts 63 and 63a of the upper section of the machine are driven and how reset shaft 63b of the lower section of the machine is driven. It has been explained heretofore that these shafts have been driven by Geneva drive devices and such Geneva drive devices are adapted to operate such shafts with a motion which is both intermittent and regular and which also gradually accelerates the rate of drive from zero to maximum and then diminishes the rate of drive again to zero. By this type of drive, reset operations can be effected quietly and without shock to the parts and also in correct timing relation with the other mechanisms of the machine. It may be explained that individual reset mechanism of the entry receiving devices and accumulators are clutched to the reset drive shafts at the time when reset drive shafts are practically stationary. These clutch mechanisms are substantially the same for all of the receiving devices and accumulators of the machine and accordingly, only one of them will be here described.

Referring to Fig. 13 each of the accumulators (here the LH 1 to 8 accumulator) are provided with the usual reset actuating mechanism generally designated 121 with gear 122 in Fig. 13 and which mechanism is of the type shown and described in United States patent to Lake No. 1,600,414, dated September 21, 1926. Fixed to gear 261 (gear 381 of the above mentioned Lake patent) is one element of a one revolution clutch comprising a notched disk 260. Shaft 63, the reset drive shaft, has fixed to it the other clutch elements comprising a member 262 carrying a dog 264. Clutch dog 264 is pivoted on member 262 and urged towards the notch in the member 260 by a spring 265. Spring 265 tends to rock 264 clockwise and presses the tail of the clutch dog against a roller 266 carried upon a member 267. Member 267 at its upper end engages a latch of the LH 1 to 8 reset magnet 268. Accordingly, when the armature of a reset magnet such as 268 is attracted the latch 269 is released and member 267 is permitted to swing clockwise under the action of spring 270 aided by spring 265 allowing the clutch dog 264 to engage the clutch element 260. The timing of energization of the reset magnet 268 may precede the actual clutching operation slightly and the clutch dog 264 will engage the notch at the time when the shaft 63 comes substantially to rest, whereupon gears 261 and 122 are operated and reset is effected.

During rotation of part 265 a tail 271 will engage a camming surface 272 of member 267 and rock this member in anti-clockwise direction thereby re-latching latch 269 and through contact with the abutment screw 273 positively knocking off the magnet of the armature 268. 267 by the above operation will have been re-latched in position to contact with the tail of the clutch dog 264 and upon one complete revolution of this clutch dog the clutch dog will be disengaged from the clutch element 260. In the foregoing manner one complete cycle of rotation may be imparted to the reset mechanism of any one or each of the accumulators or entry receiving devices of the machine.

It will be understood that there is a reset control magnet similar to 268 for each of the entry receiving devices and/or accumulators of the machine and these will be accordingly designated 272 (see Figs. 31 and 31a) pertaining to the LH 9 to 16 accumulator, 273 pertaining to the summary product accumulator, 274 pertaining to the RH 9 to 15 accumulator, 275 pertaining to the RH 1 to 8 accumulator, 276 pertaining to the IVC accumulator, 277 pertaining to the MP entry receiving devices and 278 pertaining to the MC entry receiving device.

Emitters and drives therefor

Referring to Fig. 1, seven emitters are provided in the machine. These emitters are respectively designated 281, 282 and 283, being one group disposed under the LH 1 to 8 accumulator (see Fig. 31 which shows the drive for such emitters) and which emitter group is driven by a gear train 280 extending to the drive shaft 56 of the machine. The other group of emitters comprise a group of four designated 284, 285, 286 and 287. Such group of emitters is driven by a train generally designated 288 which is also driven from the accumulator shaft of the machine (see Fig. 31).

All of the various emitters 281 to 287 inclusive, are generally of similar construction but some of them differ in the arrangement of the interconnection of the brushes and the matter of current supply therefor.

Referring now to Figs. 62 and 63, emitters 281, 282 and 283 have eleven conducting spots and each has an individual common segment 289 for supplying current to the emitter brushes generally designated 290. The various emitter brush assemblages 290 are driven by a gear 291 which gear is in train with the gear train 280 previously referred to, (see Figs. 13 and 31).

Referring to Fig. 63 emitters 284 and 285 likewise have eleven conducting spots and their brush assemblages are electrically interconnected together as indicated at 292. These emitters 285 and 284 and emitters 286 and 287 as well are driven by a gear 293 which is in train with the gears 288 previously referred to (see Fig. 31). Emitters 286 and 287 are generally similar to emitters 281 to 283 inclusive, each having eleven conducting spots and an individual common conducting strip as shown.

In the subsequent description of the circuit diagram it will be seen that while eleven conducting spots are provided on all emitters, certain of these spots on the emitters are not wired up. Identity of construction is made for simplicity of manufacture.

Controlling contacts on MP and MC receiving devices

Referring to Fig. 14, the gear 261 on the reset shaft 63b for the MP and MC receiving devices is provided with a cam member such as 294 which cam member through a contact operating bell crank 295 is adapted to actuate contacts as shown. On the MP receiving device these contacts are respectively designated 296 and 297. Similar contacts and operating means therefor are provided on the MC receiving device. The contacts in this instance and on the circuit diagram being designated 298.

Certain of the accumulators and receiving devices of the machine are also provided with supplementary contacts in the backs of the accumulators. These contacts are provided in the two RH product accumulators and in one LH product accumulator and in the inverter accumulator. Referring to Figs. 57 to 60 inclusive, Fig. 57 shows the contacts in the RH accumulator. Such contacts comprise two-blade contacts RHB and RHA which are normally open contacts and three-blade contacts RH I to 8 inclusive. Each of the three-blade contacts includes a common contact which with another blade forms a normally closed contact and which with still another blade forms a normally open contact pair. The normally open contacts RHB and RHA and the normally open contacts of the three-blade set RH 1 to 8 inclusive, are maintained open by bail member 300 fixed to shaft 301, which shaft is provided with a spring drawn latch 302. Cooperating with the latch 302 is an armature 303. 303 is adapted to be attracted by a magnet 304 and upon energization of this magnet the bail 300 rocks under the influence of the spring on the latch and allows contacts RHB and RHA to close and allows the normally closed contacts of the RH 1 to 8 set to open and the normally open contacts of the RH 1 to 8 set to close.

The contacts shown in Fig. 58 are in a different RH product accumulator, i. e. the RH 9 to 15 accumulator. The contacts in this accumulator comprise certain normally open two-blade contacts and certain normally closed two-blade contacts and certain three-blade contacts, each with a common contact blade cooperating with a normally closed contact and also cooperating with another blade forming a normally open contact. In Fig. 58 the normally closed two-blade contact is marked RHE. Contacts RHD and RHC are normally open two-blade contacts and contacts RH 9 to 15 are the three-blade contacts. Such contacts are tripped to a reverse position from that shown by a control magnet 305. In the LH product accumulator for columns 1 to 8 inclusive, a different contact arrangement is shown. Such contacts (see Fig. 59) comprise two normally closed contacts designated LHE and LHF and four normally open contacts designated LHA, LHB, LHC and LHD respectively. Such contacts are controlled by a control magnet 306. In the inverter accumulator (see Fig. 60) a set of two-way contacts are provided, which contacts will be respectively designated IVC 1 to 8 inclusive. These contacts are controlled by a control magnet 307.

In connection with the description of Fig. 57, it has been explained how the contacts are tripped, provision is made for restoring the contacts by positive mechanical action. A similar mechanism being used on all of the contact constructions. Accordingly, the construction on the LH 1 to 8 accumulator will only be described, it being understood that similar mechanism is used on the other accumulator devices.

Referring to Fig. 13, the reset gear 261 is provided with a cam 308, which cam upon rotation of the reset gear is adapted to rock a lever 309 and in turn rock a lever 310 which is positively fixed to the end of the shaft 301. It will be understood that rotation of the reset gear will at the proper time in the cycle of the machine reverse the relation of the contacts from their tripped open position and relatch latch 302 with the armature 303 of each of the particular controlling magnets 304, 305, 306 or 307 respectively.

*Cycle control and column shift*

In multiplying machines of this type, provision is required for shifting the columnar entries of partial products into the accumulator. This is preferably effected by switching mechanisms. It is also desirable to provide for cycle controlling for the elimination of unnecessary computing cycles. For example, in a multiplication problem involving intermediate zeros in the multiplier, it is preferable that unnecessary computing cycles for the columns of the computation involving these zeros be dispensed with. It is accordingly desirable that means be provided for determining whether or not there are significant figures in each place in the multiplier and how many figures there are, so that computing cycles of the machine can be automatically adjusted accordingly. Such cycle controller has to take into account not only intermediate zeros in the multiplier but zeros to the right or left of any significant figures in the multiplier. In the present machine a combined cycle controller and column shift mechanism is provided which will now be described.

According to the present embodiment, provision is made for reading eight places of the multiplier and determining whether or not these eight places represent digits or zeros. Provision is also made for sensing or ascertaining the location of the significant figures in the multiplier and controlling the operation of the machine accordingly. In other words, the machine can sense whether a multiplication is by say 78,000 or by 78 and control the multiplication accordingly.

The cycle controller in its general arrangement is substantially the same as that shown in copending application of James W. Bryce, George F. Daly and James M. Cunningham, Serial No. 554,490, filed August 1, 1931.

Referring to Fig. 23, the cycle controller and column shift mechanism is provided with a number of control magnets 311. In the present embodiment eight of these magnets 311 are provided, one magnet being provided for each possible column of the multiplier, eight columns being the limit of multiplication in this particular machine. In addition to the eight magnets 311 previously referred to, a master control magnet 312 is also provided for a function to be hereinafter described. The magnets 311 are arranged so that they are left de-energized in the event that a significant figure appears in the multiplier and are energized in the event that the multiplier includes zeros, in their related column. For example, if in the units column of the multiplier there is a zero, the magnet pertaining to the units column would be energized, likewise if the units column of the multiplier included a significant figure, for example 2, the units magnet 311 would remain de-energized. On Fig. 23 the various units, tens, hundreds and so-on orders have been designated.

Referring to Fig. 23, the shaft 55b, which is the drive shaft for the lower section of the machine and which is a continually running shaft, has secured to it a gear 313, which gear meshes with a pinion 314 and constantly drives a ratchet wheel 315. Disposed adjacent to the ratchet wheel 315 are a pair of disks 316 and 317. These disks have their peripheries notched with ratchet shaped teeth. The notches of one disk are reversely disposed with respect to the notches of the other disks so that the ratchet teeth are in a sense in opposite directions to one another. Disk 317 has pivotally connected to it a link 318 and disk 316 has pivoted to it a dog 319, which dog is adapted for cooperation with the ratchet 315, the ratchet being located back of disk 316. The dog 319 is pivotally inter-connected to the link 318, the pivoted connection between these parts extending through an aperture or hole through both of the disks 316 and 317. Disk 316 is also provided with a pin 320 which extends through an aperture in disk 317 and which pin has connected to it a spring 321 which in turn is fast to disk 317. The spring tends to displace disks 316 and 317 in opposite directions, i. e. if disk 316 is to be considered to be rocked in a clockwise direction by the spring 321, the disk 317 will be urged in an anti-clockwise direction. Dog 319 is normally retained in position so that the tooth of the dog will clear the ratchet 315 by means of a plunger 322 having a bell crank connected to its end portion adapted to cooperate with a stop arm 323 fast to the front disk 317 but disposed in the rear of the rear disk 316. The rear disk being apertured as shown at 324 (Fig. 23) to permit the stud fastenings for the member 323 to project through the rear disk and into cooperation with the front disk 317. Upon the drawing outward of the plunger 322 the finger 323 will be released from the bell crank member 336 on plunger 322 and the dog 319 will tend to be rocked in an anti-clockwise direction towards engagement with the ratchet 315 under the influence of the spring 321 provided that the disks 316 and 317 are free to shift angularly relatively to one another. These disks 316 and 317 are normally prevented from such angularly shifting movement by means of a dog 325, spring urged into cooperation with the notches in disk 317 (see Fig. 24). In addition there is provided a pawl 326 which cooperates with the teeth in disk 316. 326 when engaged will prevent clockwise movement of 316 and 325 when engaged will prevent anti-clockwise movement of 317. It will be understood that normally with the plunger 322 with its bell crank 336 engaged with the member 323, disks 316 and 317 will both be stationary.

At the proper time in the cycle of the machine the rotation of shaft 56b will cause a cam 327 (Figs. 23 and 24) to cooperate with a roller 328 on member 325 and rock this member in a clockwise direction freeing it from disk 317. After this disk 317 is thus freed, spring 321 comes into action, provided plunger 322 is withdrawn and this will allow dog 319 to engage the ratchet, the parts now being in the position shown in Fig. 25. The ratchet will now drive the assembly of disks in an anti-clockwise direction.

Each of the control magnets 311 has associated with it a plunger mechanism, which with its associated bell crank 336 acts as a differential stop. In Fig. 23 these plunger mechanisms have not been shown repeated for each magnet 311. It will be sufficient to describe the operation of one of these plunger mechanisms which is shown in full. It may be explained that for each magnet 311 there is a plunger 329 which plunger 329 is similar in construction to plunger 322 and each of these plungers when thrust forward is adapted to keep its associated bell crank in intercepting relation to the stop member 323. Each plunger when retracted outwardly draws its bell crank clear of intercepting relation with the stop member 323. The tripping mechanism for plungers 322 and 329 is identical.

Referring to Figs. 21 and 22, the former showing magnet 311 de-energized and the latter figure showing the magnet energized, the energization of this magnet 311 attracts its armature 330 which is pivoted at 331. The armature upon being rocked releases itself from a locking notch 332 and allows the plunger to be thrust outwardly under the influence of a spring 333. The plunger 329 when in this position has its bell crank out of intercepting relation with member 323. Lifting of the plunger 329 also closes one pair of contact mechanisms 334 associated with each plunger and opens up another pair of contact mechanisms 335.

It will be first assumed that all of the magnets 311 are de-energized. This is a condition where there is a significant figure in each place or order of the multiplier. The action will then be as follows: Upon withdrawing the plunger 322 which is a tripping plunger for the entire set, and upon the release of dog 325 at the proper time in the cycle, the disk assembly will rotate with a precessional movement until the first or units order plunger 329 which has its bell crank in intercepting relation, intercepts member 323. This action will stop the disk 317 and the arresting of this disk will cause a withdrawal of the dog 319 from the ratchet 315. Disk 316 continues to move, however, until it is latched up by dog or pawl 326 which engages a ratchet tooth of 316 at the time dog 319 is fully disengaged from the ratchet 315. The parts will now stop with finger 323 in abutting and intercepting relation with the bell crank of plunger 329 pertaining to the units order. Later on in the operating cycle of the machine the units order plunger 329 will be withdrawn upon energization of its controlling magnet 311. The disk assembly will again advance until the stop finger 323 intercepts the bell crank of the next plunger 329 pertaining to the tens order (see also Fig. 26c) and this operation will repeat for each of the successive plungers pertaining to different columnar orders of the multiplier.

Now assume that a single plunger, say the 329 plunger, pertaining to the units order (see Fig. 25) is initially withdrawn. In this event the disk assembly will progress with an uninterrupted movement from the master intercepting position to the tens intercepting position. Each of the plungers 329 and the plunger 322 has associated with it and interconnected with it near its inner end a restoring bell crank member 336, which also acts as a stop for finger 323. These restoring bell crank members have a tail portion in intercepting relation with a pin 337, which pin is mounted upon and projects back of disk 316. After the cycle controlling operation is complete this pin will contact first with the bell crank 336 pertaining to plunger 322 and draw the plunger 322 positively inward against the tension of its spring. Thereafter the pin in succession will similarly act on the other plungers 329 and draw them all inward. This plunger restoring action takes place after the stop finger 323 has passed plunger 329 pertaining to the tens of millions order. It will be understood that after the stop finger has passed this particular plunger that disk units 316 and 317 will have positioned pin 337 around about 180 degrees from the position shown in Fig. 23, thereafter the disk units will make substantially a half revolution with continued uninterrupted movement to bring about the plunger restoring action just described. The cycle controller then will be ready for another cycle controlling operation.

As each plunger is drawn inward a collar on the plunger contacts with a bell crank 338 (Figs. 22 and 21) which bell crank is interlinked with the armature 330 and positively knocks off the armature and restores it into locking relation with the plunger. The intermittently controlled precessional movement of the disks 316 and 317 of the cycle controller is utilized for controlling columnar selection in the following manner. The inner disk 316 is fixed to a shaft 339 which shaft in turn is fast to a gear 340 (see Fig. 20). Gear 340 in turn drives through an idler gear 341 to a driving gear 342 for a set of column shift switches. These column shift switches are generally similar to certain of the readout mechanisms employed in the machine and their construction can best be understood from diagrammatic views (Figs. 55, 56 and 56a). A shaft 343 is provided (Fig. 20) driven from gear 342 and this shaft (see Fig. 56a) has an insulating sleeve 344 around it. Upon the extreme right hand end of sleeve 344 are two brush assemblages generally designated 345 and 346 which brush assemblages are electrically connected together by a wire 347 (see also Fig. 55). The brush device 346 sweeps over segment spots CSA and the brush assemblage 345 sweeps over segment spots CSB. Next adjacent the brushes 345 and 346 are another pair of brush assemblages generally designated 348 and 349 and tied together electrically by a wire 350. The brushes 348 sweep over segment spots designated CSC and the brush assemblage 349 sweeps over segment spots generally designated CSD. To the left of the brush assemblage 349 are sixteen other individual brushes which individually sweep over segment spots which are designated LS 1 to 8 to RS 1 to 8. There are sixteen sets of segment spots in this section of the switching mechanism and sixteen sets of brushes each insulated from one another. Each brush assemblage cooperates with its relating segment spots and with a single conducting strip, two of which only are shown in Fig. 55 being numbered 351 and 352.

It will be appreciated that all of the brushes shown in Fig. 55 including the sixteen brushes to the left and the four brushes to the right in two pairs of two, all rotate in unison, and it will be further appreciated that the cycle controller is arranged to shift the brush assemblage from the first segment spot to the second, then later to the third and so on and it may also skip spots if the electromagnetic selection provides for it. The segment sections LS 1 to 8 and RS 1 to 8 are provided for column selection purposes solely, LS 1 to 8 being provided for the column selection for the left hand components and segments RS 1 to 8 being provided for column selection for right hand components. The other commutator segments CSA to CSD inclusive are utilized for cycle selection and multiplier relay selection.

Fig. 56 shows the wiring for the segment spots of the column selector switching mechanism and the cycle controlling mechanism. It will be noted that the LS 1 to 8 segment spots and the RS 1 to 8 segment spots are wired with diagonal wiring from spots in various columnar orders which provides for the desired column shift switching action.

Figs. 26a and 26b show a modified form of cycle controller clutch device. In Fig. 26b, 314 is the driven pinion driven from gear 313. 316a and 317a are disks generally similar to 316 and 317. Stop finger member 323a is provided as before and is attached to disk 317a. In lieu of ratchet 315 and clutch parts 319 and 318, etc. a roller clutch construction is provided as follows. Pinion 314 has fast to it a drum-like part 315a provided with an internal driving surface 315b. Disk 317a carries a series of pins 318a carrying loosely mounted rollers 319a which rollers cooperate with the other element 319b of the clutch, which includes camming surfaces 319c (see Fig. 26a). 319b in turn is secured to disk 316a. Spring plunger assemblies 321a press on rollers 319a and also react back through their fastenings to disk 316a. The reaction of the spring devices 321a tends to turn disk 317a anti-clockwise with respect to 316a, but 316a is held as previously described by a locking dog 325. Upon release of locking dog 325 (as in the other form) the two disks 316a and 317a relatively shift and the rollers 319a engage the camming surfaces 319c and also the inner driving surface 315b whereupon the disks 316a and 317a rotate in unison. In other respects the operation is the same as previously described. Disk 316a is fast to shaft 339a which drives the gear 340 as in the other form. Fig. 26a shows the clutch parts disengaged l'ke Fig. 23 of the other form.

*Relay control section and multiplier panels*

Fixed to the frame section of the machine are upright side plates 355 (Fig. 21). These side plates are slotted to receive a number of vertical plates 356 spaced apart from each other as shown in Fig. 19. Carried on each plate 356 is a magnet which will be generally designated X in Figs. 21 and 19. These magnets are the multiplier control magnets and when energized serve to control the establishing of certain contacts in the relay control section of the machine. Preferably magnets X are used as trip magnets only and the armatures of these magnets is not required to actually shift their related contacts. Shifting is effected mechanically after the magnets X have been energized in the manner which will now be described. It has been previously explained that a cam 65 (see Fig. 31) is provided, which cam is disposed on shaft 56b and this cam cooperates with a follower crank 66 secured to a shaft 67, which shaft at its opposite end (see Fig. 31a) is provided with an arm 357, which connects to a serrated operating bar 358. This serrated operating bar is also shown clearly in Fig. 19. This serrated operating bar is disposed below and at one side of the base of the controlling relay section of the machine and into the serrations of the bar extend arms 359 of a contact operating bail structure. The arms 359 and arms 360 (Fig. 21) are pivotally supported by shafts 361 and are cross-interconnected by transverse members 362 of insulating material. These transverse members cooperate with one set of contact blades generally designated 363 (Fig. 38). It will be understood that each plate 356 has secured to it and insulated from it, one set of contacts 363. In cooperation with these contacts 363 are other sets of contacts 364 also carried by each plate 356 and insulated from the other set of contacts 363. The contacts 363 are provided with individual binding posts 365 (Fig. 38), and the contacts 364 extend downwardly and are provided with plug-end prong portions 366 which extend into plug clips 367. All of the clips 367 in a common transverse row are connected by common bus connections 527—528 (see also Fig. 20 and Fig. 61b). These bus connections it will be understood extend across under the various sets of plates 356. The purpose of these bus connections is to provide for current supply to the various plug clips.

Referring to Figs. 35 to 38 inclusive, one of the arms 360 (see Fig. 21) extends upwardly beyond the insulating cross member 362, this upwardly extending portion on Fig. 21 being indicated at 360a. Each arm 360a carries an armature restoring screw 369 for the purpose of knocking off the armature. The armature 370 of each X magnet is pivoted at 371 (Fig. 35) and each armature has an upwardly extending arm portion 372 disposed in cooperative relation to screw 369. Each armature 370 also has a latch portion 373. Pivoted on the center of the bail 362 is a fork-shaped member 374 which has one fork 375 disposed between the latch member 373 and the arm 360a. The member 374 is normally rocked anti-clockwise by a spring 376, which is fastened at one end to an extension of arm 360a and which at the other end is connected to the arm 377 of member 374. With the contacts 363 and 364 open the contact pressure of contacts 363 will tend to rock 360a in an anti-clockwise direction causing 375 to be pressed against the latching nose 373 of the armature 370. Before the X magnet is energized to release the armature the serrated bar 358 is moved to the left displacing 360a away from the part 374 and taking off the tension at the latch point of the armature. Thereafter one of the X magnets is energized. This position of parts will be that shown in Fig. 36. Armature 370 is thereupon drawn downwardly from the position shown in Fig. 36 to the position shown in Fig. 37. Part 375 then snaps over the top of the latch 373 and following this action 360a is displaced in a counterclockwise direction permitting the insulating bail 362 to clear the contacts 363 and allow them to close under their own spring action. Upon the restoring movement of 360 and 360a after the contact action is completed, the serrated bar 358 shifts 360a to the right from the position shown in Fig. 37 until 360a contacts with 378; thereafter arm 374 is rocked in a clockwise direction freeing 375 from the latching nose 373 and allowing the armature to restore to normal position away from the X magnet. To insure this restoring action screw 369 contacts with the upwardly extending part 372 of the armature.

By the above contact operating arrangement the load of unlatching the armature from its latch point is removed prior to the unlatching operation. Furthermore, the actual displacing movement of the bail 362, which cooperates with the contacts, is effected mechanically and furthermore mechanical power is utilized for restoring the magnet armatures and for mechanically unlatching such armatures as has been previously latched down. It will be understood that there is one X magnet for each plate 356 and that there are a set of contacts 363 and 364 for each X magnet.

It has been previously explained that extending under the set of contacts 364 are bus bars 527—528 provided with plug clips 367 to receive the prongs 366. Also disposed transversely under the plates 356 and to the extreme right in Fig. 21 are a set of bus bars 526 which are also provided with plug clips 381. Cooperating with the plug clips 381 are contact prongs or plugs 382 which plugs are carried by insulating strips on plates 356. Each of the prongs 382 is provided with a suitable binding screw terminal shown in the circuit diagram. There is also a special bar 526a which is connected to the common side of the magnets X by plug prong and socket connections similar to 381—382. There is also a row of sockets like 381 which is not provided with any bus. Such sockets are designated 381a on Fig. 20 and cooperate with prongs 382a which connect to the individual sides of the magnets X—1, X—2, etc.

The arrangement of multiplier panels herein shown is substantially the same as set forth and fully described in the copending application of James W. Bryce, George F. Daly and James M. Cunningham, previously referred to.

*Cam contacts*

Referring to Figs. 27 and 28 and Fig. 31, the drive shaft 56 drives a gear train generally designated 390 which train drives a shaft 391 provided with contact cams for operating cam contacts CC—1 to CC—6 inclusive. This shaft 391 is also provided with an impulse timer 392 for cutting off the flow of impulses to the brush circuits at certain times in the operation of the machine.

*Accumulators and entry receiving devices*

It has been explained before that the various accumulators and entry receiving devices in the machine are of the usual electromagnetic type generally similar to the type shown in Lake Patent No. 1,307,740. However, the relayless contacts and the operating mechanism therefor, generally designated 395 in Fig. 29, are employed only on the MC accumulator. These relayless contacts can be dispensed with on the other counters or entry receiving devices of the machine on account of alternating current being used for circuit supply for impulses.

It has been explained before that the LH accumulator comprises two sections and the RH accumulator comprises two sections. Carry-over means are provided intermediate the two sections of these respective accumulators to make the two accumulator sections of each pair in effect one large accumulator. Such carry-over mechanism is shown in Figs. 30 and 30a. The carry-over part 396 pertaining to the highest order wheel of each of the pairs of accumulators is provided with a contact actuating part 397 adapted to close contacts 398 and establish a circuit to a magnet 399 (see Fig. 30), which is adapted to trip carry lever latch 400 pertaining to the lowest order of the accumulator section to the left. In this way these two sub-divided accumulators are in effect two large accumulators.

*Readout sections*

While the readout sections of the various entry receiving devices and accumulators are substantially the same in general construction there are certain distinguishing differences in the manner of driving the brushes for certain different ones of the sections and in the arrangement of the segment spots, number of spots, the wiring of the spots, etc. Before describing the circuit diagram these will be briefly described.

Figs. 46 to 48 inclusive show the general arrangement of the readout devices for the RH accumulator sections 1 to 8 and 9 to 15 inclusive. With this readout mechanism it will be noted that the segment spots 401 are common to two sets of brushes designated 402 and 403 respectively and which brushes cooperate respectively with conducting segments 404 and 405. Brush 402 as shown in Fig. 46 is driven from the units order clutch gear 406. Brush 403 is driven by the tens order clutch gear 407 by the gearing diagrammatically illustrated. A similar arrangement of brushes and readout spots is provided for the relatively higher orders of these two accumulator sections. The various segments of the read-out mechanism are transversely connected by transverse buses generally designated 408 in Fig. 48.

*MP readout*

Referring to Fig. 43, 410 is the clutch gear pertaining to the units order of the MP receiving device. Gear 411 is driven from this clutch gear and this gear in turn drives two brush assemblages, one designated 412U which traverses a set of segments 413 and also a current supply segment 414. There is another brush 415—U driven by gear 411 which traverses a segment generally designated 416 and which segment is provided only with a single conducting segment spot at the zero position. Brush 415—U also traverses a common current supply segment 417. There is a similar brush 415—T which is positioned from the tens order clutch wheel 418 and which also traverses the segment 416 which contains only the single conducting spot at the zero position. Brush 415—T also traverses a separate common current supply segment 419. Similarly there is a brush 412—T driven in unison with brush 415—T which traverses the segment spots 420 and which receives current from a common current supply segment 421. This arrangement of brushes and segments is repeated for higher orders in the MP readout devices, i. e. each alternate segment 424, etc., is like 416 with only a single spot in the zero position of each segment. Alternating with these segments are other segments similar to 413 and 420 with a multiplicity of spots on each segment.

Referring to Fig. 45, the 1 to 9 segment spots of the 413 and the 420 segments and alternate segments of this type, skipping the intermediate segments of the zero spot type, are wired together by transverse bus connectors generally designated 422. Likewise on the other alternate segments such as 416, 424, etc. (which contain only zero spots) the zero spots of such set of segments are wired up by bus connections 425.

In lieu of using the particular readout device above described for the MP device the segments 416—424, etc. can be dispensed with and in lieu thereof the zero spots of 413—420 can be connected up by bus wiring such as 425. If such a construction is employed the current supply segments 414—421, etc. should be split into two insulated portions in such a way that one part of the segment on which one brush contacts when its other end is standing on the zero spot is separate from and insulated from the remainder of the segment. The separate or zero portion of each current supply segment would then be wired to magnets 311 instead of using the current supply rings 417 and 419 with their additional brushes.

*MC readout and LH 1 to 8 readout and LH 9 to 15 readout*

Referring now to Fig. 49, this shows the brush driving arrangement for the MC readout, the LH 1 to 8 and the 9 to 15 readout. In this case the units clutch gear train 426 drives a units brush 427—U which cooperates with a set of segments 428 and which receives current from a common conductor segment 429. Similarly the units driving train 426 drives a brush 430—U receiving current from a conductor segment 431 and cooperating with segments 432. Also cooperating with segments 432 is another brush 430—T receiving current from 433 and driven by the tens order train 434. The train 434 also drives a brush assemblage 427—T which cooperates with segments 435 and receives current from a segment 436.

The arrangement thus described is repeated for relatively higher orders in the machine.

Referring now to Fig. 51, this figure shows the cross-wiring arrangement for the MC readout device as shown. The 1 to 9 spots of segment 428 are shown connected to the 1 to 9 spots of the 435 set and the 1 to 9 spots of the 432 set are shown connected to the 1 to 9 spots of the 438 set skipping over one set of spots to the left. These bus connections are respectively indicated by the wires generally designated 439 and 440.

On the LH 1 to 8 and LH 9 to 16 readouts the wiring is identical except that the LH readout devices are provided with ten segment spots instead of nine as used on the MC readout device. On the MC device the one spot connection between 432 and 438 may be omitted leaving connections only for the 2 to 9 spots.

*Inverter accumulator readout*

Referring now to Fig. 52, 441 generally designates the units clutch gear train. This train drives a brush 442—U cooperating with common segment 443 and with the segment spots 444. Also driven by train 441 is another brush 444—U which cooperates with a common segment 445 and with a set of segment spots 446. On the tens order, the clutch train 447 drives a brush 444—T which receives current from common segment 449 and cooperates with segments 450. The hundreds train 451 drives a brush 444—H which co-operates with segments 450 and receives current from conducting segment 452.

In the inverter readout it will be seen that the units order is provided with two sets of conducting segments 446 and 444. These segment spots on 446 and 444 are wired together as shown by the wiring generally designated 453. The arrangement of this wiring is such that the nine spot of the 444 segment is wired to the eight spot of the 446 segment, the eight spot of 444 to the seven spot of 446 and so on. As clearly shown in Fig. 54, on relatively higher orders of segments than the two units segments there is provided a simple transverse bus connection between the correspondingly numbered segment spots as indicated at 454.

*Circuit diagram*

The machine operation will now be described, the operations first being traced for normal multiplication, that is with each card pre-perforated with a multiplier and multiplicand factor and with the cards introduced into the supply magazine.

The first operation is to close switch 500 providing a source of supply for current to the main driving motor M.

Figure 61D:
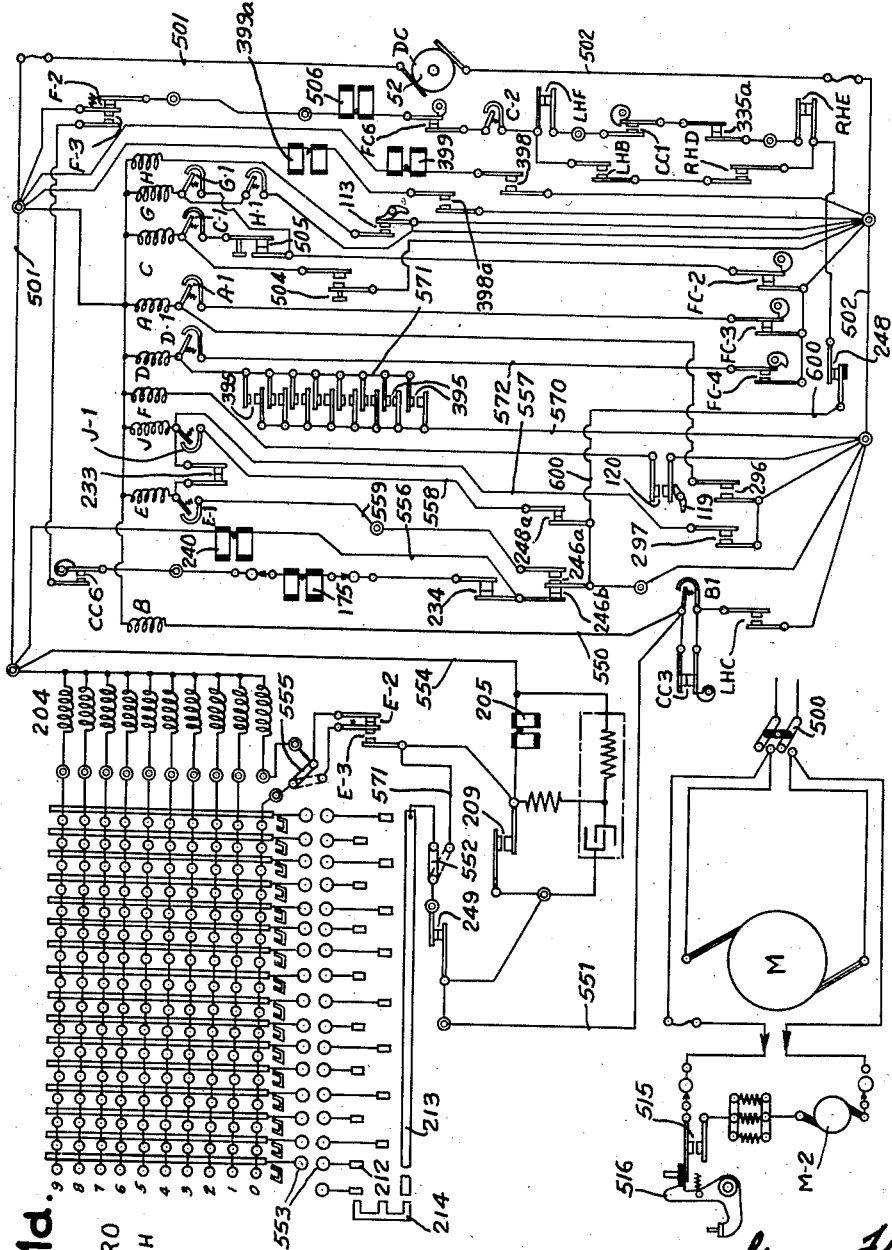

Rotation of the motor M starts the drive of the A. C.—D. C. generator and supplies direct current to the D. C. lines 501 (Fig. 61d) and 502. Alternating current is likewise supplied to ground and to bus 503 (Fig. 61a). Start key 504 is now depressed which completes a circuit from the 502 side of the D. C. line through relay coil C and back to the 501 side of the D. C. line. Energization of coil C establishes a stick circuit through points C1 through stop key contacts 505 now closed, back through cam contact FC—2 now closed and back to the other side of the line 502. Energization of coil C also closes relay points C2 and a circuit is completed traced as follows: From the 501 side of the line, contacts F—2 now closed, feed clutch magnet 506 (see also Fig. 32) through cam contacts FC—6 now closed, relay points C2 now closed, contacts LHF now closed, cam contact CC—1 which closes at the proper time in the cycle, contacts 335a associated with master magnet 312 (see Fig. 23) contact RHE now closed, contacts 248 on the punch rack which are now closed, and back to the other side of line 502 through circuit 630. It may be explained that the 248 contacts are only closed when the feed rack in the punching section of the machine is in the right hand position. This contact interlocking action is provided to prevent starting of the card feed when the rack 151 is not returned to proper position. Relay coil F is energized when a card is in the position shown in Fig. 12a at R. This coil is energized by the closure of card lever contacts 120 under the control of card lever 119. Energization of F opens points F—2 and prevents the starting of the feeding action if a card is improperly present in the punching section of the machine at this time.

This energizing the circuit through relay F also serves to prevent continuance of machine operation if a card jams in the R station of the punching apparatus.

It has been explained before that the feed of the machine is arranged to permit the use of constant running feed rolls in the machine except such feed rolls as are associated with the contact roll 87. The arrangement of the feed is such that after starting the card feeding operation, the card feed and card handling unit will normally run during two accumulator cycles. However, when starting the machine when cards are first placed in the magazine, it is necessary to hold down the starting key 504 during the first complete card feed cycle or alternatively it may be necessary to depress the start key the second time. The first complete card feed cycle will advance the first card to a point where the X (first extra index point position of the card) position of the card will be in line with the special X brush 106 (Fig. 4) in which position the 9 index point position of the card will be about ready to pass under brushes 109. At the beginning of the second card feed cycle, the card traverses the reading brushes 109 and the multiplier and multiplicand amounts are entered in the MP and MC receiving devices.

The entry circuits will now be traced: Card lever contacts 113 will now be closed, energizing relay coil H (61d). Energization of coil H closes points H—2 (Fig. 61a) and current accordingly flows from the 503 side of the A. C. line through H—2, now closed through cam contact FC—7, now closed, through the impulse distributor 392, at the proper index point in the cycle of the machine, to card transfer and conductor roll 87, through brushes 109 pertaining to the multiplier, these being designated 109MP on Fig. 61a, through the brushes 109 pertaining to the multiplicand, such brushes being designated 109MC on the diagram, and thence by plug connections from 109MP to the circuits extending to the counter magnets of the MP entry device, such accumulator magnets are conventionally designated 507. After passing the accumulator magnets current flows back to ground through the contacts A—2 which are closed during the entry of the multiplier into the machine. The contacts A—2 will be reversely thrown from the position shown in the circuit diagram, Fig. 61a, by energization of coil A, (Fig. 61d). The manner of energizing coil A will be hereinafter described. Entry of multiplicand amounts is effected in a similar manner. Suitable plug connections are provided at 508 to allow current to flow to the group of wires 509 which extend over to the IVC 1 to 8 contacts, thence through wires generally designated 510 to the counter magnets 511 of the MC receiving device and back to ground through wire 512, and switch 513, which is closed for this type of an operation.

By the foregoing entry operations the amounts of the multiplier and the amounts of the multiplicand will be set up in the MP and MC entry receiving devices and the read-out devices of both of these entry receiving devices will be correspondingly set. As has been explained before in connection with the description of Figs. 43 to 45, inclusive, the MP read-out mechanism sets up two complete independent sets of circuits. Certain circuits are used to determine the set up of any amount in the multiplier from 1 to 9, inclusive, and other circuits to segments being set up to the zero spots in the event that zeros appear in the multiplier. Obviously, on any single column in the multiplier there will not be both a set up of zero and a significant figure concurrently. Accordingly, there will be an alternative set up of significant figures or of zero figures. Set-ups are also made for the MC read-out mechanism.

The entry of amounts in the MP and MC devices as previously described is controlled by the card lever contact 113 (Fig. 61d) which closes a circuit through relay coil H. Energization of coil H picks up relay points H—1 and H—2 (Fig. 61a) and when points H—1 pick up, a circuit is established through coil G from 501, through G, points H—1 to the other side of the line 502. Energization of coil G closes points G—1 and a holding circuit for relay G is established through these points G—1 and cam contact device FC—2 which is normally closed. It may be explained that the relay G does not de-energize during the normal operation of the machine as the make time of cam contact FC—2 overlaps the time when card lever contacts 113 are open. Relay H becomes energized and de-energized once per each card cycle. Cam contact FC—2 is also timed to prevent an arc at relay points H—1.

In circuits previously traced reference has been made to relay A—2. This relay A—2, with its points shown on Fig. 61a and its coil shown on Fig. 61d, is picked up by establishing a circuit through contacts 296 (Fig. 14 and Fig. 61d) which contacts close upon the reset of the MP accumulator or receiving device. Before the MP receiving device receives amounts at the beginning of a card run the MP receiving device is reset. This reset circuit is traced as follows: From A. C. line 503 (Fig. 61c) through cam contact FC—5, relay point G—2, which are normally closed, but opened by the energization of coil G previously described, through switch 514, now closed, MP reset magnet 277, and back to ground. Energization of the MP reset magnet 277 brings about a reset of MP in the manner previously described and causes closure of contacts 296. A holding circuit through relay A is provided, the same extending through a contact FC—3, (Fig. 61d), and providing for current flow from the 502 side of the D. C. line through the relay points A—1 of the A relay.

The foregoing has described how the entry of the multiplier and multiplicand factors from the card are entered in the MP and MC receiving devices. Following the reading of the card amounts by the brushes 109, the card, after being read, is carried over by the various feed rolls into the punching unit of the machine. As the card is carried into the R station of the punching unit card lever contacts 120 close completing a circuit to relay coil F which when energized closes the points F—3 and opens points F—2. The opening of contacts F—2 discontinues card feed by de-energization of one revolution clutch magnet 506. The closure of contacts F—3 establishes a circuit traced as follows: from line 501, through F—3, now closed, through cam contacts CC—6, which close at the proper time in the cycle of the machine, through magnet 175 of the punching mechanism (Fig. 7a), through ejector clip contact 234, normally and now closed, through contacts 246b (Fig. 12), now closed, and back to the other side of line 503. Energization of magnet 175 (Fig. 61d and Fig. 7a) calls the clutch mechanism of the punch unit in operation and brings about an operation of the clutch parts. Such movement of the parts of the punching mechanism closes a contact 515 (Fig. 61d and Fig. 10a) and such contact is latched closed by 516. Closure of contacts 515 completes a circuit to motor M—2 from the external source whereupon the motor starts in operation moving rack 151 towards the left. Once the contact 515 is closed it is latched closed by the latch device 516 (Fig. 61d and Fig. 10a) and the contacts 515 remain closed until rack 151 (Fig. 7a) reaches its extreme left hand position. At such time the contacts are opened by the release of latch 516 in the manner previously described. It will be understood that contacts are opened by the release of latch 516 in the manner previously described. It will be understood that contacts 515 are closed by the movement of armature 176 upon energization of magnet 175 (Fig. 7a). Ultimately the rack 151 is carried to the left to such a point that the card is picked up by the card carrier rack 152 and carried to a position where it is further advanced to begin the punching of the product.

As the card leaves the card feeding unit and transfers over into the punching section of the machine, the actual operation of multiplication starts and it may be explained that this multiplication is performed concurrently with the endwise movement of the card in the punch section of the machine towards product punching position.

As has been explained before there is a cycle controller provided in the machine to eliminate unnecessary computing cycles.

As explained before, when a card is in the R station in the punching section of the machine card lever contacts 120 (Fig. 12a) close and such closure of these contacts energizes coil F (Fig. 61d). Energization of coil F (Fig. 61d) serves to close contacts F—1 (Fig. 61a). Contacts 247 in the punching unit (Fig. 12) are closed at this time. Accordingly, an alternating current impulse flows from line 503 through 247, now closed, through CC—5, which close at the proper time in the cycle of operation of the machine, through points F—1, which have been closed by energization of coil F under control of the card lever contacts 120, and thence through master magnet 312 of the cycle controlling unit (Fig. 23) and thence back through line 517 to ground. Concurrent with the flow of current through 312, the master magnet of the cycle controller, current flows across via path 518 and bus connections 425 to the zero spots of alternate segments of the MP readout device. On the circuit diagram the MP readout device is generally designated MPRO. The circuit 518 previously mentioned connects to the wires 425 which connect the zero spots on segments 416, 424, etc. (see Fig. 45). In the event that the 415—U or the 415—T and like brushes stand upon zero spots (Fig. 43) selected ones of the 311 magnets will be energized according to which columns of the multiplier represent zeros. Energization of 312 calls the cycle controller mechanism into operation.

It will be understood that the collector ring 417 (Fig. 43) is wired to the units order magnet 311 and that collector ring 419 is wired to the tens order control magnet 311 and so on. Energization of 312 releases the cycle controller which immediately shifts to the first position where there is a significant figure in the multiplier. This shifting action of the cycle controller sets all of the cycle controller switching mechanisms mounted on 343—344 (Fig. 55) to a proper spot corresponding to the order in which there is the first significant figure in the multiplier. In other words, if the multiplier were 321, the switching mechanism shown in Fig. 55 would all shift so that the brushes stood on the units order spot. On the other hand, if the multiplier were 320 the first significant figure would be in the tens order of the multiplier instead of the units and accordingly the shifting mechanism would shift to the second spots or tens order spots. The timing of the machine is such that ample time is provided for this switching and shifting action to take place and after such switching and shifting action has taken place cam contacts CC—2, (Fig. 61a) close. It will be assumed that there is a significant figure in the multiplier in the tens position. Under these conditions the brush assemblage 345, 346 and 347 (Fig. 55) will shift to the tens CSB and CSA spots. Accordingly, upon closure of cam contacts CC—2 current will flow through a wire through the spots of CSA and CSB into the common segment 421 pertaining to the tens order and out through this segment to the particular spot on commutator 420 corresponding to the amount of the multiplier in the tens place. In Fig. 43 this amount of the multiplier in the tens place is 1 and accordingly current will flow out through one of the wires of the 521 group to the X—1 multiplier magnet. If, on the other hand, the multiplier instead of having 1 in the tens order, had an amount which was say 4, current flow would take place to the X—4 magnet. From X—4 current flows back to ground.

It has been previously explained that when any magnet 311 is energized its corresponding contact 335 will be opened and its corresponding contact 334 will be closed (Figs. 22 and 21). It has also been previously explained that the emitter brush assemblage 292 (Fig. 63) is rotating at all times traversing the segment spots 285 and 284. It will be assumed that the multiplier is such an amount as 7030. The column selector switching device 348, 350 and 349 has been positioned to one of the pairs of spots of the CSC and CSD group. With the example noted, with the multiplier 7030, the master magnet 312 and the units magnet 311 and the hundreds magnet 311 and all control magnets 311 above the thousands will have been energized upon closure of the circuit through cam contacts CC—5. During the operation of multiplying an amount by 3 the brush assemblage 292 traverses the spots 284 and 285 in sequence from left to right on the circuit diagram (Fig. 61a) and as it passes over the pair of spots pertaining to the tens order a circuit will be completed, traced as follows: from right side of line 503 via wire 522, one of the CSD spots, via brush assemblage 349, 350 and 348, one of the CSC spots back through contact 334 pertaining to the units order, previously closed, down through a circuit 523, through contacts 335 pertaining to the tens order, up through contact spot 285, via emitter brush 292 over to contact spot 284 and into the magnet 311 pertaining to the tens order. While the tens order cycle control magnet 311 is energized at this time the actual shifting of the cycle controller to the thousands position does not occur at this time in the cycle because of its being held by the latch 327 and 326 (Fig. 23). At the proper time in the cycle, the cycle controller is released and there is a shift to the thousands position. The shift will directly occur to the thousands position because there is a zero standing in the hundreds order and the relation of contacts 335, 334 provides for the completion of a circuit to the thousands order control magnet 311 upon the next cycle of operation.

Referring to Fig. 61b of the circuit diagram: This figure shows the wiring of the multiplier panel units, the mechanical construction of which has been previously explained. As shown in Fig. 61b there are nine of the X multiplier panel magnets and there are two sets of contacts for each magnet coil except for the X—1 magnet in which there is only one set of contacts. The upper sets of contacts, horizontally adjacent reference character 524, are for LH components of partial products and those horizontally adjacent reference numeral 525 are for RH components of partial products. A set of bus lines 526 are provided leading to emitter 281 with its brush assemblage 290 and common ring segment 289. Lines 526 are digit impulse lines. At the proper cycle time in the operation of the machine current flows from 503 through 289 through 290 and via segments 281 to the lines 526. The differential time values of these impulses are designated by the numerals 1 to 9, inclusive, and appear on the lines 526 next adjacent 281. A set of bus lines 527 are provided leading from the opposite side of the contacts of the 524 group of the multiplying relays and a set of bus lines 528 are provided leading to the opposite contacts of the 525 group. The lines 527 lead to the wiring 440 of the segments of the multiplicand readout device marked MCRO, left on the circuit diagram, and shown in Fig. 51, and the lines 528 lead to the wiring 439 of the multiplicand readout device marked MCRO, right on the circuit diagram, and also shown in Fig. 51. In the actual construction it will be understood that the readout device designated as left and right on the circuit diagram are interspersed between each other in the actual construction of the readout device as shown in Fig. 51. The outgoing circuits 530 and 531 from these readout devices, (which outgoing circuits connect to the various common conducting segments shown in Fig. 49) extend to the column shift switching mechanism. Lines 530 extend to the LS 1 to 8 column shift switching mechanism. The spots of the segments LS 1 to 8 and RS 1 to 8 are connected by a diagonal wiring as shown in Fig. 56 and the diagonal wiring of the RS 1 to 8 device extends to plug sockets generally designated 532 on Fig. 61c. The diagonal wiring of the LS 1 to 8 column shift unit is not connected to any plug sockets but extends to the magnets 533 of the LH accumulator through the normally closed pairs of the RH 1 to 15 three-blade contacts. It will be noted that the units order of the LS 1 to 8 device is connected by a wire 534—U to the closed contact pair of the three-blade contact RH—2 and that from this contact a transfer wire connection 540—T extends to the tens order magnet designated 533—T on the diagram. The magnets of the RH accumulator are designated 535 and these are connected to plug sockets 536 from which sockets suitable plug connections are provided to sockets 532.

It will be assumed that there is to be a multiplication effected of 4 times 9, 4 being the multiplicand and 9 the multiplier. 9 being the multiplier, the X—9 relay magnet will be energized. The brush assemblages for the MCRO left and MCRO right will be standing on the 4 segment spots (see Fig. 49). The flow of impulses in the circuits is from the emitter 281 through the multiplier relay contact points thence through the multiplicand readout segment spots and thence through the column selection switching mechanism and thence to the LH and RH accumulating devices. Inasmuch as the multiplicand is 4 the only possible circuit path through the units position of the multiplicand readout device is via the fourth wire of the 528 group here designated as 528—4. Tracing up through the contact points of the X—9 relay via lines 528, the relation of the contacts of the X—9 relay of the 525 group will establish a circuit to the sixth line of the 526 group. Accordingly, a six representing impulse will be emitted by the emitter 281 back through the circuit just traced to the RH accumulator. Similarly, for the left hand component, a circuit is effective through the wire designated 527—4, through the points of the upper X—9 relay to the 3 line of the 526 group. Upon operation of the emitter 281 the LH and RH accumulators are operated in the usual way to receive the partial products.

It will be understood, that as in previous machines of this class, that with multiplying components such as 4 times 9 the complete product is 36 and the component partial products are 3 and 6, and that 3 is entered into the LH and that 6 is entered into the RH accumulator and that such entries are effected concurrently. Also that with a multiple figure multiplicand all figures of the multiplicand will be multiplied concurrently by one digit of the multiplier and that there will be a concurrent LH and RH entry.

It will be understood that after one figure of the multiplier is computed, a column shift action occurs and this column shift action takes into account intermediate zeros in the multiplier and that ultimately the LH accumulator contains a complete summation of LH components of partial products and that the RH accumulator contains a complete summation of RH components of partial products. The machine is now ready to gather together the partial products into one complete accumulation or whole product.

After the cycle controller has completed its sequence of operations, the last of the 311 magnets will have been energized and when this occurs, due to the relation of contacts 334 and 335, a circuit will be established through cam contacts CC—4 and through trip magnets 304 and 305 which are located in the rear of the RH products accumulators (see Figs. 57 and 58). Energization of 304 and 305 will allow the three-blade contacts RH 1 to 15 to shift to reversed position from that shown on the circuit diagram and establish circuits from the RHRO readout device to transfer lines 540 (Fig. 61c), which lines extend over to the 533 accumulator magnets. The transverse bus wiring 408 of the RHRO readout (Fig. 48) is connected to an emitter 282. With contact LHE closed, current flows from wire 503 through the emitter 282 into the RHRO readout, thence through the three-blade contacts which have certain of their blades closed upon energization of 304 and 305 and thence over the lines 540 to the LH accumulator. The amount standing on the RH accumulator is thereupon transferred into the LH accumulator in proper columnar relation therein so that the LH accumulator then has standing upon it the whole product. When the three-blade contacts RH 1 to 15 are shifted to reversed position, contacts RHA (Fig. 61c) are closed so that when the emitter 282 reaches its zero spot a current impulse will be impressed through RHA to energize magnet 306 (Fig. 59). 306 upon energization trips the contacts in the LH product accumulator. One of the contacts in the LH accumulator is LHE, which contact is opened up by the above action. Opening up of LHE cuts off current from the emitter 282 and prevents a second transfer over of amounts from the RH accumulator into the LH accumulator. In certain instances in the present machine it is desired to obtain a summation of separate products. For this purpose the SP accumulator is provided. 533SP are the accumulator magnets of this accumulator. The parts generally designated LHRO are one group of the readout segments of the LH accumulator. When a summation of products is desired plug connections at 541 are provided to connect the adjacent sockets. Then upon the operation of the machine after magnet 306 is energized contacts LHA will become closed and RHC will have been previously closed. Accordingly, a circuit will be established as follows: from 503, through RHC, through LHA to the emitter 283, which emitter is wired up to the LHRO readout device so that the amount standing on the LH accumulator will be entered into the summary products accumulator.

In the present machine, after it is once started in operation the reset of the MP and MC entry devices and also of the IVC accumulator normally occurs in the same cycle that the transfer from the RH accumulator into the LH accumulator takes place. Initiation of reset at this time in the cycle is effected in the following manner: Contacts RHB close concurrently with the shift of contacts RH 1 to 15. Accordingly, when the emitter 282 emits an impulse over its first spot a circuit path is established through RHB to wire 542, wire 543, and through the MC reset magnet 278, and also through the IVC reset magnet 276. Another circuit will be established via circuit path 544 and switch 546, closed at this time, to the MP reset magnet 277.

Provision is made when summary products are accumulated for preventing repeated transfer or repetition of transfer of products into the summary products accumulator. Such repetition is prevented by reason of contacts RHC opening up during the latter part of the reset cycle of the RH accumulator and such reset occurs before there can be an additional or second transfer of products over into the summary products counter.

Reset of the RH accumulator is controlled in the following manner: Cam contacts 298, Fig. 61a, close at the proper time in the reset cycle of the MC accumulator and closure of these contacts causes energization of magnets 274 and 275 so that a reset of the RH accumulators (two sections) immediately follows a reset of the MC accumulator. It may be mentioned here that the RH accumulators are reset earlier in the cycle of the operation of the machine than the reset of the LH accumulator for reasons to be hereinafter explained in connection with the description of the one-half cent pick up.

*Punching of products*

In the LH accumulator one of the contacts LHC controls the initiation of punching of the product. At the proper time in the operating cycle of the machine this LHC contact closes (Fig. 61d). Cam contact CC—3 closes at the proper time in the operating cycle of the machine and sets up a circuit through wire 550 and coil B to the other side of the line. Energization of coil B closes contacts B—1 and establishes a circuit to hold B energized and provide a current supply to a line 551. With the anti-stutter punching contacts 249 closed and with switch 552 in closed position (as shown) current can flow to common conducting strip 213 of the punch (Fig. 12). Brush 214 will already be standing in a proper punch columnar position to punch the first left hand digit of the product under skip bar control. Current will then flow through this spot through the plug connections provided at plug board 553 and to the group of segments of the LH readout mechanism provided for reading out products to the punching section. As has been explained before in connection with the description of the LH readout mechanism there are two sets of segments in this device, these segments being interspersed one with the other. On the circuit diagram the segments of the LH readout mechanism from which control of the punching circuits is effected are marked LHRO punch (see Fig. 61d). The transverse buses of this set of segments extend over and are wired to the punch selector magnets 204. The wiring to the zero punch selector magnet extends through a switch 555 which for usual product punching is disposed in the position shown in Fig. 61d. It will be understood that the circuits through the LHRO punch readout mechanisms are for punch selection purposes. Energization of a selected magnet of the 204 set effecting selection of proper punches for punching action. The punch selecting circuit will now be traced. Starting from line 503 (Fig. 61d) through LHC, through relay points B—1, through wire 551, through anti-stutter contacts 249 now closed, through switch 552, common strip 213, brush 214, a particular spot 212 through the LHRO punch readout device to a particular magnet 204 and back to the other side of line 501. After punch selection is effected by a selective energization of one of the magnets 204, actual punching in the punching unit is effected by the interposer in the punching unit operating to close contacts 209, closure of which contacts establishes a circuit from 551 through the punch magnet 205 (see Fig. 10a), wire 554 and back to the other side of the line 501. As is customary of machines of this class energization of the punch operating magnet 205 acts to open up contacts 209. Following the punching of one column the escapement takes place on the punch and there is a shift of brush 214 to the next adjacent column followed by another punching and so on until the punching of the product is completed. Following the escapement of the card carrier rack 152 (Fig. 12) to the extreme left hand position the last column contact 246b closes. The closure of this contact (see the circuit diagram Fig. 61d) completes a circuit traced as follows: from the 502 side of the line, through 246b, via branch line 556, through card ejector magnet 240 and to the other side of line 501. Energization of the card ejector magnet will release the card ejector assemblage and the card will thereupon be deposited in the discharge magazine 243 (Fig. 10). At the end of this ejecting action contacts 234 (Fig. 12 and Fig. 61d) close. Contacts 234 are disposed in a circuit which extends through 175, cam contacts CC—6 and contacts F—3. It may be explained that when contacts 234 close, contacts F—3 may be open or may be closed depending upon whether punching of the just punched product has taken a longer or shorter time than the feed of the next following card to be punched. Contacts F—3 do not close until a card is in the R station (Fig. 12a). Upon reaching this R station these contacts F—3 are closed and with cam contacts CC—6 closed, a circuit will be established energizing 175. Energization of 175 clutches in the punching unit clutch mechanism to operate rack 151 and bring a new card up to punching position. It may be mentioned at this point that the feeding of a new card in from the card magazine past the reading brushes will be deferred until after the MP and MC readout devices have been reset in the manner previously explained. It has been explained before that the reset of the MP and MC receiving devices occur during the time of transfer of amounts from the RH accumulator into the LH accumulator. At this time contacts RHD (lower right corner of Fig. 61d) will have closed. Following the transfer from RH to LH, magnet 306 is energized. Energization of 306 (Fig. 61c) brings about closure of contacts LHB (Fig. 61d). While contacts RHE and LHF are closed, when contacts RHD and LHB are opened, contacts 335a will have been opened during multiplying and will not become re-closed until after contacts RHE reopen. Accordingly, the restart circuit is through contacts RHD and LHB. Accordingly, the restart of the new card feed will be delayed until contacts RHD and LHB are both closed. This circuit insures that the reset of the MC and MP receiving devices will have been completed before a new card is started through the machine. The initiation of a feed of a second card through the reading section of the machine is effected in the following manner. On the circuit diagram (Fig. 61d), upon closure of RHD and LHB a circuit is established traced as follows: From the 502 side of line, through contacts 248 (Fig. 12a) via wire 600, through contacts RHD, contacts LHB, relay points C—2, cam contacts FC—6 normally closed, feed clutch magnet 506, contacts F—2 now closed and back to the other side of line 501. Energization of feed clutch magnet 506 initiates a new card picking action and starts a new card through the reading section of the machine and into the punching section.

It will be understood that the LH accumulator cannot be reset until punching has been completed because the amounts to be punched are derived from the LH accumulator. Reset of the LH accumulator is accordingly effected after punching operations have been completed in the following manner. As the rack 152 (Figs. 12 and 12a) escapes to extreme left hand position it closes a pair of contacts 247. Closure of these contacts 247 (Fig. 61a) establishes a circuit traced as follows: From the 503 side of the A. C. line, through 247 now closed, through CC—5 which close at the proper time in the operation of the machine, through contacts LHD, which contacts were previously closed, following RH to LH transfer and kept closed throughout the punching of the product, through LH reset magnets 268 and 272 and back to ground. Energization of magnets 268 and 272 brings about reset of the LH accumulator sections in the manner previously explained. During the reset of the LH accumulator section after punching of the product contacts LHD are reopened and all of the other contacts associated with LHD are shifted back to normal position, the normal position being that shown in Fig. 59.

The foregoing description has described the manner in which the machine operates for simple multiplying computations wherein two factors are derived from a record card and multiplied by the operation of the machine and the product punched back on the record from which the factors were taken.

In addition to performing simple computing operations as previously described the machine is also adapted for other kinds of computations.

In certain uses of the machine it may be desirable to have the multiplier factor punched on a single rate card which precedes a number of other detail cards with different multiplicand amounts thereon and in this case the machine should be arranged to derive the multiplier factor from the preceding rate card and to multiply each succeeding multiplicand from each detail card by this common rate multiplier. With the machine operating in this manner, provision is made for retaining the common multiplier or so-called rate multiplier in the MP accumulator of the machine and using this common multiplier for all mutiplying calculations until a new rate card enters the machine. Accordingly, in the use of the machine in this manner cards will be introduced into the supply magazine in groups, each group of cards being separated from the following group by a rate card which rate card will have punched upon it the common multiplier factor. With the machine operating with rate cards a special designating perforation is placed on each of the rate cards, which perforation is absent on the multiplicand or detail cards. In practice this special designation can be placed in the so-called X position on the card above the zero position. Upon the entry of the rate card into the machine the machine senses that a rate card has been introduced and controls the operation of the machine accordingly.

*Rate card operation*

When the machine is to be used for rate card operations a different control must be had for the MP reset than for normal operations. When rate card operation is desired, certain switches in the machine are adjusted as will now be described. The three switches which are used in rate card operations are switches 513 (Fig. 61a), 546 (Fig. 61c) and 555 (Fig. 61d). For rate card operations, switch 513 (Fig. 61a) is thrown to open position (dotted line position on Fig. 61a). Switch 546 is also thrown to the right to the dotted line position (Fig. 61c) and switch 555, (Fig. 61d), is thrown to dotted line position. It may be explained that for rate card operation the presence of a card in the machine under the X brush and with a perforation in the X brush index point position controls reset of the multiplier accumulator or receiving device MP at the proper time in the cycle and it is the control of this multiplier accumulator reset that brings into action the other controls. The passage of the first rate card through the machine brings about a reset of the multiplier accumulator in the usual manner, that is a circuit is established (Fig. 61c) from the 503 side of the A. C. line, through FC—5, relay points G—2, switch 514, multiplier reset control magnet 277 and back to ground. During normal running cycles of the machine relay points G—2 open up after the passage of the first card into the brush reading station. Their operation accordingly effects the first reset of the MP entry device for the first card entering the machine. Subsequent resets of the MP receiving device are differently controlled and by different circuits as will now be described.

As the last of a particular group of multiplicand or detail cards passes through the machine, the card feed and reading section of the machine will finally stop card feeding movement and the following rate card will have entered the machine and will be standing in such position that X or extra brush 106 will make contact with 107 through the X or special hole in the rate card. Upon the closure of contacts RHB (Fig. 61c) at their usual time and at the proper time in the cycle of operations of the machine, a circuit will be established from the 503 side of the A. C. line through LHE, via emitter 282 to the first or extra spot of the emitter, through RHB, thence through wire 542, card lever contacts 112 to the special or X brush 106, through the special X hole in the rate card to conducting plate 107 and down through switch 546 which is in reversed or dotted line position to MP reset magnet 277. The MP reset magnet will then become energized and the MP device will be reset.

It will be understood that for the preceding multiplicand cards preceding the rate card that there will be no reset of the MP receiving device because no circuit will be established between 106 and 107 at the reset time because of the absence of an X hole in all of the multiplicand or detail cards and also because relay points G—2 will have opened up after the passage of the first card into the machine.

By the foregoing controls provision is made for holding the multiplier set up in the machine for each of a multiplicity of multiplicands and for resetting the multiplier receiving device MP when a new rate from a new rate card is ready to be entered into the MP receiving device. It will be understood that with the use of rate cards that there are only certain zones on the card which are punched with rate multiplier amounts and that these rate cards after passing the X brush station proceed on into the punching section of the machine. Inasmuch as such rate cards pass through the punching section the machine would, unless prevented, operate to punch all zeros in the rate cards in the fields of such cards which correspond to the products fields of the multiplicand or detail cards. Provision is accordingly made for preventing such undesired punching of zeros in rate cards. This preventing of the punching of undesired zeros in rate cards is brought about by a control which is in part exercised by relay coil E. Relay coil E (Fig. 61d) controls contacts E—2 and E—3. With coil E deenergized, E—2 is closed and E—3 opened and upon energization of coil E, E—2 will be opened and E—3 closed.

It has been explained before, that associated with the MP entry device there is a contact 297 which closes during the reset of the MP entry device. Closure of contacts 297 (Fig. 61d) will establish a circuit from right side of D. C. line 502 through wire 557 to coil J energizing this coil. Either of two conditions may exist in the machine at the time coil J becomes energized by closure of contacts 297. One condition will be the condition which exists when the MP receiving device is being reset during the passage of the first rate card of a first group through the machine. The other condition will be that condition which exists during the reset of the MP receiving device for any one of the succeeding rate cards. Under the first condition for the first entering rate card, the eject fingers of the card ejector assemblage will be standing in the eject position shown in Fig. 12 and contacts 233 will be closed so that upon energization of relay coil J current will also flow through contacts 233 to relay coil E and energize it. When relay J is energized, there is a stick circuit for this coil J through a circuit path 558 including contacts 248a on the punching section of the machine to right side of line 502. The stick circuit just traced for relay coil J also holds coil E energized under these conditions. As the first rate card of the first group passes to the R station of the punching section of the machine and is picked up and moved endwise contacts 246a (Fig. 12) will be closed by the movement of rack 152 toward the right. Closure of contacts 246a under these conditions will establish another stick circuit through contacts 246a, circuit 559 and points E—1 of relay E to the other side of line. At the extreme end of the stroke of the punch rack parts contacts 233 will become open and will remain open until the following card eject operation. Also at the extreme end of the stroke of the punch rack parts, contacts 248a will open up and the opening of these contacts will break the holding circuit 558 to relay coil J. The holding circuit via circuit path 559 previously traced will then be held while movement of the card carriage rack parts takes place until contacts 246a reopen, which opening up action occurs just after the card reaches the last columnar position in the punching section of the machine.

It will be appreciated from the foregoing that relay E will have been energized by the passage of the first rate card through the punching section of the machine.

Before describing the control which is exercised by relay coil E, the second condition will be explained, that is the condition which exists when contacts 297 close upon the passage of any one of a succession of succeeding rate cards through the machine. Under these conditions contacts 297 will close while the machine is punching the product of the previous computation. Under these conditions it will be appreciated that there should be no suppressing of zero punching because if such suppression took place there would be a suppression of punching of desired zeros in the last multiplicand card of the previous group. Under these second conditions of operation the eject clip contacts 233 will be open at the time of closure of contacts 297 and a circuit will be established through relay coil J. Such circuit, however, will not act to energize coil E because of the open condition of contacts 233. The stick circuit for coil J will, however, have been established through the 558 path as previously traced. Under these second conditions of operation relay coil E will remain de-energized during the completion of punching of the product on the last multiplicand card of a preceding detail group and will remain deenergized until the ejector clip mechanism functions to discharge the card and bring about a reclosure of contacts 233. When contacts 233 are closed when the last multiplicand card is being ejected coil E will become energized but its stick circuit will not be established until the card feed rack starts its endwise movement and brings about a reclosure of contacts 246a. At the ending of the strokes of the racks in the punching section of the machine, 248a will reopen and break the stick circuit to relay coil J. 233 will also reopen but relay E will remain energized until the rate card passes through the punching station of the machine. The function of relay coil E in controlling the elimination of punching of undesired zeros on rate cards will now be described.

During the passage of any rate cards in the punching section of the machine points E—2 will be open and points E—3 will be closed. The opening of points E—2 will cut off the supply of current to the zero magnet of the 204 group. Actual punching operations, it will be recalled, are initiated at the closure of LHC. With E—2 open and E—3 closed a circuit is established to the punch operating magnet 205 through path traced as follows: from 502 through LHC now closed, B—1 now closed, circuit 551 through 249, through the switch 552, through the common strip 213, through one of the 212 spots to the zero bus of the LHRO punch read out, thence to switch 555 through the contacts E—3, through punching operating magnet 205 and back to the other side of the line. It will be understood that notwithstanding that the punch operating magnet 205 operates with this type of operation that no actual punching will be effected because none of the interposers operated by the punch selector magnets 204 have been thrust forward not even the zero interposer magnet since the circuit to the zero magnet is cut off by switch 555 and by the opening of contacts E—2.

With rate card operations, in certain cases, the detail or multiplicand cards may have figures punched in them in the zones or fields which correspond to the multiplier zones or fields of the rate card or cards. In such instances it is, of course, not desired that the amounts from the multiplicand or detail cards should be entered into the MP receiving device because such entry would destroy the setting which the MP receiving device had derived from the perforations of the rate cards. To provide for this control the following control circuits are utilized.

It has been previously explained that contacts A—2 (Fig. 61a) are normally open contacts and that these contacts are closed every time the MP receiving device is reset which brings about the closure of contacts 296. Contacts A—3 are normally closed contacts and these contacts open up on resetting of the MP receiving device when contacts A—2 close. Accordingly, inasmuch as the MP receiving device is not reset for subsequent multiplicand or detail cards, when the machine is running with rate card operation, there can be no possibility of an entry from the multiplicand or detail cards into the MP receiving device because the return circuit to ground from the accumulator magnets of the MP receiving device is interrupted at the time when multiplicand or detail cards are being entered into the machine.

With rate card operations there may be amounts perforated in zones of the rate card which correspond to the multiplicand fields of the detail cards. It is accordingly desirable that entry of amounts from the rate cards should not be introduced into the multiplicand or MP receiving device. Suppression of this undesired entry is provided by the contacts A—3 and the switch 513. Switch 513 being thrown to open or dotted line position for rate card operation. With this switch in this position and with contacts A—3 opening up and remaining open during the passage of a rate card past the reading brushes, there is no possibility of entering amounts into the MC receiving device from the rate cards because the return circuit to ground from the accumulator magnets from the MC receiving device is interrupted.

*Multiplication of sum or difference by a number*

In certain uses of a machine of this general type it may be desirable to punch three sets of amounts on the card. These amounts may be considered to be two multiplicand quantities, one of which is to be subtracted from the other or which is to be added to the other and the sum or difference of these amounts is to be multiplied by a multiplier which also appears on the card. For example, a problem could be handled such as (232 minus 131) times 76. Another typical computation might be as follows: (232 plus 131) times 76. The present machine is arranged to either subtract two numbers and obtain a multiplicand therefrom and then multiply this multiplicand obtained as a result of a subtracting operation by a multiplier or the machine can be arranged to add two numbers together and to multiply the sum which is the new multiplicand by a multiplier. Accordingly, generally stated it may be said that the present machine may be arranged to subtract one amount from another or to add two amounts and to multiply the difference or the sum by a third amount. One particular use of the feature of subtracting one amount from another and multiplying the difference by a multiplier is in the case of uses such as public utility work where there is a current meter reading and a previous meter reading which readings are to be subtracted and multiplied by a rate or cost per kilowatt hour, for example. The machine is readily adapted for computations of this sort. When the machine is to be used for these sums and difference operations the inverter counter is utilized in the manner which will now be described.

When a difference is to be taken the first or larger factor is plugged up from 109 MC to the plug sockets which are connected to wires 509 in the manner previously described. The second or smaller factor is plugged up at plug board section 508s (s indicating small) to the inverter accumulator magnets generally designated 563 on Fig. 61a.

Accordingly, in the operation of the machine the larger amount will be entered on the MC receiving device and the smaller amount will be entered in the IVC accumulator. For sum and difference operations, switches 561 and 562 are also thrown. If a difference is to be taken switch 561 is thrown to the right to connect emitter 287 to the line leading to contacts FC—8. If a sum is to be taken switch 561 is thrown to the left to connect emitter 286 to these contacts FC—8. Similarly with switch 562, if a difference is to be taken, this switch 562 is thrown to its upper position and if a sum, is to be taken it is thrown to lower position. The inverter accumulator readout device has been previously described in connection with Figs. 52 to 54 inclusive. It may be explained that switch 562 when thrown to upper position establishes a circuit to segment 443 and if this switch 562 is thrown to lower position it establishes a circuit to segment 445. It has been previously explained that the contacts IVC 1 to 8 shown on the circuit diagram as IVC—8 to 2 and IVC—1 are normally in the position shown. Accordingly the amount derived from the card by the 109 MC brushes will be entered into the MC receiving device by the energization of its magnets 511. At the same time an amount will be entered from the 109 VC brushes into the IVC accumulator by the energization of its accumulator magnets 563. Entry of the amount into the IVC accumulator will position the brushes of the IVC readout mechanism, which readout mechanism is conventionally designated IVCRO on Fig. 61a. It has been previously explained that a complete card handling cycle includes two machine cycles. Upon the first of these two machine cycles the two amounts from the card will be respectively entered into the IVC accumulator and the MC receiving device. Towards the close of this first machine cycle the emitters 286 or 287 will have reached their supplemental spot position and will establish a circuit to magnet 307. Energization of magnet 307 (see Fig. 60) trips the inverter contacts (IVC 1 to 8 inclusive), to reverse position from that shown in the circuit diagram and this shifting of the contacts connects the segments of the IVCRO device to the accumulator magnets 511 of the MC receiving device. Subsequently upon the next machine cycle and upon closure of cam contacts FC—8 the impulse emitter 286 will emit impulses to the transverse buses 457 of the IVC readout device and the impulses will flow out through the common segments of this readout device through the IVC 1 to 8 contacts to the 511 magnets. In this way the amount standing on the IVC accumulator will be transferred over and entered into the MC receiving device. From this point on the operation is the same as before described.

It will be understood that the function of the IVC accumulator in this instance is to receive the entry of the second component of the multiplicand from the card and to control the transmission of timed impulses over into the MC receiving device, which receiving device ultimately has set up upon it an amount which represents the sum of the two numbers.

When a subtracting operation is desired to be performed, switches 561 and 562 are thrown into the other position viz. 561 is thrown to the right and 562 is thrown up. Entries into IVC and MC on the first machine cycle are effected in a similar manner and energization of 307 and the tripping of the IVC 1 to 8 contacts is the same as before. Emitter 287, however, is wired in 9s complementary relation to all of the spots of the IVCRO readout device with the exception of the units spots of this readout device in which instance the wiring is such that the emitter is wired up to the readout so as to be complemented to 10.

It will be understood that upon the rotation of the emitter 287 and with the emitter brush encountering the 9 spot that an impulse representative of 9 will be transmitted over to the number 1 spot on the 444 group of spots and that this same impulse representative of 9 will flow over to the zero spot of the 446 group. By this wiring of the emitter and the IVCRO readout the action of the emitter 287 will, instead of transferring over to the MC device the amounts standing on the IVC accumulator, will transfer over to the MC device the true complement of the IVC accumulator amount. Accordingly, upon the transfer-over operation, the MC receiving device will ultimately have standing upon it the difference between the amount which it initially received and the amount standing on the IVC accumulator. From this point on the operations are the same as previously described.

*Sum and difference and rate card operation*

It will be noted on Fig. 61a that the return circuit 565 from the inverter accumulator magnets 563 connects over to the A—3 group of contacts and to the 513 switch. Accordingly, it is possible to use the sum and difference feature in connection with rate cards. A typical use would be to have on each detail or multiplicand card the two components which are to be added to or subtracted from each other, and to have the multiplier on the rate card.

When the machine is operating to take the sum or difference of two numbers and use the new number as the multiplicand, the cam contacts FC—8 function to prevent a double transfer over of the sum or difference from the IVC accumulator into the MC accumulator. It will be understood that these contacts FC—8 are timed to open up after the first transfer-over has been made.

*Reset of summary products accumulator*

It has been previously explained how it is possible to accumulate a summation of all products derived from a succession of cards which have passed through the machine. After such summation of a desired number of products is obtained resetting of the summary products accumulator may be effected by a manual operation. This is accomplished in the following manner. Summary products reset key 566 is depressed completing a circuit from the 503 side of line, through 247, cam contacts CC—5, summary product reset key contacts 566, through summary products reset magnet 273. Reset of the summary products accumulator then is effected in the usual manner.

*Punching of sum and difference*

With the present machine it is also possible to punch back upon the record card the sum or difference obtained from the two factors of the card. This capability of punching the sum or difference is available provided the number of digits in the product which is to be punched does not exceed one half of the total product capacity of the machine in columns. Punching of the sum or difference, as the case may be, is effected by operating the machine in such a manner that the sum or difference from the MC accumulator is transferred over to the RH components accumulator following the usual multiplication by providing for a multiplication by one in the extreme left hand order of the multiplier. For example, if the multiplication were to be by 36 the machine would in reality effect a multiplication by an imaginary amount such as 10000036. The machine may be set up for this type of operation by plugging the highest order magnet 507 to a special plug hub 567 (Fig. 61a) which plug hub leads through contacts FC—9 which contacts are timed to close at the "one" index position; this circuit through contacts FC—9 extends to a point connected at the left of the H—2 relay points. The effect of this manner of plugging up is to multiply the sum or difference by the amount of one and to set up this product, which is of course the same as the sum and difference, upon the extreme left hand wheels of the product accumulator. This amount is first entered into the RH section of the products accumulator and is subsequently transferred over into the LH accumulator during the same cycle that the normal RH to LH transfer takes place. The amount of the sum or difference is then punched just as if it were a product. When the punching of the sum or difference is obtained in the foregoing manner proper plug connections are made to the punching unit at plug board 553 (Fig. 61d). Another manner of punching this sum and difference on the card is to punch in an imaginary multiplier of one in the proper zone and column of all cards containing a multiplier amount whether rate or detail cards. Location of sum or difference punching may be obtained by a proper skip 196.

It will be understood that with the foregoing type of operation there are in effect intermediate zeros in the multiplier with the imaginary multiplier of 1 in the relatively highest order. Accordingly, the column skip mechanism will automatically operate after the highest order of the real and true multiplier has been multiplied and thereupon bring about a multiplication by the imaginary amount of 1. By this imaginary multiplication the sum or difference will be entered into the relatively highest order wheels of the RH accumulator, which wheels under these conditions will not be receiving any right hand components of products. Thereafter the operation will be just the same as if an ordinary product was to be punched.

*Combining two RH and LH accumulator sections into two larger accumulators*

In the description of Figs. 30 and 30a, reference has been made to the manner of providing an electric transfer between the two RH accumulator sections and the two LH accumulator sections. On the circuit diagram (Fig. 61d) the contacts 398 are shown wired in the circuit extending to magnet 299, and these may be considered to be the parts disposed respectively in the RH 1 to 8 accumulator section and in the RH 9 to 15 accumulator section and just below this circuit are shown similarly numbered parts with the suffix a in each instance, viz. 398a, and 399a. These are the corresponding parts in the LH 1 to 8 and in the LH 9 to 16 accumulator.

*Punching product to nearest cent*

In many cases in multiplying computations it is desirable to punch a product to the nearest cent and to drop insignificant decimals. For example, if a multiplication comes out 78.382, the amount to be punched would be 78.38. On the other hand if the product came out 78.389, the amount to be punched would be 78.39. In other words, the machine is adapted to disregard a decimal under 5 and to increase the product by one unit in the lowest order if the decimal is 5 or greater. This raising of the product may be desired to be effected in any selected columnar order of the product. This raising to the nearest half cent or the disregarding of insignificant figures to the right is effected by entering into the RH accumulator after it has been reset, but before the RH components are entered therein, an amount of 5 on one of the wheels of this accumulator. The wheel on which this amount of 5 is entered is one which is selected one column to the right of the lowest order column to be punched. For instance, if the machine obtains a series of products such as 8.382 and 8.389 and it is desired to punch the products as 8.38 and 8.39, the lowest order wheel of the RH accumulator would be plugged up to receive an amount of 5 preliminary to the receipt of the RH component on the lowest order wheel. The transfer mechanism in this RH accumulator then functions to transfer over a carry amount of one to the next wheel to the left in the event that any amount entered exceeds 5 or greater. In the example noted the actual product obtained by the multiplication is 8.389, and with the 5 added in the lowest order position the amount standing on the accumulator is actually 8.394. The machine is then plugged up to transfer over only 8.39 to the LH accumulator and the lowest order position on which 4 is standing is not plugged up. In the machine this half cent pick up is provided for by the following devices and circuits.

Referring to Fig. 61c, relay points D—2 establish a circuit from the 503 side of the line to a pair of cam contacts FC—1b. Wired to the other side of FC—1b is a plug socket 568 and wired to the other side of contacts FC—1a is a plug socket 569. When any particular order is to be raised say the units or lowest order of the RH components counter, a plug connection is made from 568 to the units order socket 536, and another plug connection is made from the units socket 532 to the plug socket 569. Then the usual plug connection from 532 to 536 in say the units order must be removed. Accordingly, upon the operation of the machine the cam contacts FC—1b close at the 5 index position in the cycle of the machine and they accordingly enter an amount of 5 into the units order wheel of the RH accumulator. Then on normal entering operations cam contacts FC—1a are closed and the entry into the units order of the RH accumulator is from plug socket 532 pertaining to the units order by the plug connections 569 through FC—1a and back through 568 to the units order socket 536.

It has been previously explained that the relayless contacts 395 customarily used in tabulating machines are employed only in the MC accumulator. These contacts as employed in the MC accumulator are normally open contacts and are closed upon energization of their corresponding accumulator magnet whenever an amount is entered in any columnar order in this MC accumulator. Such contacts are re-opened automatically at the end of the entering cycle at the time the clutches of the accumulator are disengaged.

Referring to the circuit diagram (Fig. 61d) the 395 contacts are shown wired in parallel in a circuit 570, 571, which extends over to relay D. It will be understood that the entry of any amount into the MC accumulator will energize coil D. Energization of D establishes a stick circuit through points D—1, wire 572 and cam contacts FC—4 to the other side of the line 502. It will be understood that points D—2 previously referred to (Fig. 61c) are closed when an amount has been entered into the multiplicand accumulator and that these contacts open as soon as contacts FC—4 open up the stick circuit 572. Accordingly, there is not a repeated introduction of 5 into the units or other selected order wheel of the RH accumulator, but this amount of 5 is entered once and then entry of 5 is suspended.

*Checking*

After the cards have been run through the machine it is sometimes desirable to check the multiplying which has been performed by the machine. One manner of performing such checking is to take the cards out of the machine and then to re-plug up the machine so that the zone on the cards which was formerly the multiplicand, becomes the multiplier and the zones which were formerly the multiplier become the multiplicand. In this way the same set of cards can be run through the machine and a mathematically different set of computations can be performed. These computations can then be entered into the summary products accumulator and the summary products accumulation thus obtained on the check run can be compared with the summary products accumulation on the first or punching run of the cards and if these two accumulations agree, the computations made by the machine check one another and are correct. While such re-check run can be made with the punching device in operation, in which case there would be a duplicate or a repetition of the punchings previously made, it may be desirable to speed up the check run and to obtain this increased speed of checking provision can be made for cutting out certain unnecessary portions of the punching cycles. The operation in this respect is similar to the escaping over of a rate card without punching zeros therein. The manner of cross plugging multiplicand and multiplier requires no detailed description. It is simply a matter of plugging up the 109 MC sockets to the sockets which are connected to the 507 MP magnets and the plugging up of the 109 MP sockets to the sockets 508 which connect to the MC magnets 511. The summary products accumulator will be plugged up as before described. Then to discontinue undesirable punching cycles, switch 552 (Fig. 61d) is thrown to dotted line position. By shifting 552 to dotted line position the circuits from 213, through 212, etc. are cut out and in lieu thereof a circuit is established through a path 571 which goes back to magnet 205. In this way the time which is required to energize 204 and to thrust the interposers forward, etc. is eliminated and checking is more expeditiously effected.

Multiplying by a constant multiplier

In some instances it may be desired to run the machine and retain a multiplier in the machine for a number of detail cards. This can be effected by having one card perforated with the multiplier and by running this card through the machine with switch 514 closed; and after this card has run through, by stopping the machine and opening up switch 514. With this switch 514 thus open and with switch 546 in dotted line position the multiplier receiving device MP will not be reset at all and the amount which is received from the first card will be indefinitely retained in the machine. This amount will also be retained even in the event that cards become exhausted from the machine and new cards inserted therein. This particular feature is of utility in the use of rate cards where the detail cards become exhausted before a new rate card enters the machine.

Gang switches

Previous reference has been made to the manner of manipulation of switches 546 (Fig. 61c), 513 (Fig. 61a) and 555 (Fig. 61d). Such switches are used in rate card operations. For convenience in setting the switches they may be ganged so that the manipulation of one member shifts all of the switches concurrently. Such a gang switch, it will be understood, could be thrown to concurrently place all switches in full line position or dotted line position.

In explaining one manner of checking computations by the machine, it was explained that the plug connections from the 109 MP brushes could be connected over to the sockets on the 509 lines and that the plug connections from the 109 MC brushes could be connected over to the sockets connected to the 507 MP magnets. Such reversal of the plug connections converts the previous multiplier into the multiplicand and the previous multiplicand into the multiplier. In lieu of having to shift the plug connections in such manner a multiple gang reversing switch may be provided to reverse the entries. Such gang switch if used, would be of the three-blade construction per column, with the center blades on such switch connected to the brush circuits and the other blades on each column respectively connected to the MP and MC entry receiving devices. Accordingly, with such a gang switch a mere shift of the gang switch would direct previous MC entries into the MP device and previous MP entries into the MC device. In short it transposes the entries just as the plug connections transpose such entries. While such transposition of the entries finds particular use on checking purposes it is also of general utility in machines of this class.

The term "relay" as herein used, refers not only to the purely electrical relays of the machines such as the relays with coils A, C, G, etc., (Fig. 61d), but also the term is used with respect to the electromechanical multi-contact relays shown in Figs. 21, 19 and 35 to 38 inclusive. The term is also used as applying to the electromagnetically tripped mechanically restored multi-contact relays shown in Figs. 29 and 57 to 60 inclusive.

What we claim is:

1. A record controlled accounting machine including record sensing means multiplying devices and means for controlling the same from record cards which pass through the machine, said last mentioned controlling means including rate card devices with provisions including a special brush for sensing cards which pass thereunder at a sensing point which is greater than one card width in advance of the record sensing means and for determining from a special perforation in such passing cards that a rate card is being sensed, and means controlled by said rate card sensing means for setting the machine to derive the multiplier data from the rate card and to suppress the deriving of multiplier data from the multiplicand cards.

2. A record controlled accounting machine including record sensing means multiplying devices, a multiplier entry receiving device and means for resetting said multiplier entry receiving device after each computation is completed and means controlled by a special rate card passing through the machine and by a special perforation thereon which is sensed by a special brush at a point more than one card width in advance of the aforesaid record sensing means for suppressing the aforesaid reset of the multiplier entry receiving device after each computation and whereby a series of computations may be made with a single and same multiplier, said means including provisions for again resetting the multiplier receiving device upon a new rate card passing through the machine.

3. The invention set forth in claim 16 in which means are provided for reading into the machine from a record the factors of a to be performed computation, said reading in operation from the record being timed to occur while the result of the previous computation is being punched by the successively acting punching device.

4. A record controlled calculating machine with record handling and reading devices for reading factors from records which are passed through the machine, multiplying devices with product receiving means and punching mechanism controlled by the product receiving means of the multiplying devices for perforating results of a computation by successively acting repetition punching operations, means for coordinating the reading in from the record and result punching operations so that amounts may be read into the machine from the record while results of a previous computation are being punched by the successive column acting punching mechanism.

5. A record card controlled multiplying machine with a card handling and reading mechanism, multiplying means with product set-up means controlled by the card reading mechanism and punching mechanism of the successive column acting type with card displacing parts to receive a card from the handling and reading mechanism and to advance the same through the punching mechanism, means controlling the punching mechanism by the product set-up means of the multiplying means and means controlled by said card displacing parts of the punching mechanism to prevent a feed of cards by the card feeding mechanism until the said parts are in position to receive a card from said reading mechanism.

6. A readout device for a multiplier entry retaining device of an electrically controlled accounting device, which entry retaining device includes denominational order setting elements, a multiplicity of sets of segments disposed side by side one set of which segments are provided with a plurality of spots adapted to be swept by brushes positioned by the denominational order setting devices and other sets of said segments alternating with the segments of the first set and provided with zero spots only and swept by brushes pertaining to different but adjacent denominational orders, transverse bus wiring connecting corresponding numbered spots of alternate segments of the first set, and other wiring connecting only the zero spots of interspersed alternate segments of the second set.

7. A record making accounting machine with multiplying means with result setup means therefor, a punching means with punches selected for operation under the control of the said result setup means of the multiplying means when records are to be punched with multiplied results, and a magnet which operates to trip an escapement in the punching means and which also at times operates to effect punching, means including interposer devices for initiating energization of said magnet when punching is to be effected, and other means for effecting energization of said magnet when escapement operations are desired in checking multiplication without punching operations.

8. The invention set forth in claim 7 in which the other means includes contacts controlled by the escapement for initiating energization of the magnet and other contacts closed upon energization of the magnet for taking control of such magnet.

9. A card handling and reading section for an accounting machine, including in combination an intermittently operated card transfer and contact cylinder for receiving and turning over a card and for moving it for sensing during transit, an intermittently operated picker for withdrawing cards one at a time from a stack for subsequent delivery to the cylinder, a pair of constantly driven feed rolls intermediate the picker and cylinder receiving each card from the former and delivering it to the latter, a common driving means for the aforesaid cylinder, picker and feed rolls, driving connections intermediate said common drive means and the feed rolls for maintaining their drive at all times when the common drive means is in operation and an electromagnetic clutch intermediate said common drive means and the cylinder and picker for controlling the intermittent operation of both the cylinder and picker.

10. A card handling and reading section for an accounting machine, including in combination an intermittently operated card transfer and contact cylinder for receiving and turning over a card and for moving it for sensing during transit, an intermittently operated picker for withdrawing cards one at a time from a stack and for subsequently delivering each card to the cylinder, a pair of constantly driven feed rolls intermediate the picker and cylinder receiving each card from the former and delivering each card to the latter, a constantly rotating drag roll receiving each card after it has been turned over by the cylinder, a common driving means for the aforesaid cylinder, picker, feed rolls, and drag roll, driving connections intermediate said common drive means and the feed rolls and drag roll for maintaining their drive at all times when the common drive means is in operation, an electromagnetic clutch intermediate said common driving means and the cylinder and picker for controlling the intermittent operation of both the cylinder and picker.

11. In an accounting machine with means for multiplying factors of a computation, product set up means upon which the result of each computation is set up with means including a readout section for controlling recording of each result therefrom, means for running up in the machine the summary of a series of successive product results computed by the machine, said means including a separate summary products accumulator, and including in combination means for entering therein each complete product after it is set up upon said product set up means, said entering means including as a control therefor a separate readout section controlled by the product set up means and separate from the readout section which controls recording, an impulse emitter for emitting impulses through said readout means to the summary products accumulator, and means including control means controlled by the product entering means for causing emission of impulses by said emitter and for thereby causing entry into the supplemental accumulator automatically at the time each separate product is being recorded and after completion of multiplying by the multiplying means.

12. In a record controlled and record making accounting machine including multiplying devices controlled from factor data upon records and including products receiving means, means for resetting the product receiving means to zero, with perforated devices and with means for controlling said perforating devices from the result receiving means and including in combination means for rounding off computed results to the nearest whole unit, including means for automatically introducing an extra amount once into the products receiving means of the machine after reset of such means and before it receives computed results, the means for controlling the aforesaid perforating devices, including means for eliminating the punching of amounts in a column of lower order than the column in which amounts are rounded off.

13. In a record controlled calculating machine with computing mechanism having result receiving means for multiplying amounts derived from records, said result receiving means having denominational order elements, perforating mechanism controlled from the result receiving means for perforating results, and including in combination means for controlling a denominational order element of the result receiving means for automatically raising an amount in a particular column of the result receiving means which is five or over by an additional amount which increases by one the next higher order, said means including control means to automatically effect such increase after reset of the result receiving means and before the entry of computed results therein, the aforesaid perforating mechanism upon perforating, recording the result so increased and omitting the recording of insignificant amounts in relatively lower orders.

14. A record controlled accounting machine, including means for reading factors from record cards and means for effecting computation with the factors so read, result receiving means adapted for reset after each computation, with result perforating means controlled from the result receiving means and including in combination means associated with such result receiving means for automatically introducing after reset and before computed results are received a supplemental amount in a pre-selected column for rounding off computed results in a next higher column including means to pre-select the column into which the supplemental amount is to be introduced after reset, and common initiating control means controlling the introduction of the amount for all orders, and means for controlling the aforesaid result perforating means so that a predetermined number of significant digits only are perforated.

15. A multiplying machine with multiplying means, which multiplying means through intervening means derives factor data for controlling multiplying operations from a record, perforating mechanism for perforating product results upon a record, means for obtaining a summary of the separately computed separate products related to a plurality of separate factor containing records, means for utilizing the foregoing multiplying means and the product summarizing means for checking the results of previously made computations, including means operable during recomputation for effecting checking computations with reversed relations of multiplier and multiplicand, and for the obtaining of a product summary for comparison with the previously obtained product summary and a single manipulative means adapted to be brought into operation upon the making of such checking computations for suppressing certain time consuming actions of parts of the perforating mechanism and for providing faster operations upon checking due to the elimination of such time consuming operations of such parts.

16. A record controlled calculating machine with record handling devices, record reading devices for reading factors from records which are passed through the machine, multiplying devices with product receiving means and punching mechanism controlled by the product receiving means of the multiplying devices for perforating results of computations, control means to initiate a record handling and record reading operation, control means to initiate a punching operation and means timing both of the aforesaid control means in such relation to one another that punching operations are effected during a record handling and record reading cycle whereby operating time of the machine is saved.

17. A readout from which converted entries or entries as entered may be read out, comprising a plurality of brush elements, certain of said brush elements being individually set by a denominational order setting device which is individual thereto and a pair of said brush elements having a common denominational setting device for the units order, a pair of segments each of which is traversed by one of the aforesaid last-mentioned brushes and wiring connecting the spots of one of said segments with the spots of the other of said segments with the numbered spots of one of said segments respectively connected to spots on the other of said segments which represent a corresponding amount which is decreased by one, other segments being provided for traversal by other brush elements with the corresponding spots of said other last mentioned segments connected together and to corresponding spots of the second mentioned segment of the pair of segments traversed by the units order brush elements.

18. A record card controlled multiplying accounting machine with card handling and card reading mechanism, multiplying means with a product set-up means and a punching mechanism of the step-by-step type controlled by the product set-up means of the multiplying means and having a receiving tray to receive cards from the card handling and card reading mechanism, means for disconnecting certain parts of the record handling and reading mechanism from the drive therefor to suspend card handling and reading operations, the aforesaid means being controlled by the presence of a card in the receiving tray of the punching mechanism and preventing further feeding and reading of a new card, and a supplementary control for the aforesaid means to prevent card feed and reading after a card has been advanced away from the tray by the step-by-step punch, said supplementary control including control means controlled by the product set-up means.

GEORGE F. DALY.
JAMES M. CUNNINGHAM.